US011310372B2

(12) United States Patent
Kashihara et al.

(10) Patent No.: US 11,310,372 B2
(45) Date of Patent: Apr. 19, 2022

(54) SERVICE PROVIDING SYSTEM, INFORMATION PROCESSING SYSTEM, AND INFORMATION PROCESSING METHOD FOR TRANSMITTING DATA TO APPLICATION WITH AUTHORITY TO STORE IN EXTERNAL SERVICE SYSTEM

(71) Applicants: Hiromu Kashihara, Tokyo (JP); Atsuko Serizawa, Tokyo (JP); Yusuke Yoshioka, Kanagawa (JP)

(72) Inventors: Hiromu Kashihara, Tokyo (JP); Atsuko Serizawa, Tokyo (JP); Yusuke Yoshioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/128,626

(22) Filed: Dec. 21, 2020

(65) Prior Publication Data
US 2021/0203792 A1 Jul. 1, 2021

(30) Foreign Application Priority Data

Dec. 27, 2019 (JP) .............................. JP2019-239918
Feb. 28, 2020 (JP) .............................. JP2020-034342

(51) Int. Cl.
*H04N 1/44* (2006.01)
*H04N 1/00* (2006.01)
*G06F 3/06* (2006.01)

(52) U.S. Cl.
CPC ..... *H04N 1/00244* (2013.01); *H04N 1/00411* (2013.01); *H04N 1/00962* (2013.01);
(Continued)

(58) Field of Classification Search
None
See application file for complete search history.

(56) References Cited

U.S. PATENT DOCUMENTS 10,122,870 B2  11/2018  Sugimura et al.
10,136,017 B2  11/2018  Hayashi et al.
(Continued)

FOREIGN PATENT DOCUMENTS

JP  2012-089161  5/2012
JP  2016-154000  8/2016
(Continued)

*Primary Examiner* — Haris Sabah
(74) *Attorney, Agent, or Firm* — IPUSA, PLLC

(57) ABSTRACT

A service providing system includes a device; and an information processing system. The information processing system stores each user of the information processing system and each user of an external service system in association with each other. The device accepts a specification of a first application and a user of the information processing system; acquires data for which a user of the external service system, associated with the user of the information processing system, has an authority, among data relating to the first application included in the external service system; displays a screen to accept a selection of one piece of data from the acquired data; accepts the one piece of data for which the selection is accepted via the screen; and requests the external service system to store information acquired by the device in association with the accepted one piece of data.

17 Claims, 54 Drawing Sheets

(52) U.S. Cl.
CPC ......... *H04N 1/4433* (2013.01); *G06F 3/0637* (2013.01); *H04N 1/00511* (2013.01); *H04N 2201/0094* (2013.01)

(56) References Cited

U.S. PATENT DOCUMENTS

| | | | |
|---|---|---|---|
| 10,162,584 B1* | 12/2018 | Ozawa | G06F 3/1231 |
| 10,356,266 B2 | 7/2019 | Hayashi et al. | |
| 10,372,485 B2 | 8/2019 | Namihira et al. | |
| 10,750,044 B2 | 8/2020 | Hayashi et al. | |
| 2011/0134456 A1* | 6/2011 | Tsujimoto | H04N 1/4433 358/1.13 |
| 2013/0135673 A1* | 5/2013 | Murakawa | G06F 3/1256 358/1.15 |
| 2013/0141743 A1* | 6/2013 | Miyazawa | H04N 1/00413 358/1.13 |
| 2016/0077767 A1* | 3/2016 | Yamamoto | G06F 3/1261 358/1.14 |
| 2016/0316100 A1* | 10/2016 | Hwang | H04W 12/08 |
| 2018/0302525 A1* | 10/2018 | Han | H04N 1/00464 |
| 2020/0097162 A1 | 3/2020 | Hayashi et al. | |
| 2020/0236235 A1 | 7/2020 | Yoshioka | |

FOREIGN PATENT DOCUMENTS

| | | |
|---|---|---|
| JP | 2017-041669 | 2/2017 |
| JP | 2017-076368 | 4/2017 |

* cited by examiner

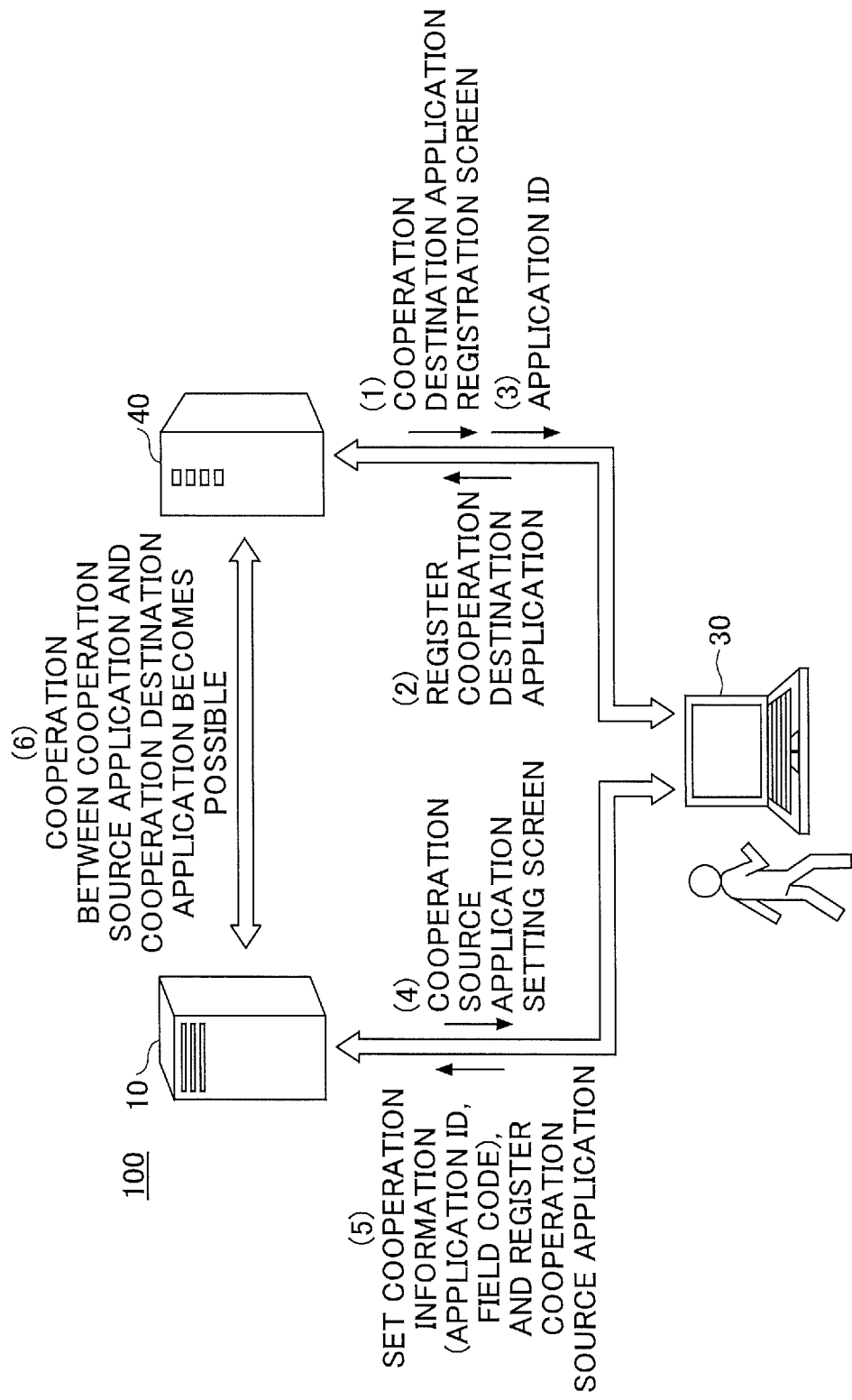

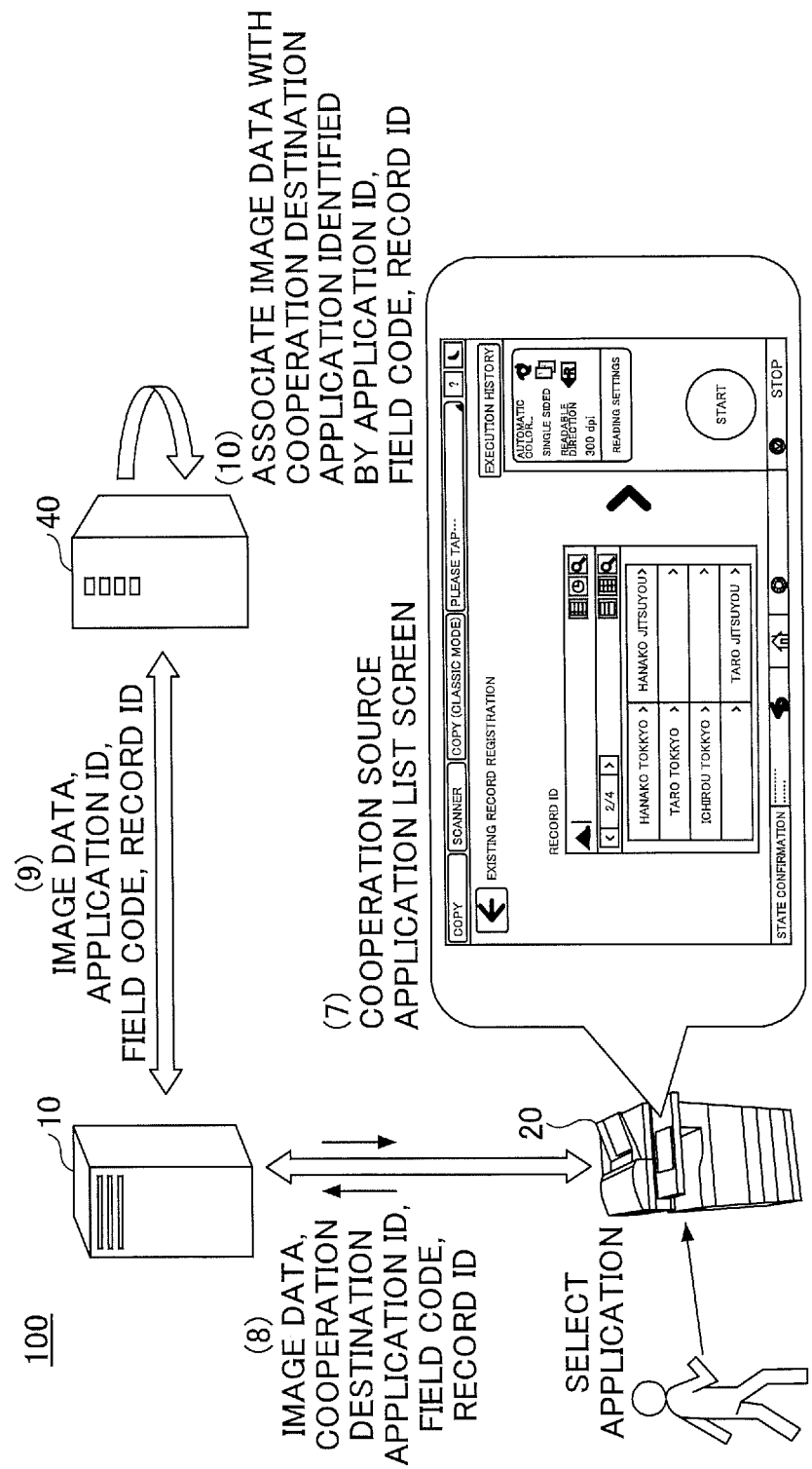

FIG.7

```
{
    "flowId" : "flow001",                              }1201A
    "flowName" : "NEW RECORD REGISTRATION",  }1202A    1203A
    "flowDetails" : [
        {
            "component" : "ExService_A",
            "operation" : "processFile"
            "parameters" :{                            }1223A
                "AppId" : "2575"
                "FiledCode" : "7"
                "YouserName" : " SUZUKI"
            }
        }
    ]
}
```

FIG.8

```
{
  "flowId" : "flow001",                            }1201C
  "flowName" : "FAX RECEPTION REGISTRATION",}1202C      1203C
  "flowDetails" : [
    {
        "component" : "ocr",
        "operation" : "process",
        "parameters" :{
              "language" : "English",
              "outputType" : "pdf"                      1213C
        }
    },
    {
        "component" : "ExService_A",
        "operation" : "processFile",
        "parameters" :{
              "AppId" : "2579"
              "FiledCode" : "7"                         1223C
              "FaxNumber" : " 03-1234-5678"
              "FiledCodeFax" : "FAX NUMBER"
        }
    }
  ]
}
```

| RECORD NUMBER | CUSTOMER NAME | TELEPHONE NUMBER | CASE STATUS | NEW/ADDITION | DELIVERY DATE | DESIGN REQUEST | PROPOSED DESIGN | FIXED CHARACTER STRING | NUMERICAL VALUE | PERSON IN CHARGE OF CASE |
|---|---|---|---|---|---|---|---|---|---|---|
| 69 | | | PREPARING FOR SHIPMENT | | 2019-11-14 | 2019-11-12 DESIGN.pdf | | | 12... | SUZUKI |
| 67 | UMEKO OSAKA | | | NEW | | 2019-11-12.pdf | 2019-11-122019-11-12.pdf | 11 | 12... | YAMADA |
| 66 | TARO UMEDA | | | NEW | | 2019-11-11 DESIGN ESTIMATION SHEET.pdf | 2019-11-12.pdf | | 12... | SATOH |
| 65 | HANAKO TOKKYO | | | NEW | | 2019-11-11.pdf | 2019-11-11ESTIMATION SHEET.pdf 2019-11-11PROPOSED DESIGN 2019-11-12.pdf | | 12... | KATOH |
| 64 | ICHIRO SATO | | | NEW | | 2019-11-07.pdf | | | 12... | ISHII |
| 63 | JIRO SUZUKI | | | NEW | | 2019-11-07.pdf | | | 12... | ITOH |
| 62 | TARO TOKKYO | | | NEW | | 2019-11-07.pdf | | | 12... | ISHIHARA |
| 61 | ICHIRO JITSUYO | | | NEW | | 2019-10-102019-10-10DESIGN.pdf | | | 12... | YAMAMOTO |

FIG.17

APPLICATION LIST

| ID | APPLICATION NAME | SETTING | APPLICATION GROUP | STATUS | NUMBER OF RECORDS | NUMBER OF FIELDS | NUMBER API REQUESTS PER DAY | CUSTOMIZE | CREATOR | LAST UPDATE PERSON | LAST UPDATE DATE AND TIME |
|---|---|---|---|---|---|---|---|---|---|---|---|
| 2575 | SCAN REGISTRATION | ⚙ | Public | BEFORE STARTING OPERATION | 0 | 0 | 0 | YES | ⌂.... | ⌂.... | |
| 2852 | ○○○○ | ⚙ | Public | BEFORE STARTING OPERATION | 0 | 0 | 0 | NO | ⌂.... | ⌂.... | 2019-11-29 3:01PM |
| 2850 | ×××× | ⚙ | Public | DURING OPERATION | 9 | 4 | 0 | NO | ⌂.... | ⌂.... | 2019-11-29 2:36PM |
| 2846 | △△△△ | ⚙ | Public | DURING OPERATION | 1 | 11 | 0 | NO | ⌂.... | ⌂.... | 2019-11-28 9:58AM |
| 2848 | □□□□ | ⚙ | Public | DURING OPERATION | 3 | 10 | 0 | NO | ⌂.... | ⌂.... | 2019-11-26 5:09PM |
| 2847 | ◇◇◇◇ | ⚙ | Public | DURING OPERATION | 2 | 2 | 0 | NO | ⌂.... | ⌂.... | 2019-11-25 10:38AM |
| 2845 | ○○×× | ⚙ | Public | DURING OPERATION | 1 | 2 | 0 | NO | ⌂.... | ⌂.... | 2019-11-25 10:15AM |
| 2844 | ××○○ | ⚙ | Public | BEFORE STARTING OPERATION | 0 | 0 | 0 | NO | ⌂.... | ⌂.... | 2019-11-22 2:58PM |
| 2843 | ○○△△ | ⚙ | Public | DURING OPERATION | 0 | 32 | 0 | NO | ⌂.... | ⌂.... | 2019-11-21 3:52PM |
| 2820 | ○○□□ | ⚙ | Public | DURING OPERATION | 4 | 10 | 0 | NO | ⌂.... | ⌂.... | 2019-11-21 2:00PM |
|  |  |  |  |  |  |  |  |  |  |  | 2019-11-19 3:06PM |

1-500/AMONG 971 CASES

```
REGISTER NEW RECORD

* ARE ESSENTIAL ITEMS
EXTERNAL SERVICE SETTING
                          /331
EXTERNAL SERVICE   EXTERNAL SERVICE SYSTEM A
                       /332
EXTERNAL SERVICE
       ACCOUNT*  [SELECT USER ∨] HANAKO TOKKYO

DEFAULT PARAMETER SETTING

App ID*  [2575]                    /333

Guest Space ID [        ]              /334

FIELD CODE FOR STORING
    CHARACTER STRING*  [9]                /335
```

FIG.30

| Label | Value | Ref |
|---|---|---|
| INPUT VALUE OF CHARACTER STRING FIELD | 12345 | 336 |
| FIELD CODE FOR REGISTERING SCANNED FILE* | 7 | 337 |
| REPORT DESTINATION MAIL ADDRESS WHEN ERROR HAS OCCURRED* | demo@email.com | 338 |
| MAIL SUBJECT WHEN ERROR HAS OCCURRED* | ERROR REPORT NEW RECORD REGISTRATION | 339 |
| OCR LANGUAGE (OCR CANNOT BE PERFORMED ON TIFF/JPEG) | JAPANESE ⌄ | 340 |
| OUTPUT FILE FORMAT | PDF ⌄ | 341 |
| REMOVE BLANK SHEET | ON ⌄ | 342 |
| FILE NAME | FILE NAME | 343 |
| | ☑ SET INITIAL VALUE TO TODAY WHEN FILE NAME IS NOT INPUT | |
| DATE LABEL | CALENDAR | 344 |

FIG.34

REGISTER IN EXISTING RECORD

* ARE ESSENTIAL ITEMS

EXTERNAL SERVICE SETTING — 331

EXTERNAL SERVICE  EXTERNAL SERVICE SYSTEM A

EXTERNAL SERVICE ACCOUNT*  [SELECT USER ∨] — 332
USER IS NOT SELECTED.

Field Code For Browse*  [2] — 352

Guest Space ID  [ ] — 334

App ID*  [2576] — 333

Record ID*  [SELECT FOLDER ∨] — 353
RECORD CANNOT BE ACQUIRED.
PLEASE CONFIRM EXTERNAL SERVICE SETTING OR RESET SERVICE COOPERATION.

SHARED SETTING

DEFAULT SCREEN OF FOLDER BROWSE  [LIST SCREEN ∨]
DEFAULT LAYOUT OF FOLDER BROWSE  [2 ROWS ∨] — 354

DEFAULT PARAMETER SETTING

VALUE OF FIELD FOR STORING CHARACTER STRING  [ ]

370

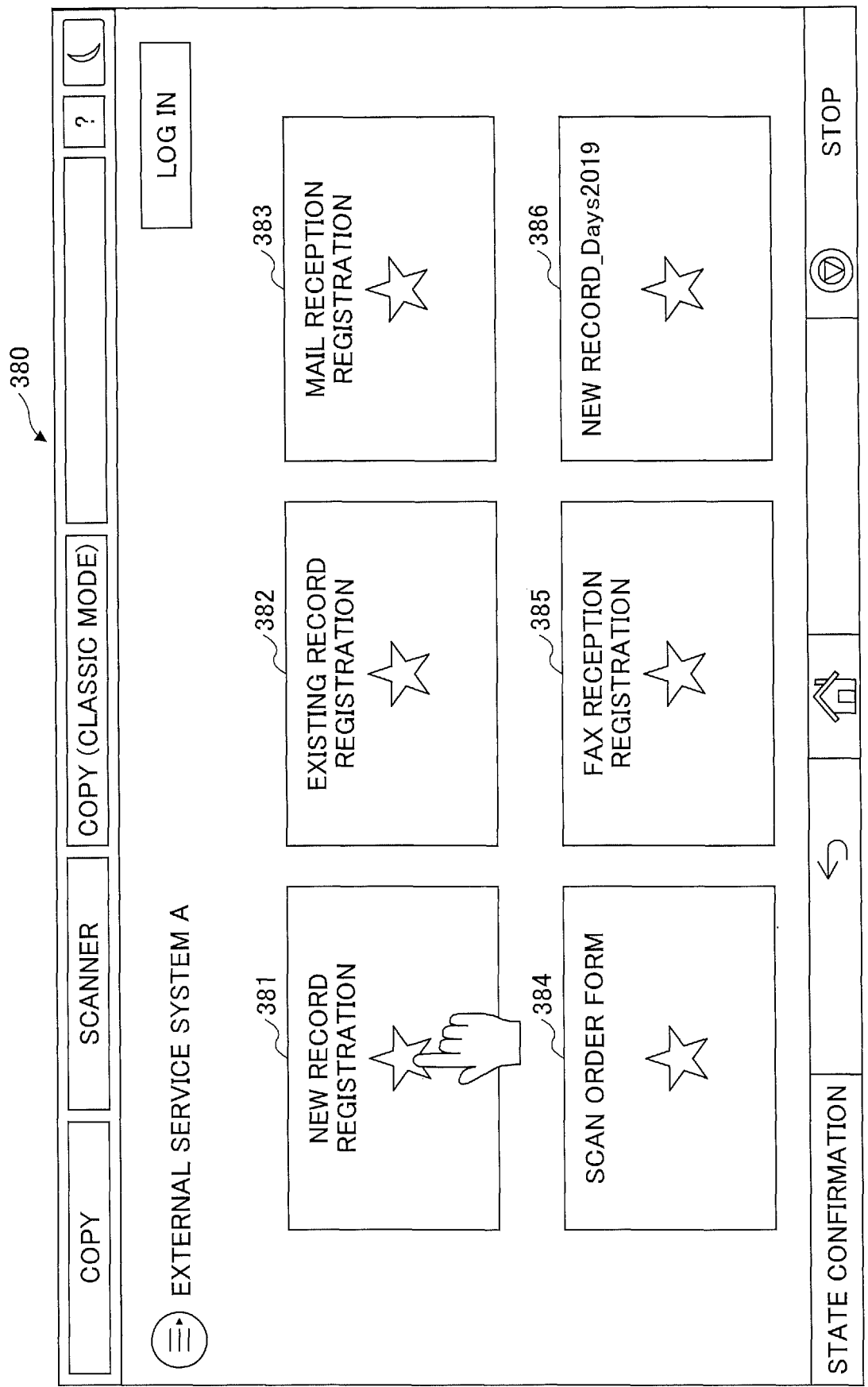

FIG.43

NEW RECORD REGISTRATION

| ITEM NAME | RECORD NUMBER | CUSTOMER NAME | TELEPHONE NUMBER | CASE STATUS | NEW/ ADDITION | DELIVERY DATE | DESIGN REQUEST | PROPOSED DESIGN | FIXED CHARACTER STRING | NUMERICAL VALUE |
|---|---|---|---|---|---|---|---|---|---|---|
| FIELD CODE | 1 | 2 | 3 | 4 | 5 | 6 | 7 | 8 | 9 | 10 |

FIG.46

| RECORD NUMBER | CUS-TOMER NAME | TELE-PHONE NUMBER | CASE STATUS | NEW/ ADDITION | DELIVERY DATE | DESIGN REQUEST | PROPOSED DESIGN | FIXED CHAR-ACTER STRING | NUMER-ICAL VALUE | PERSON IN CHARGE OF CASE |
|---|---|---|---|---|---|---|---|---|---|---|
| 70 | | | | NEW | | 2019-11-12 DESIGN ESTIMATION SHEET.pdf | | | 12... | taro |
| 69 | | | PREPARING FOR SHIPMENT | NEW | 2019-11-14 | 2019-11-12 DESIGN.pdf | | | 12... | SUZUKI |
| 67 | UMEKO OSAKA | | | NEW | | 2019-11-12.pdf | 2019-11-12 2019-11-12.pdf | 11 | 12... | YAMADA |
| 66 | TARO UMEDA | | | NEW | | 2019-11-11 DESIGN ESTIMATION SHEET.pdf | 2019-11-12.pdf | | 12... | SATOH |
| 65 | HANAKO TOKKYO | | | NEW | | 2019-11-11.pdf | 2019-11-11ESTIMATION SHEET.pdf 2019-11-11PROPOSED DESIGN PROPOSED DESIGN.pdf 2019-11-12.pdf | | 12... | KATOH |
| 64 | ICHIRO SATO | | | NEW | | 2019-11-07.pdf | | | 12... | ISHII |
| 63 | JIRO SUZUKI | | | NEW | | 2019-11-07.pdf | | | 12... | ITOH |
| 62 | TARO TOKKYO | | | NEW | | 2019-11-07.pdf | | | 12... | ISHIHARA |
| 61 | ICHIRO JITSUYO | | | NEW | | 2019-10-10 2019-10-10DESIGN.pdf | | | 12... | YAMAMOTO |

1-33 (AMONG 33 CASES)

SEARCH IN APPLICATION company.ExService_A.com/2575/

FIG.47

☐ FAX RECEPTION REGISTRATION ~410

* ARE ESSENTIAL ITEMS
EXTERNAL SERVICE SETTING

EXTERNAL SERVICE  EXTERNAL SERVICE SYSTEM A ~331
EXTERNAL SERVICE ACCOUNT* [SELECT USER ∨] HANAKO TOKKYO ~332

DEFAULT PARAMETER SETTING

App ID* [2579] ~333

Guest Space ID [ ] ~334

FIELD CODE FOR REGISTERING FAX NUMBER [FAX NUMBER] ~491

FIELD CODE FOR REGISTERING IMAGE DATA [FAX DATA] ~492

FIELD CODE FOR REGISTERING RECEPTION DATE AND TIME [RECEPTION DATE AND TIME] ~493

FIELD CODE FOR REGISTERING FIXED CHARACTER STRING* [TYPE] ~335

RETURN TO Top/RETURN TO APPLICATION MANAGEMENT (?) HANAKO TOKKYO >

US 11,310,372 B2

SERVICE PROVIDING SYSTEM, INFORMATION PROCESSING SYSTEM, AND INFORMATION PROCESSING METHOD FOR TRANSMITTING DATA TO APPLICATION WITH AUTHORITY TO STORE IN EXTERNAL SERVICE SYSTEM

CROSS-REFERENCE TO RELATED APPLICATION

The present application is based on and claims priority under 35 U.S.C. § 119 to Japanese Patent Application No. 2019-239918, filed on Dec. 27, 2019, and Japanese Patent Application No. 2020-034342, filed on Feb. 28, 2020, the contents of which are incorporated herein by reference in their entirety.

BACKGROUND OF THE INVENTION

1. Field of the Invention

The present invention relates to a service providing system, an information processing system, and an information processing method.

2. Description of the Related Art

A technology referred to as a web application is known, in which a service provided on a network is used by a terminal apparatus in a web browser, etc. This service can also be used from a device such as an image forming apparatus. For example, there is known a service providing system that stores image data, generated by scanning a document (original document) by an image forming apparatus, in an external storage service, or that prints the image data.

In the service providing system, the user can make settings in advance relating to the use of the device, in order to reduce the load when the user uses the service from the device (see, for example, Patent Document 1). Patent Document 1 describes a technique in which an information processing system accepts a default value and the like of a print setting set by a user with respect to an application setting screen.

Patent Document 1: Japanese Unexamined Patent Application Publication No. 2017-076368

SUMMARY OF THE INVENTION

According to one aspect of the present invention, there is provided a service providing system including a device and an information processing system configured to transmit, to an external service system, data relating to a first application for which an execution request is given by the device, wherein the information processing system includes first processing circuitry; and a first memory storing computer-executable instructions that cause the first processing circuitry to control to store each user of the information processing system and each user of the external service system in association with each other, and wherein the device includes second processing circuitry; and a second memory storing computer-executable instructions that cause the second processing circuitry to accept a specification of the first application and a user of the information processing system; acquire data for which a user of the external service system, associated with the specified user of the information processing system, has an authority, among the data relating to the first application included in the external service system; control to display a first screen configured to accept a selection of one piece of data from the acquired data for which the user of the external service system has the authority; accept the one piece of data for which the selection is accepted via the first screen; and request the external service system to store information acquired by the device in association with the accepted one piece of data.

BRIEF DESCRIPTION OF THE DRAWINGS

FIGS. 1A and 1B are diagrams illustrating the overall operation of a service providing system according to an embodiment of the present invention;

FIG. 7 is a diagram illustrating an example of application process information stored in an application process information storage unit according to an embodiment of the present invention;

FIG. 8 is a diagram illustrating another example of application process information according to an embodiment of the present invention;

FIG. 11 is a diagram illustrating an example of a cooperation destination application registration screen (part 1) displayed by a terminal apparatus according to an embodiment of the present invention;

FIG. 17 is a diagram illustrating an example of a cooperation destination application list screen displayed by the terminal apparatus according to an embodiment of the present invention;

FIG. 18 is a diagram illustrating an example of an authority setting screen for the authority information for a record according to an embodiment of the present invention;

FIG. 29 is a diagram illustrating an example of a cooperation source application setting screen (part 1) displayed by the terminal apparatus when the cooperation source application for "new record registration" is selected according to an embodiment of the present invention;

FIG. 30 is a diagram illustrating an example of a cooperation source application setting screen (part 2) displayed by a terminal apparatus according to an embodiment of the present invention;

FIG. 34 is a diagram illustrating an example of a cooperation source application setting screen having a record setting field according to an embodiment of the present invention;

FIG. 35 is a diagram illustrating an example of a cooperation source application list screen displayed by the device according to an embodiment of the present invention;

FIG. 43 is a diagram illustrating an example of a field code list displayed on the cooperation source application setting screen according to an embodiment of the present invention;

FIG. 46 is a diagram illustrating an example of a cooperation destination application registration screen in which the person in charge of the case is registered according to an embodiment of the present invention;

FIG. 47 is a diagram illustrating an example of a cooperation source application setting screen of "fax reception registration" displayed by the terminal apparatus according to an embodiment of the present invention;

DETAILED DESCRIPTION OF THE PREFERRED EMBODIMENTS

Figure 2:
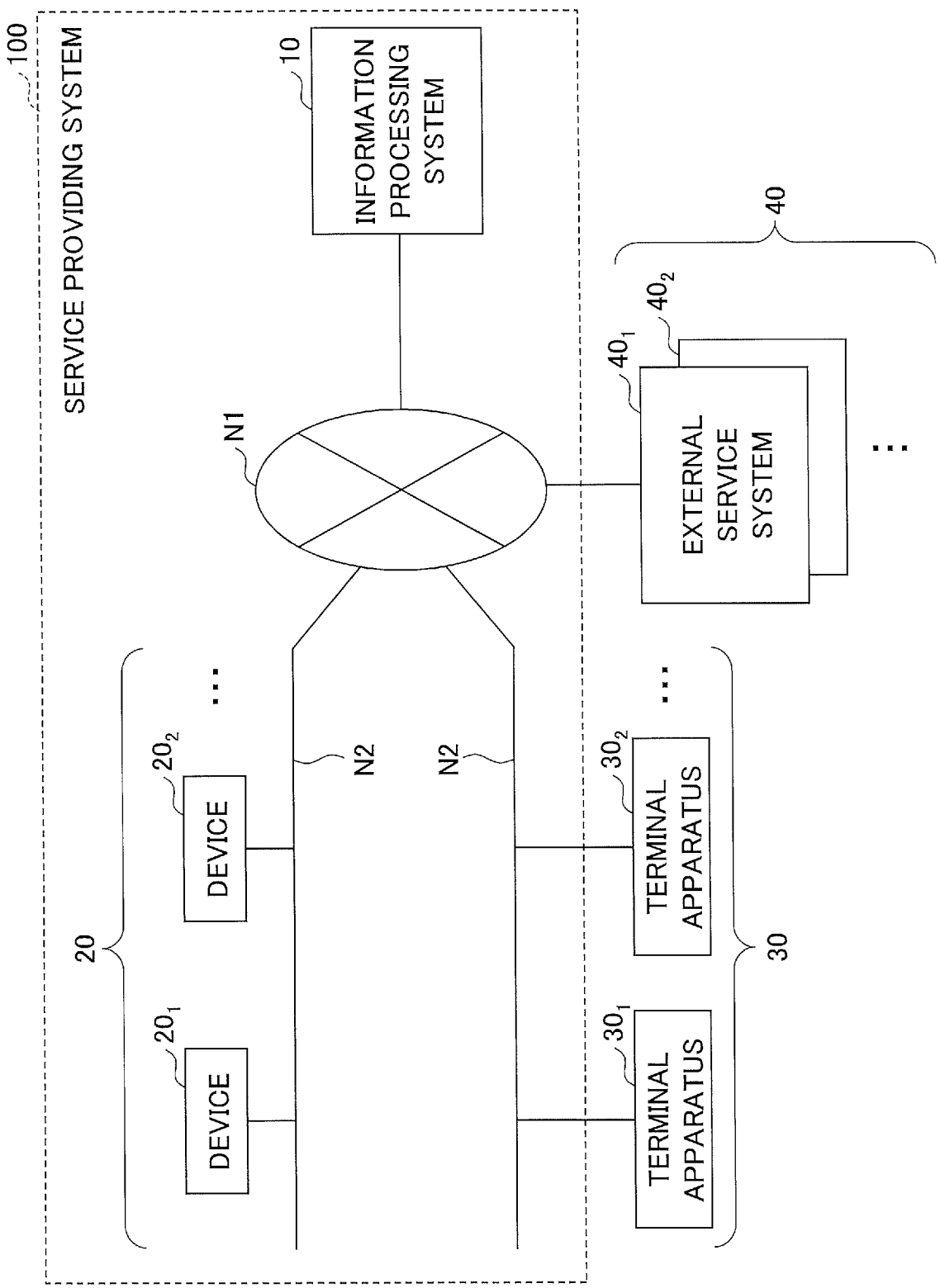
FIG. 2 is a diagram illustrating an example of a system configuration of a service providing system according to an embodiment of the present invention.

There has been a problem that the conventional service providing system is unable to accept, from the device, settings relating to an external service system. That is, in the conventional service providing system, even though a user is able to make settings relating to an external service system from a web page displayed on the terminal apparatus, the user is unable to make settings relating to the external service system from the device at the time of executing the web application.

A problem to be addressed by an embodiment of the present invention is to provide a service providing system, etc., that is able to accept, from a device, settings relating to an external service system.

Hereinafter, as an example of an embodiment of the present invention, a service providing system and an information processing method executed by the service providing system and will be described in detail with reference to the drawings.

<Outline of Operation>

First, an outline of a process performed by a service providing system 100 will be described with reference to FIGS. 1A and 1B. FIGS. 1A and 1B are diagrams illustrating the overall operation of the service providing system 100. FIG. 1A illustrates an operation of a preparatory stage in which the administrator and the like makes settings for a cooperation source application (an example of a first application) and a cooperation destination application (an example of a second application) for using the service providing system 100, and FIG. 1B illustrates an operation of an execution stage in which the user executes the cooperation source application and the cooperation source application cooperates with the cooperation destination application.

Hereinafter, the term "user" refers to a general user, and the term "administrator" refers to a tenant administrator. A tenant is a company or an organization that has made a contract to receive services from a service provider (the information processing system in the present embodiment). A user belongs to a tenant as an example, but the user may individually subscribe to the service. When a user individually subscribes to a service, the user inputs a setting to associate the cooperation source application with the cooperation destination application from a cooperation source application setting screen.

With respect to processes by the administrator, some of these processes may be performed by a person in charge such as a vendor, a dealer, and the like who promotes subscriptions to the services provided by the service providing system 100 to tenants, or sells applications provided by the service providing system 100. In some cases, it may be possible for the user to perform the processes performed by the administrator.

(1) The administrator causes a terminal apparatus 30 to communicate with an external service system 40 and displays a cooperation destination application registration screen provided by the external service system 40. The external service system 40 provides a service used in the form of a web application. The overall content of the function provided by this service is predetermined, but the administrator can customize the service to use the service as a desired cooperation destination application. That is, a part of (or all of) the functions of the service becomes a cooperation destination application.

(2) The administrator combines forms (which are components of functions) provided by the external service system 40 and registers a cooperation destination application suitable for the tenant's business. When the administrator combines the forms and makes the necessary settings, the terminal apparatus 30 registers the cooperation destination application in the external service system 40.

(3) The external service system 40 assigns, to the cooperation destination application, a cooperation destination application ID (an example of identification information of the second application) identifying the cooperation destination application, and transmits the cooperation destination application ID to the terminal apparatus 30. The terminal apparatus 30 displays the cooperation destination application ID, and, therefore, the administrator can recognize the cooperation destination application ID. In the embodiment described below, the administrator may cause the terminal apparatus 30 to display the cooperation destination application ID via an information processing system 10.

(4) Next, the administrator operates the terminal apparatus 30 to cause the terminal apparatus 30 to communicate with the information processing system 10, and the terminal apparatus 30 displays a cooperation source application setting screen provided by the information processing system 10. The information processing system 10 is a server that accepts the registration and execution of a cooperation source application to be executed by a device such as an image forming apparatus. The information processing system 10 provides a service to a user in cooperation with the cooperation destination application of the external service system 40. The information processing system 10 may cooperate with a variety of the external service systems 40, and may further cooperate with various cooperation destination applications provided by the particular external service system 40 to provide various services to the user. As described with reference to FIG. 1B, the service of the information processing system 10 is used as a cooperation source application from a device such as an image forming apparatus.

(5) The administrator sets the cooperation information including the cooperation destination application ID on the cooperation source application setting screen. The cooperation information will be described later, but this is information for the information processing system to cooperate with a cooperation destination application registered in the external service system 40. In addition to the cooperation destination application ID, a field code is preferably set. A field code is identification information for identifying a field in the case of an application in which the cooperation destination application operates a database. The terminal apparatus 30 transmits the cooperation information to the information processing system 10. Accordingly, in the information processing system 10, a cooperation source application that cooperates with the cooperation destination application is associated with the cooperation destination application.

(6) By the above-described process, the information processing system 10 will be in a state in which the information processing system 10 can cooperate with the cooperation destination application of the external service system 40 identified by the cooperation destination application ID. The information processing system 10 may acquire, from the external service system 40, a value of a particular field by the field code.

It is assumed that the user wishes to use the registered cooperation destination application. As illustrated in FIG. 1B, the user operates the image forming apparatus to display a cooperation source application list screen. The user selects a cooperation source application that uses the above cooperation destination application. By selecting the cooperation source application, the cooperation destination application ID is identified. For example, a case where the cooperation source application referred to as "existing record registration" executes the following process, will be described.

(i) Scan a document (original document) to generate image data.

(ii) The image forming apparatus transmits the image data to the information processing system 10.

(iii) The information processing system 10 transmits a processing request to process the image data, to the external service system 40.

(7) A device 20, such as the image forming apparatus, displays a setting screen for "existing record registration". In FIG. 1B, values of fields (list of records) specified by field codes of the respective records of the cooperation destination applications, are displayed. The user can confirm the value of the field (here, the "customer name") and select which record is to be used for storing the image data.

(8) When a record is selected, the device 20 scans a document to generate image data, and transmits the generated image data together with the cooperation destination application ID, the field code, and a record ID, to the information processing system 10.

(9) The information processing system 10 specifies the cooperation destination application ID, the field code, and the record ID and transmits the image data to the external service system 40. Accordingly, cooperation with the cooperation destination application by the cooperation source application, is enabled.

(10) The external service system 40 accepts the image data as a processing target, with respect to a record identified by the record ID, of a field identified by the field code, of a cooperation destination application identified by the cooperation destination application ID.

When image data becomes the processing target of the cooperation destination application, this means that the image data will be processed by the cooperation destination application. Accordingly, the process content will vary depending on the cooperation destination application. For example, the image data may be converted into a data format to be processed by the cooperation destination application, the image data may be stored in a state in which the type of the image data is managed by assigning some attribute to the image data, image processing may be performed on the image data, the image data may be transferred to the outside, or the image data may be provided in response to a request. Further, the cooperation source application or a module of the service providing system may perform a process on the image data, such as converting the image data into a data format, storing the image data in a state where the type, etc., of the image data is managed by assigning some attribute to the image data, image processing is performed on the image data, and the like, and the image data that has undergone the process may be transferred to the cooperation destination application.

As described above, the service providing system 100 according to the present embodiment accepts, from the cooperation source application setting screen, a setting (the cooperation information) for the information processing system 10 to cooperate with the external service system 40. When the information processing system 10 accepts a request to execute the cooperation source application from the device 20, the device 20 displays a record setting screen and accepts a setting (for example, the selection of a record) relating to the external service system. The information processing system 10 receives (accepts) a setting relating to the external service system and image data and the like from the device 20. The information processing system 10 becomes capable of cooperating with the cooperation destination application of the external service system 40 according to the setting accepted at the cooperation source application setting screen and the setting (for example, a selection of a record) relating to the external service system received from the device 20.

<Terminology>

The setting relating to the external service system is a setting relating to data processing in the external service system. For example, in the present embodiment, a setting is made to specify which record in the external service system is to be used to store data. The user can also set a field code from the device. Further, the cooperation destination application ID can be identified at the time point when the user selects the cooperation source application.

When the content of a process by the external service system differs depending on the field, the setting relating to the external service system may be defined as a setting that specifies the process content.

Cooperation means that two or more parties cooperate with each other to execute a process. According to the present embodiment, the cooperation source application of the information processing system 10 cooperates with a cooperation destination application of the external service system 40, to provide a service by the information processing system 10.

Cooperation information is information for the information processing system 10 to cooperate with the external service system 40. In the present embodiment, the cooperation destination application ID for using a service provided by the external service system 40 is an example of the cooperation information. Cooperation information may also include a field code (identification information of a field) or a record ID (identification information of a record). The field code can also be a column ID for specifying a column in the database.

The field represents a column in tabular data held by the cooperation destination application, and examples of fields are the columns of the table illustrated in FIG. 11.

A record is a row in tabular data held by the cooperation destination application, and examples of records are the rows of the table illustrated in FIG. 11.

The cooperation source application is an application for providing a service to the device 20 included in the service providing system by the information processing system 10. A server and a client on the network can communicate with each other to perform data processing, and the client can use the result of the data processing. Such an application can be provided as a web application. A server is a computer or software that functions to provide information or processing results in response to a client's request. A screen that a client acquires from a server and displays, may be referred to as a web page. Further, the cooperation source application is not limited to a web application, but may be provided as a native application. A cooperation source application, which is a native application, may be downloaded from the information processing system 10 by the device 20 and executed by the device 20, so that the device 20 and the information processing system 10 can transmit and receive data such as image data. When the cooperation source application is a native application, the device may acquire the cooperation source application from an apparatus or a system that is different from the information processing system 10. For example, the device 20 may acquire a cooperation source application from an application providing server and the like.

The information processing system 10 provides a service, and one of the means for providing the service is the execution of a cooperation source application. In the execution of the cooperation source application, there may be (or may not be) cases of cooperating with a cooperation destination application provided by the external service system 40. The service according to the cooperation source application is implemented by a method of sequentially executing a series of processes, and, therefore, the content and the sequential order of the series of processes are defined in the cooperation source application.

The external service system 40 also provides a service, and one of the means of providing a service is the execution of a cooperation destination application. The external service system 40 can provide a service to the user without cooperating with the information processing system 10. However, in this case, the cooperation destination application provided by the external service system 40 is a web application provided according to the communication of a server and a client. The service providing system 100 according to the present embodiment enables a cooperation destination application of the external service system 40 that can be used by a user from the terminal apparatus 30 and the like, to be used from the device 20 via the information processing system 10.

The service of the external service system 40 is referred to as a cooperation destination application, and may also be referred to as a program, software, a site, and the like. That is, the cooperation destination application may not be referred to as an application, and may be anything relating to a service of the external service system 40.

The database is an assembly of organized pieces of information. In the database, information can be stored, searched, updated, and the like. As types of databases, there are a relational-type database, a hierarchical-type database, or a network-type database, but the database may be of any type as long as a value can be stored with respect to an item. In the present embodiment, an item is described by the term "field". The setting relating to an item where the data is stored refers to the setting of the field where the data is stored.

For operating the data in a database, an application is often used. In the present embodiment, the cooperation destination application operates a database. Operation refers to the storing, the searching, and the updating of information.

The user means a so-called end user on the customer side, and means a person who uses the device 20, including the cooperation source application. The administrator is a person who registers a cooperation destination application and a cooperation source application so that the user can use the cooperation source application, and is mainly the administrator on the customer side (the tenant side). However, it is not necessary to clearly distinguish between the user and the administrator, and in the present embodiment, the user and the administrator are distinguished merely as a matter of convenience.

<System Configuration>

First, a system configuration of the service providing system 100 according to the present embodiment will be described with reference to FIG. 2. FIG. 2 is a diagram illustrating an example of a system configuration of the service providing system 100 according to the present embodiment.

The service providing system 100 illustrated in FIG. 2 includes the information processing system 10 and the device 20, and is communicatively connected via a wide area network N1 such as the Internet. The service providing system 100 communicates with the external service system 40, which is an external system.

The information processing system 10 is implemented by one or more information processing apparatuses and provides various services implemented by a series of processes in cooperation with the external service system 40 such as a cloud service via the network N1. A specific example of the service provided by the information processing system 10 according to the present embodiment will be described later. The information processing system 10 may be implemented by cloud computing or by a single information processing apparatus. Cloud computing is a form of use in which resources on a network are used without considering specific hardware resources. The information processing system 10 may be present on the Internet or on-premises. A series of processes is provided by a single cooperation source application, and a series of processes is also referred to a "process flow" or a "workflow".

The device 20 may be a variety of electronic devices used by the user. The device 20 may be, for example, an image forming apparatus such as a Multifunction Peripheral (MFP), a personal computer (PC), a projector, an electronic blackboard, a digital camera, and the like. The device 20 is connected to a network N2. The user may use the device 20 to use various services provided by at least one of the information processing system 10 and the external service system 40.

Hereafter, when distinguishing each of the plurality of the devices 20, a subscript is appended, such as the "device $20_1$" and the "device $20_2$".

The terminal apparatus 30 may be, for example, a desktop PC, a notebook PC, a smartphone, a tablet terminal, and the like used by the administrator or the user. The terminal apparatus 30 is connected to network N2. The administrator or the user may operate the terminal apparatus 30 to use various services provided by the information processing system 10 or the external service system 40, and to make settings with respect to the cooperation destination application or the cooperation source application.

Hereinafter, when distinguishing each of the plurality of the terminal apparatuses 30, a subscript is appended, such as the "terminal apparatus $30_1$", the "terminal apparatus $30_2$", and the like.

The external service system 40 is one or more information processing apparatuses that provide services by executing a cooperation destination application via the network N1. By the execution of the cooperation destination application, data is managed or processed, and the data per se or the processing result becomes the service.

An example of an external service system 40 may be, for example, a cloud service, an Application Service Provider (ASP), and the like, and may include a variety of external services provided via the network. In the present embodiment, a tabular database will be described as an example of a service. The external service system 40 may be present on the Internet or on-premises.

Hereinafter, when distinguishing each of the plurality of the external service systems 40, the "external service system $40_1$," illustrated in the figure is described as the external service system A, and the "external service system $40_2$," illustrated in the figure is described as the external service system B, etc.

<Example of Hardware Configuration>

Figure 3:
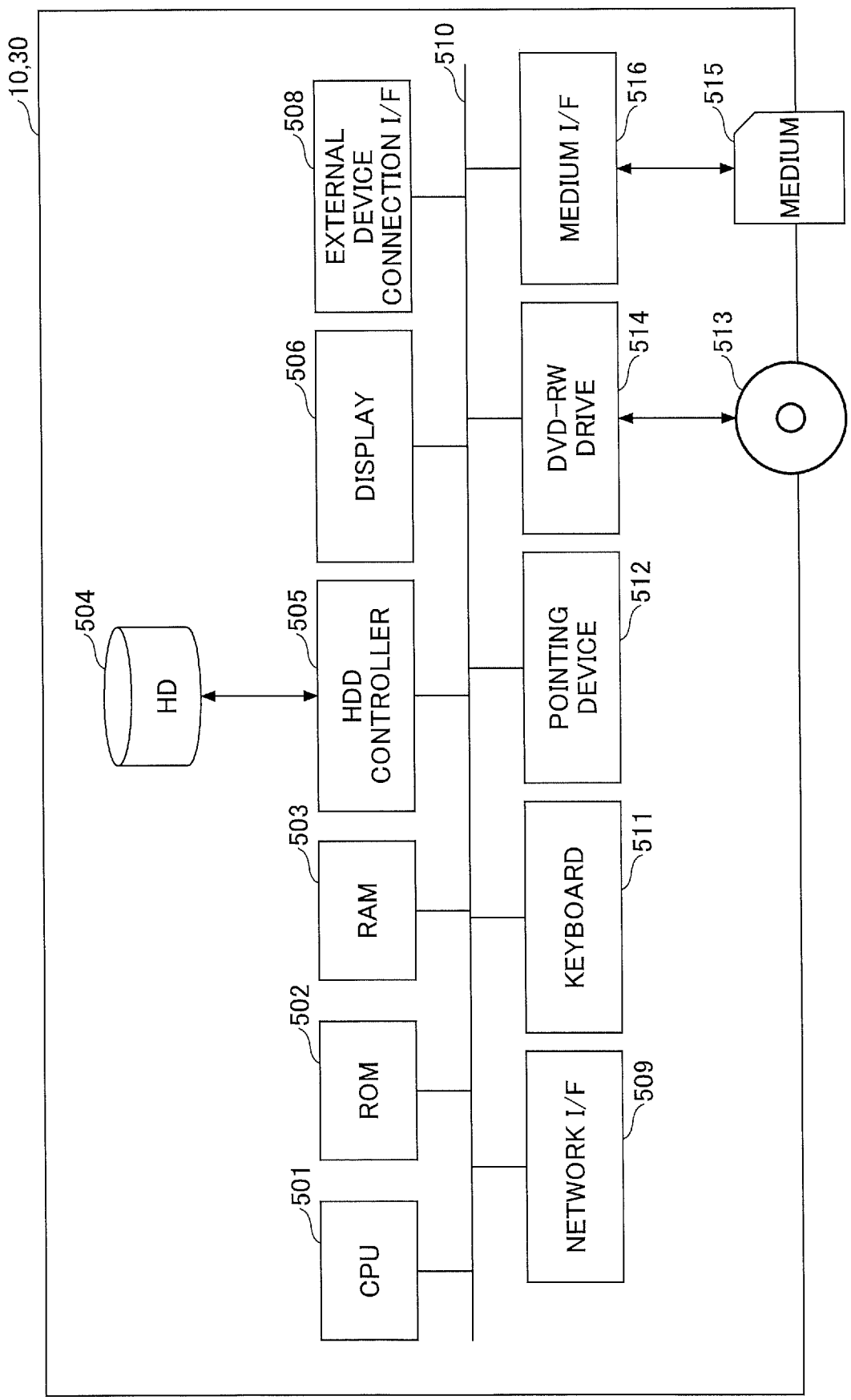
FIG. 3 is a hardware configuration diagram illustrating an example of an information processing system and a terminal apparatus according to an embodiment of the present invention.

Referring to FIG. 3, the hardware configuration of the information processing system 10 and the terminal apparatus 30 included in the service providing system 100 according to the present embodiment will be described.

<<Information Processing System and Terminal Apparatus>>

As illustrated in FIG. 3, the Information processing system 10 and the terminal apparatus 30 are constructed by a computer and includes a central processing unit (CPU) 501, a read-only memory (ROM) 502, a random access memory (RAM) 503, a hard disk (HD) 504, a Hard Disk Drive (HDD) controller 505, a display 506, an external device connection interface (I/F) 508, a network I/F 509, a bus line 510, a keyboard 511, a pointing device 512, a Digital Versatile Disk Rewritable (DVD-RW) drive 514, and a medium I/F 516, as illustrated in FIG. 3.

Among these, the CPU 501 controls the operations of the entire Information processing system 10 and the terminal apparatus 30. The ROM 502 stores a program used to drive the CPU 501, such as an Initial Program Loader (IPL). The RAM 503 is used as the work area of the CPU 501. The HD 504 stores various kinds of data such as a program. The HDD controller 505 controls the reading or writing of various kinds of data to the HD 504 according to the control of the CPU 501. The display 506 displays various kinds of information such as a cursor, menus, windows, characters, or images. The external device connection I/F 508 is an interface for connecting various external devices. In this case, the external device may be, for example, a Universal Serial Bus (USB) memory or a printer. The network I/F 509 is an interface for performing data communication using the communication network N2. The bus line 510 is an address bus, a data bus, and the like for electrically connecting elements such as the CPU 501 illustrated in FIG. 3.

The keyboard 511 is a type of input means including a plurality of keys for inputting characters, numbers, various instructions, and the like. The pointing device 512 is a type of input means for selecting and executing various instructions, selecting a processing target, moving a cursor, and the like. The DVD-RW drive 514 controls the reading or writing of various kinds of data to a DVD-RW 513 as an example of a removable recording medium. The recording medium is not limited to a DVD-RW, but may be a Digital Versatile Disc Recordable (DVD-R), etc. The medium I/F 516 controls the reading or writing (storage) of data to a recording medium 515, such as a flash memory.

<<Device>>

Figure 4:
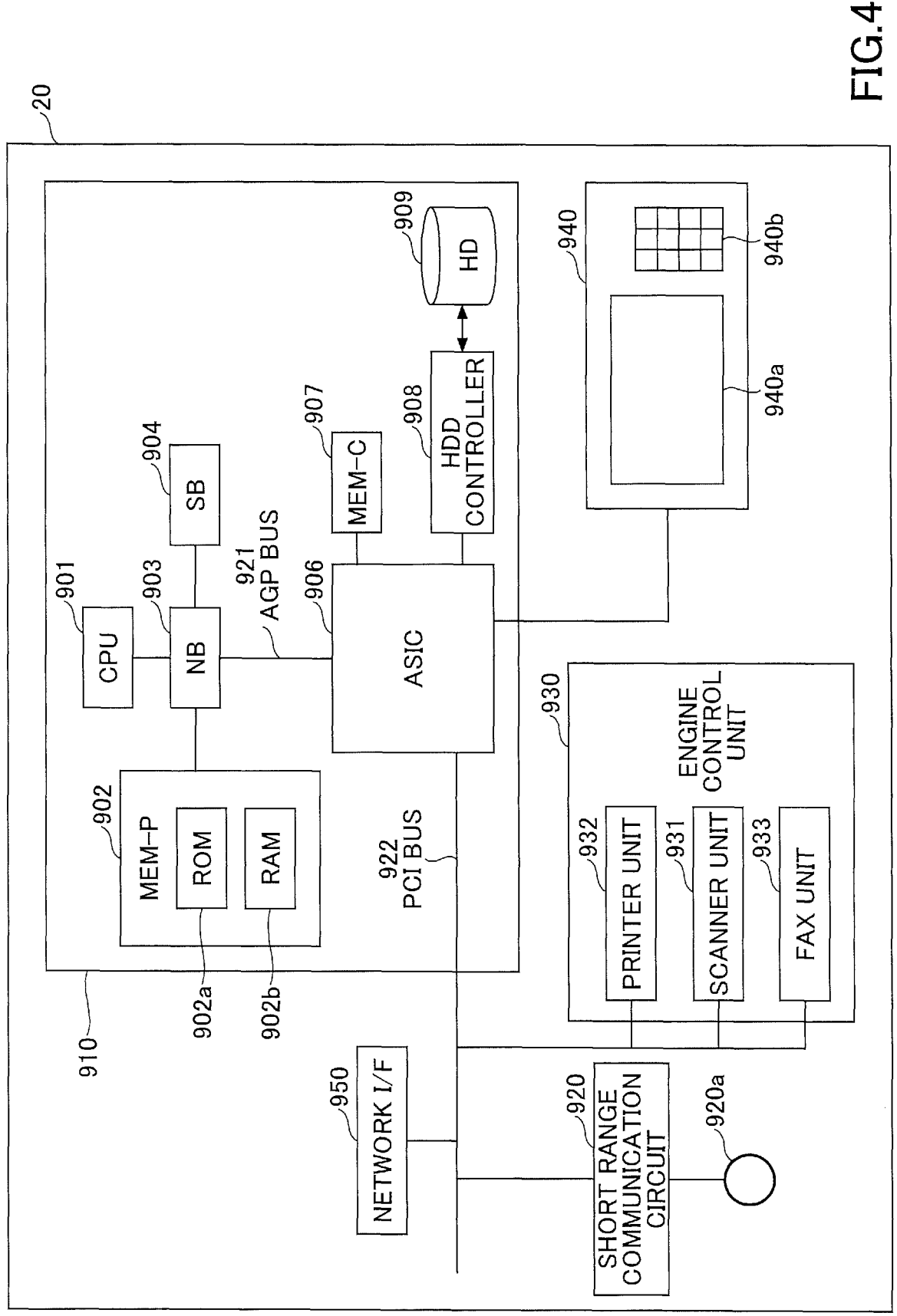
FIG. 4 is a hardware configuration diagram illustrating an example of an image forming apparatus that is an example of a device according to an embodiment of the present invention.

FIG. 4 is a hardware configuration diagram illustrating an image forming apparatus that is an example of the device 20. As illustrated in FIG. 4, the image forming apparatus includes a controller 910, a short range communication circuit 920, an engine control 930, an operation panel 940, and a network I/F 950.

Among these, the controller 910 includes a CPU 901 that is the main unit of the computer, a system memory (MEM-P) 902, a north bridge (NB) 903, a south bridge (SB) 904, an Application Specific Integrated Circuit (ASIC) 906, a local memory (MEM-C) 907 that is a storage unit, an HDD controller 908, and an HD 909 that is a storage unit, and the NB 903 and the ASIC 906 are connected by an Accelerated Graphics Port (AGP) bus 921.

Among these, the CPU 901 is a control unit that performs overall control of the image forming apparatus. The NB 903 is a bridge for connecting the CPU 901 to the MEM-P 902, the SB 904, and the AGP bus 921, and includes a memory controller for controlling reading and writing to the MEM-P 902, a Peripheral Component Interconnect (PCI) master, and an AGP target.

The MEM-P 902 includes a ROM 902a, which is a memory for storing programs and data for implementing the functions of the controller 910, and a RAM 902b, which is used for loading a program or data and for a rendering memory for memory printing. The program stored in the RAM 902b may be configured to be recorded and provided in a computer-readable recording medium such as a compact disk read-only memory (CD-ROM), a CD recordable (CD-R), or a digital versatile disk (DVD), in a file in an installable format or an executable format.

The SB 904 is a bridge for connecting the NB 903 to PCI devices and peripheral devices. The ASIC 906 is an integrated circuit (IC) for image processing applications having hardware elements for image processing, and serves as a bridge connecting the AGP bus 921, the PCI bus 922, the HDD controller 908, and the MEM-C 907, respectively. The ASIC 906 includes a PCI target and AGP master, an arbitrator (ARB) that forms the core of the ASIC 906, a memory controller that controls the MEM-C 907, a plurality of Direct Memory Access Controllers (DMACs) that rotate image data by hardware logic and the like, and a PCI unit that transfers data via the PCI bus 922 between the scanner unit 931, the printer unit 932, and a fax unit. An interface of the Universal Serial Bus (USB) or an interface of the Institute of Electronic and Electronic Engineers 1394 (IEEE 1394) may be connected to the ASIC 906.

The MEM-C 907 is a local memory used as an image buffer for copying and a code buffer. The HD 909 is a storage device for storing image data, storing font data used for printing, and storing forms. The HDD controller 908 controls the reading or writing of data to the HD 909 according to the control of the CPU 901. The AGP bus 921 is a proposed bus interface for graphics accelerator cards to speed up graphics processing, and by directly accessing the MEM-P 902 with high throughput, the graphics accelerator card can be made faster.

The short range communication circuit 920 is provided with an antenna 920a of the short range communication circuit. The short range communication circuit 920 is a communication circuit for communication such as Near Field Communication (NFC), Bluetooth (registered trademark), and the like.

The engine control 930 includes a scanner unit 931, a printer unit 932, and a fax (facsimile) unit 933. The operation panel 940 includes a panel display unit 940a, such as a touch panel, for displaying a current setting value, a selection screen, and the like, for accepting input from an operator, and hard keys 940b, such as a numeric pad for accepting a setting value of an image forming condition, such as a density setting condition, and a start key for accepting a copy start instruction. The controller 910 controls the entire image forming apparatus and controls, for example, rendering, communication, input from the operation panel 940, and the like. The scanner unit 931 or the printer unit 932 includes an image processing function such as error diffusion or gamma conversion.

In the image forming apparatus, the application switching key of the operation panel 940 allows sequential switching of the document box function, the copy function, the printer function, and the fax function, so that one of these functions can be selected. When the document box function is selected, the document box mode is set, when the copy function is selected, the copy mode is set, when the printer function is selected, the printer mode is set, and when the fax function is selected, the fax mode is set.

The network I/F 950 is an interface for performing data communication using the communication network N2. The short range communication circuit 920 and the network I/F 950 are electrically connected to the ASIC 906 via a PCI bus 922.

<Functions>

Figure 5:
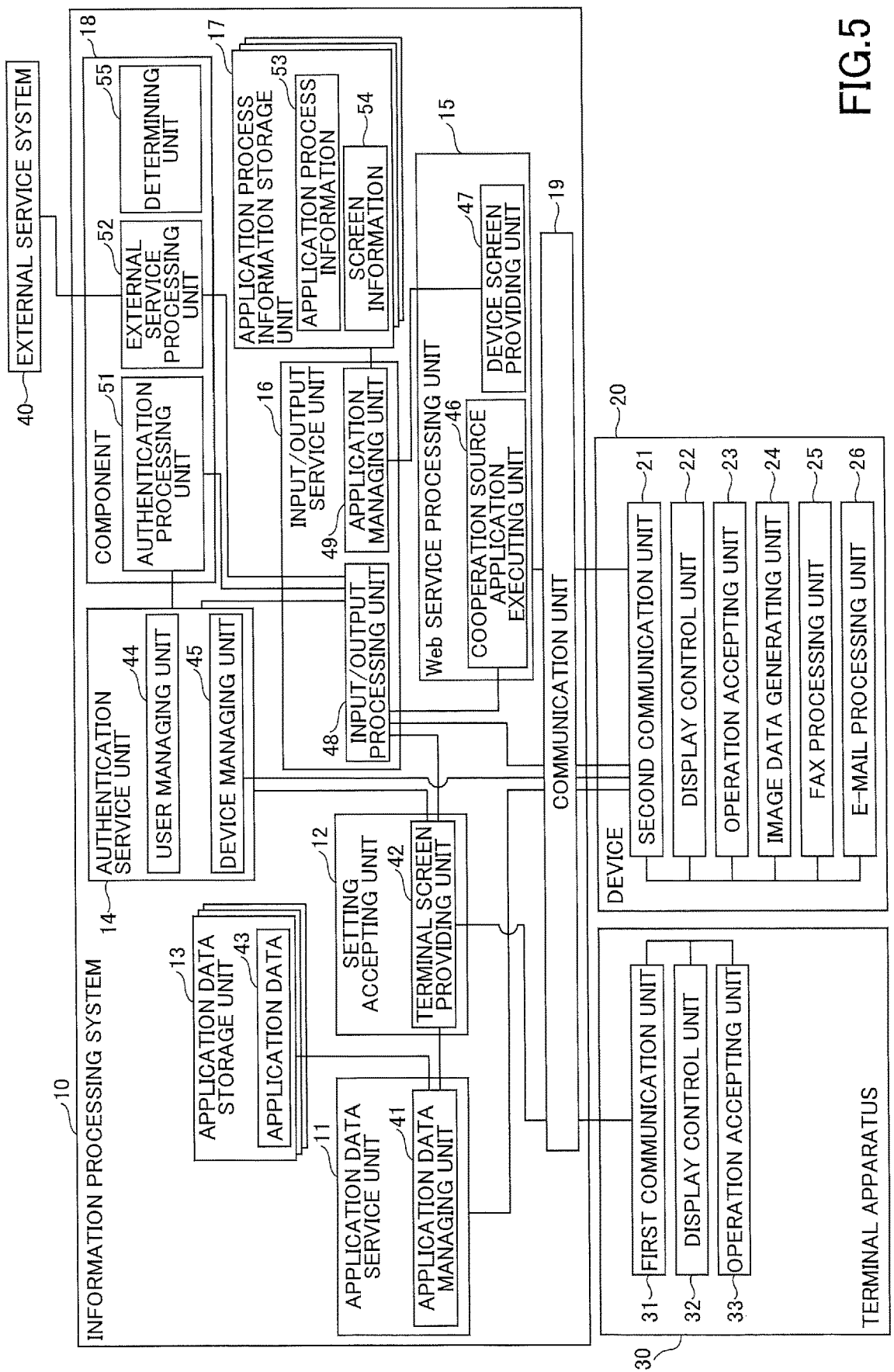
FIG. 5 is a diagram illustrating an example of a functional configuration of a service providing system according to an embodiment of the present invention.

Next, a functional configuration of the service providing system 100 according to the present embodiment will be described with reference to FIG. 5. FIG. 5 is a diagram illustrating an example of a functional configuration of the service providing system 100 according to the present embodiment.

<<Device>>

First, the device 20 includes a second communication unit 21, a display control unit 22, an operation accepting unit 23, an image data generating unit 24, a fax processing unit 25, and an e-mail processing unit 26. Each of these functional units is a function or means which is implemented by the CPU 901 executing instructions included in one or more programs installed in the device 20. For example, the second communication unit 21, the display control unit 22, and the operation accepting unit 23 are implemented by a web browser, and the other units are implemented by individual applications (native applications).

The second communication unit 21 transmits and receives various kinds of information with the information processing system 10. According to the present embodiment, the screen information of a cooperation source application list screen and the like is received from the information processing system 10, and image data, cooperation information, and the like are transmitted to the information processing system 10.

The display control unit 22 interprets the screen information of various screens and displays the screen information on the panel display unit 940a. The operation accepting unit 23 accepts various operations of a user in various screens displayed on the panel display unit 940a.

The image data generating unit 24 scans a document by the scanner unit 931 and generates image data, in a case where the operation accepting unit 23 accepts a selection of a cooperation source application and the selected cooperation source application generates image data. The fax processing unit 25 performs a process related to reception and transmission of a fax by the fax unit 933 and requests the information processing system 10 to execute the cooperation source application which is associated in advance with the fax, when the fax is received. Note that it is possible to request the cooperation source application associated with the transmission source (fax number) of the fax.

The e-mail processing unit 26 performs a process relating to the transmission and reception of an e-mail and requests the information processing system 10 to execute the cooperation source application which is associated in advance with the e-mail when the e-mail is received. Note that it is possible to request the cooperation source application associated with the transmission source (e-mail address) of the e-mail.

<<Terminal Apparatus>>

The terminal apparatus 30 includes a first communication unit 31, a display control unit 32, and an operation accepting unit 33. Each of these functional units is a function or means which is implemented by the CPU 501 executing instructions included in one or more programs installed in the terminal apparatus 30. The program can be a web browser or exclusive-use software.

The first communication unit 31 transmits and receives various kinds of information with the information processing system 10 or the external service system 40. According to the present embodiment, various kinds of screen information and the like are received from the information processing system 10 or the external service system 40, and information set by an administrator or a user is transmitted to the information processing system 10 or the external service system 40.

The display control unit 32 interprets the screen information of various screens and displays the screen information on the display 506. The operation accepting unit 33 accepts various operations of a user in various screens displayed on the display 506.

<<Information Processing System>>

The information processing system 10 includes an application data service unit 11, a setting accepting unit 12, an authentication service unit 14, a web service processing unit 15, an input/output service unit 16, a component 18, and a communication unit 19. Each of these functional units is a function or means which is implemented by the CPU 501 executing instructions included in one or more programs installed in the information processing system 10. In relation to the functions of the information processing system 10 illustrated in FIG. 5, an "application" is a function related to a "cooperation source application" executed by the information processing system 10.

The communication unit 19 transmits and receives various kinds of information with the terminal apparatus 30 and the device 20. The setting accepting unit 12 provides a setting site to the terminal apparatus 30 and accepts a setting relating to the setting site. A site may refer to a web page or a web application (for example, a cooperation source application setting screen) or a system on the server side that provides a web page or a web application to the terminal apparatus 30. The setting accepting unit 12 includes a terminal screen providing unit 42, and the terminal screen providing unit 42 provides a cooperation source application setting screen, etc., that causes an administrator to set information necessary for executing a cooperation source application. The terminal screen providing unit 42 generates screen information described by Hyper Text Markup Language (HTML), eXtensible Markup Language (XML), cascade style sheets (CSS), or JavaScript (registered trademark), in response to a HyperText Transport Protocol (HTTP) request from the terminal apparatus 30, and transmits the screen information to the terminal apparatus 30 as an HTTP response.

The application data service unit 11 includes an application data managing unit 41. The application data managing unit 41 manages application data 43 of the purchased cooperation source application for each tenant. The application data 43 is data for associating with the cooperation destination application, such as the above-described cooperation information. The application data 43 is stored in an application data storage unit 13.

The web service processing unit 15 provides screen information to the device 20 and accepts the execution of the cooperation source application from the device 20. The web service processing unit 15 includes a cooperation source application executing unit 46 and a device screen providing unit 47. The cooperation source application executing unit 46 accepts the execution of the cooperation source application from the device 20 and requests an input/output processing unit 48 to process the cooperation source application based on the application process information 53. The device screen providing unit 47 uses screen information 54 to provide screen information such as a cooperation source application list screen to the device 20.

The input/output service unit 16 performs the input/output of data using the authentication service unit 14 or the component 18. The input/output service unit 16 includes an input/output processing unit 48 and an application managing unit 49. The input/output processing unit 48 executes the cooperation source application requested by the cooperation source application executing unit 46. At the time of execution, the input/output processing unit 48 refers to the application process information 53, and requests each process included in the cooperation source application to the component 18. The application managing unit 49 manages the application process information 53 and the screen information 54 of the cooperation source application stored in an application process information storage unit 17. The application process information 53 includes a setting of which processes are to be performed in which order by the cooperation source application (for example, after the optical character recognition (OCR), request a process to the external service system 40 and the like). The screen information 54 is information of a screen displayed by the device 20, such as a cooperation source application list screen, a setting screen of each application, and the like. In the application process information storage unit 17, the application process information 53 and the screen information 54 are stored for each cooperation source application.

The authentication service unit 14 performs a process related to the authentication of the user (including the administrator) and the device 20. The authentication service unit 14 includes a user managing unit 44 and a device managing unit 45. The user managing unit 44 manages information about the user. For example, authentication information such as a user name and a password is held by the user managing unit 44. The authentication information may be authentication information of the information processing system 10 or authentication information of the external service system 40. The device managing unit 45 manages the device 20 associated with the tenant. That is, the identification information of the tenant is managed in association with the device 20, and when the device 20 is identified, the tenant is also identified.

The component 18 is a generic term of an individual function that actually performs each process. One block in the component 18 corresponds to one process. The component 18 includes, for example, an authentication processing unit 51, an external service processing unit 52, and a determining unit 55. The authentication processing unit 51 is the component 18 that requests the authentication service unit 14 to perform a process relating to authentication. The external service processing unit 52 is the component 18 that requests the external service system 40 to perform a process. That is, the external service processing unit 52 is a function for cooperating with the external service system 40. The external service processing unit 52 is provided for each type of the external service system 40. The determining unit 55 makes various determinations and controls the branching of a process flow. In addition to the components illustrated in the figure, components for processes such as OCR and translation may be included.

TABLE 1

| | EXTERNAL SERVICE SYSTEM A | | | |
|---|---|---|---|---|
| COOPERATION SOURCE APPLICATION ID | APPLICATION NAME | SCREEN INFORMATION | APPLICATION PROCESS INFORMATION | SHARED APPLICATION |
| app001 | NEW RECORD REGISTRATION | SCREEN DEFINITION INFORMATION A1 | PROCESS FLOW INFORMATION A1 | — |
| app002 | EXISTING RECORD REGISTRATION | SCREEN DEFINITION INFORMATION A2 | PROCESS FLOW INFORMATION A2 | — |
| app003 | MAIL RECEPTION REGISTRATION | SCREEN DEFINITION INFORMATION A3 | PROCESS FLOW INFORMATION A3 | ○ |
| app004 | SCAN ORDER FORM | SCREEN DEFINITION INFORMATION A4 | PROCESS FLOW INFORMATION A4 | — |
| app005 | FAX RECEPTION REGISTRATION | SCREEN DEFINITION INFORMATION A5 | PROCESS FLOW INFORMATION A5 | ○ |
| app006 | NEW RECORD DAYS2019 | SCREEN DEFINITION INFORMATION A6 | PROCESS FLOW INFORMATION A6 | — |

Table 1 indicates an example of information held by the application process information storage unit 17. The application process information storage unit 17 is associated with the external service system 40 and includes the items of a cooperation source application ID (an example of identification information of the first application), an application name, screen information, application process information, and a shared application. The cooperation source application ID is identification information that identifies a cooperation source application. The application name is the name of a cooperation source application assigned by the administrator. The screen information 54 (described in HTML and the like), used when the device 20 displays an icon of the cooperation source application or a setting screen, is associated with the cooperation source application. The contents and the order (the process flow) of the series of processes are defined in the cooperation source application, and, therefore, each cooperation source application is associated with the application process information 53. The shared application means that, in contrast to a general cooperation source application for which usage authority is given on a per-user basis, the shared application is an application that can be commonly used by the users of a tenant. In Table 1, mail reception registration and fax reception registration are shared applications. These applications can be used by the respective users.

When, for example, an "external service system A" is specified from the device 20, the application managing unit 49 provides the device 20 with a list of cooperation source applications that are associated with the "external service system A", from the application process information storage unit 17. When a cooperation source application is specified from the list of cooperation source applications (cooperation source application list), the screen information and application process information, which are associated with the cooperation source application, are identified.

information processing system 10, a user name, a mail address, a password, a cooperation source application that can be used, authentication information of the external service system, and a cooperation setting. The user also includes an administrator. At least one of a user ID, a user name, and a mail address, and a password are authentication information for the user to log in to the information processing system 10. The cooperation source application that can be used is the cooperation source application for which the user is given the usage authority. The cooperation source application that can be used includes an individual application and a shared application. Both the individual application and the shared application are used by a plurality of users, but the individual application uses the authentication information of the external service of an individual user, while the shared application uses the authentication information of the external service shared by a plurality of users. In Table 2, app003, which is common to U001 through U003, is a shared application. The other applications are individual applications. In the case of an individual application, it is necessary to register the authentication information of an external cooperation service on a per-user basis.

The authentication information of the external service system is authentication information for the user to log in to the external service system 40. The authentication information may differ for each external service system 40. In this manner, each user of the service providing system is associated with the user of the external service system 40 in a one-to-one manner. Note that is not necessary to be associated in a one-to-one manner, and when there are a plurality of cooperation source applications using the same external service system 40, the users of the external service system

TABLE 2

| USER ID | USER NAME | MAIL ADDRESS | PASSWORD | COOPERATION SOURCE APPLICATION THAT CAN BE USED | AUTHENTICATION INFORMATION OF EXTERNAL SERVICE SYSTEM | COOPERATION SETTING | |
|---|---|---|---|---|---|---|---|
| U001 | HANAKO TOKKYO | hanako@sample.com | * * * * | app001 | SUBDOMAIN: company USER NAME: tokkyo PASSWORD: **** | EXTERNAL SERVICE SYSTEM A | EXTERNAL SERVICE SYSTEM B |
| | | | | app003 | USE AUTHENTICATION INFORMATION OF ADMINISTRATOR A | COMPLETED | NOT COMPLETED |
| U002 | TARO TOKKYO | taro@sample.com | * * * * * | app001 | SUBDOMAIN: company USER NAME: taro PASSWORD: **** | | |
| | | | | app003 | USE AUTHENTICATION INFORMATION OF ADMINISTRATOR A | COMPLETED | COMPLETED |
| | | | | app004 | USER ID: taro_tokkyo1234 PASSWORD: **** | | |
| U003 | ICHIRO JITSUYOU | ichiro@sample.com | * * * * * * | app003 | USE AUTHENTICATION INFORMATION OF ADMINISTRATOR A | | |
| | | | | app004 | USER ID: ichiro227 PASSWORD: **** | NOT COMPLETED | NOT COMPLETED |

Table 2 illustrates an example of information related to a user managed by the user managing unit 44. The information relating to a user includes the items of a user ID in the 40 may be associated with each of the different applications. Accordingly, the information processing system 10 identifies a user (user identification information and the like) of the external service system 40 that is the cooperation destination, in accordance with the user information, such as the user ID and the password of the information processing system 10 acquired from the device 20. Alternatively, the user of the external service system 40 that is the cooperation destination is identified in accordance with the user information of the information processing system 10 and the cooperation source application. The item of the cooperation setting becomes "completed" when the user wishes to cooperate with the external service system 40 and it is confirmed that the user can log in with the authentication information of the external service system 40. The cooperation setting is used to determine whether a user can execute an application of the external service system 40.

Further, the authentication information may be the authentication information of the external service system 40 or the authentication information necessary for cooperating with the external service system. Thus, other than a user ID and a password, the authentication information may be a token and the like acquired from the external service system 40 at the time of setting the cooperation with the external service system 40.

The fourth communication unit 61 transmits and receives various kinds of information with the information processing system 10 or the terminal apparatus 30. In the present embodiment, information on the registration of the cooperation destination application is received from the terminal apparatus 30, and a processing request with respect to the cooperation destination application is received from the information processing system 10 together with image data and cooperation information. Further, data to be processed by the cooperation destination application (a space list, a cooperation destination application list, a field/a field code list, a record list, transmitted image data, etc.) is transmitted to the information processing system 10. When the fourth communication unit 61 communicates with the information processing system 10, an Application Interface (API) of the external service system 40 is used.

The application registration accepting unit 64 provides a cooperation destination application registration screen to the terminal apparatus 30 and accepts registration and editing of the cooperation destination application set by the administrator on the cooperation destination application registration screen. The administrator can register the cooperation des-

TABLE 3

EXTERNAL SERVICE SYSTEM A

| COOPERATION SOURCE APPLICATION ID | COOPERATION DESTINATION APPLICATION | SPACE ID | COOPERATION SOURCE APPLICATION SETTING SCREEN | FIELD CODE 1 | FIELD CODE 2 | ... |
|---|---|---|---|---|---|---|
| app001 | 2575 | S001 | SCREEN 001 | FIELD CODE FOR IMAGE | FIELD CODE FOR ○○ | ... |
| app002 | 2576 | S001 | SCREEN 002 | ... | ... | ... |
| app003 | 2577 | S001 | SCREEN 003 | ... | ... | ... |
| app004 | 2578 | S001 | SCREEN 004 | ... | ... | ... |
| app005 | 2579 | S001 | SCREEN 005 | ... | ... | ... |
| app006 | 2580 | S001 | SCREEN 006 | ... | ... | ... |

Table 3 illustrates an example of the application data stored in the application data storage unit 13. The application data includes, in association with the external service system 40, the items of a cooperation source application ID, a cooperation destination application ID, a space ID, a cooperation source-application setting screen, and an n number of (one or more) field codes. That is, the application data associates a cooperation source application with a cooperation destination application. The items of the cooperation source application setting screen are information specifying the screen information of the above-described cooperation source application setting screen in which the cooperation source application is set. Each field code is information identifying which data is to be stored in which field of the cooperation destination application. For example, it is registered that the scanned image data is to be stored in the field of a field code 1. The field is an item and corresponds to a column in the tabular database.

<<External Service System>>

Figure 6:
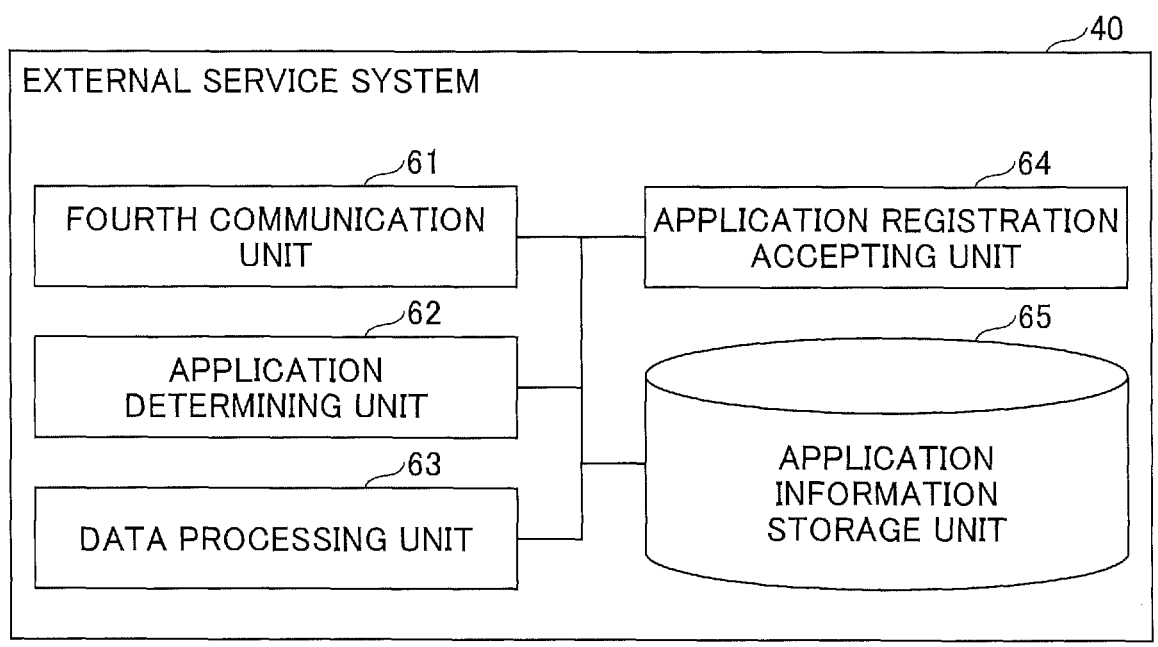
FIG. 6 is a diagram illustrating an example of a functional configuration of an external service system according to an embodiment of the present invention.

FIG. 6 is a diagram illustrating an example of a functional configuration of the external service system 40. The external service system 40 includes a fourth communication unit 61, an application determining unit 62, a data processing unit 63, and an application registration accepting unit 64. Each of these functional units is a function or means which is implemented by the CPU 501 executing instructions included in one or more programs installed in the external service system 40.

tination application simply by customizing a service provided by the information processing system 10. The application registration accepting unit 64 assigns a unique (i.e., not overlapping with other IDs) cooperation destination application ID to the cooperation destination application. The application registration accepting unit 64 stores the information related to the registered cooperation destination application in an application information storage unit 65.

The application determining unit 62 determines a cooperation destination application that is to process the image data and the like that is a target of the processing request, based on the cooperation destination application ID transmitted from the information processing system 10. The data processing unit 63 performs a process that is to be performed by the cooperation destination application which is determined by the application determining unit 62, and processes image data and the like by the process contents specific to the cooperation destination application. In the case of registering to a new record, the image data, etc., is stored in a field identified by the cooperation destination application ID and the field code. In the case of registering to an existing record, the image data, etc., is stored in the field of a record identified by the cooperation destination application ID, the field code, and the record ID. Other functions include, for example, converting the image data into a data format that can be processed by the cooperation destination application, storing the image data in a state in which the type of the image data is managed by assigning some attribute to the image data, performing image processing on the image data, transferring the image to the outside, and providing the image data in response to a request, and the like. The following embodiment describes a cooperation destination application that provides a tabular database. In this case, converting the data format, managing the image data, providing the image data, and the like are performed.

menting a service for requesting the "external service system A" to process image data generated by scanning by the device 20.

The application process information 53A includes a flow ID 1201A representing the identification information of the application process information 53A, a flow name 1202A representing the name of the application process information 53A, and flow details 1203A representing the process con-

TABLE 4

SPACE ID: S001 COOPERATION DESTINATION APPLICATION ID: 2575
COOPERATION DESTINATION APPLICATION NAME: SCAN REGISTRATION

| ITEM NAME | RECORD NUMBER | CUSTOMER NAME | TELE- PHONE NUMBER | CASE STATUS | NEW/ ADDITION | DELIVERY DATE | DESIGN REQUEST | PROPOSED DESIGN | FIXED CHARACTER STRING | NUMER- ICAL VALUE |
|---|---|---|---|---|---|---|---|---|---|---|
| FIELD CODE | 1 | 2 | 3 | 4 | 5 | 6 | 7 | 8 | 9 | 10 |

Table 4 is an example of the application information stored in the application information storage unit 65 of the external service system 40. The application information in Table 4 is related to the cooperation destination application in a database format and is a list of field names. The application information is associated with a space ID, a cooperation destination application ID, and a cooperation destination application name. The space is created by grouping together several cooperation destination applications, and the space ID is the identification information of the space (an example of identification information of a group). There may be cases where the external service system 40 does not have a space ID.

In Table 4, the field names are a record number, a customer name, a telephone number, a case status, new/addition, a delivery date, a design request, a proposed design, a fixed character string, and a numerical value, which are registered by the administrator and are merely one example. Note that "design request" is intended to be a request to a person specializing in design to modify the color and shape of the image data, and this field name is merely one example. Similarly, the "proposed design" is a proposal that has been remodified by a person specializing in design.

Each field has a field code. The field code is identification information that identifies the field. There may be a field without a field code; however, in this case, it would be difficult to perform the cooperation by specifying a field. The field name and the field code can be freely set by the administrator, as described below. The field code may be a number assigned by the external service system 40.

A value corresponding to each field is set by the device 20, or a value is set by the terminal apparatus 30. For example, the image data generated by the device 20 is set to the field of "design request". This is a case where the administrator has specified the field code of "design request" as the field for setting the image data in the cooperation source application setting screen.

<Application Process Information>

Next, the application process information will be described in detail with reference to FIG. 7. FIG. 7 is a diagram illustrating an example of application process information stored in the application process information storage unit 17.

Application process information 53A illustrated in FIG. 7 is information related to a series of processes for impletent of a series of processes. The flow name 1202A also serves as the name of the cooperation source application.

Further, the flow details 1203A includes a process content 1223A indicating that the process is requested to the "external service system A".

In the process content 1223A, the component ID "ExService_A" of the component 18 that executes the process in cooperation with the "external service system A", the operation ID "processFile" indicating the processing request, and the parameters "AppId", "FieldCode", and "YouuseName" are specified. "AppId" stores the cooperation destination application ID, "FieldCode" stores the field code, and "YouserName" stores the user name (or user ID). Note that the illustrated parameters are some of the parameters and the application process information may include more parameters. For example, a record ID is also set as a parameter.

Accordingly, in a series of processes based on the application process information, a request to process the image data, generated by scanning, can be made to the "external service system A". As described above, in the information processing system 10 according to the present embodiment, the cooperation information and the like can be transmitted to the external service system 40 by the parameters of the application process information, to cooperate with the cooperation destination application.

FIG. 8 is a diagram illustrating another example of application process information. The application process information illustrated in FIG. 8 is information related to a series of processes in which OCR is performed on the image data of a fax received by the device 20 and a processing request to process the image data is transmitted to the "external service system A".

Application process information 53C includes a flow ID 1201C representing the identification information of the application process information 53C, a flow name 1202C representing the name of the application process information 53C, and flow details 1203C representing the process content of a series of processes.

Further, the flow details 1203C include a process content 1213C representing an OCR process and a process content 1223C representing to deliver (upload) to the "external service system A". In the process content 1213C, the component ID "ocr" of the component 18 that executes the OCR process, the operation ID "process", and the parameters "language" and "outputType" are specified. In the process content 1223C, two parameters "FaxNumber" and "FileCodeFax" are added. "FaxNumber" is the fax number of the transmission source, and "FileCodeFax" is the field code of the cooperation destination application in which the fax number is registered. In this manner, the information processing system 10 may transmit a plurality of field codes to the external service system 40 upon specifying the fields to which the respective field codes correspond.

Accordingly, in a series of processes based on the application process information 53, the image data of the fax and the fax number can be stored in the "external service system A".

In the flow details 1203C, with respect to the execution order of the processes defined in the respective process contents, the processes are executed in order starting from the top. That is, in the series of processes (application process information) based on the application process information 53C illustrated in FIG. 8, the processes are executed in the order of the process defined in the process content 1213C and then the process defined in the process content 1223C. However, the order is not limited thereto, and, for example, information indicating the order of execution of the processes defined in the respective process contents may be defined in the application process information.

<Details of Process>

Next, a process of the information processing system 10 according to the present embodiment will be described in detail.

Figure 9:
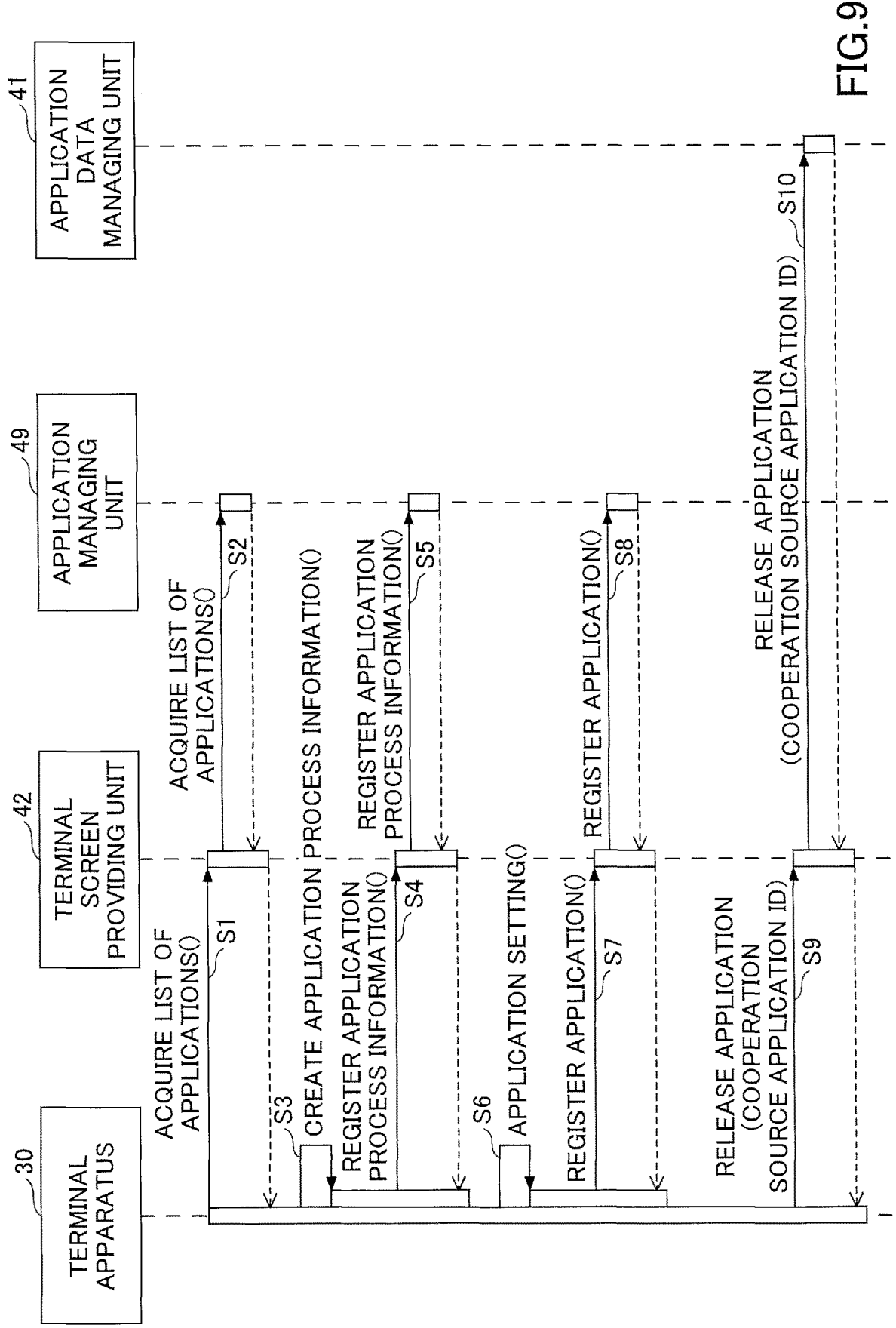
FIG. 9 is a sequence diagram illustrating an example of a registration process of application process information according to an embodiment of the present invention.

First, a process in which the administrator creates application process information using the terminal apparatus 30 and registers the application process information in the application process information storage unit 17 will be described with reference to FIG. 9. FIG. 9 is a sequence diagram illustrating an example of a process of registering application process information.

The administrator performs an operation of starting the creation of the application process information using the terminal apparatus 30. For example, the administrator can perform the operation of starting the creation of the application process information by using the terminal apparatus 30 to log in to the information processing system 10 and then selecting an "application process information creation" button and the like on a portal screen displayed after the login.

S1 and S2: When the operation accepting unit 33 of the terminal apparatus 30 accepts an operation of starting the creation of the application process information, the first communication unit 31 transmits an application list request to the terminal screen providing unit 42 of the information processing system 10. Upon receiving the application list request, the terminal screen providing unit 42 transmits the application list request to the application managing unit 49. The application list is information for displaying a list of cooperation source applications for providing services. This cooperation source application is a template of the cooperation source application, and examples are a scan application and a print application. The administrator edits the template of the cooperation source application to create a cooperation source application. The first communication unit 31 of the terminal apparatus 30 receives the screen information of the application list screen.

Figure 10:
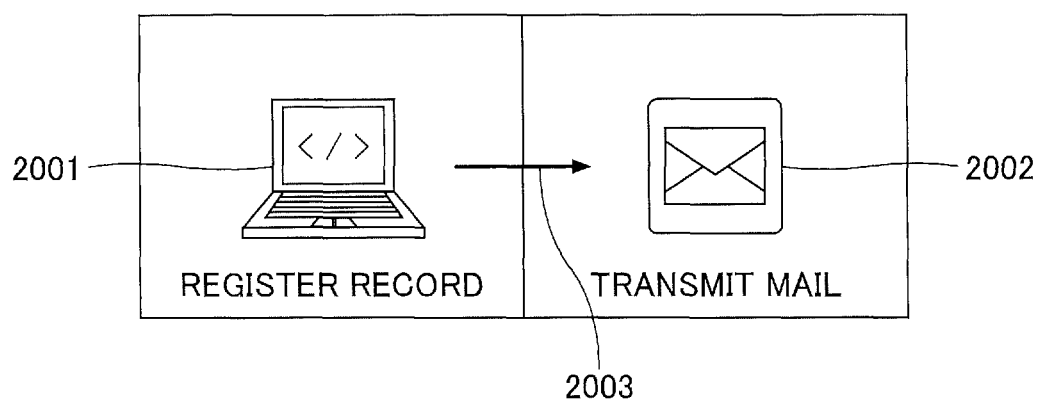
FIG. 10 is a diagram illustrating an example of an application process information creation screen according to an embodiment of the present invention.

S3-S5: Next, the administrator performs an operation to select a template of the cooperation destination application for creating the application process information, from the application list screen. When the operation accepting unit 33 of the terminal apparatus 30 accepts an operation of selecting a template, the first communication unit 31 transmits a request for acquiring an application process information creation screen to the terminal screen providing unit 42 of the information processing system 10. The acquisition request includes information for identifying the template of the cooperation source application selected by the administrator. The terminal screen providing unit 42 transmits the request for acquiring the application process information creation screen to the application managing unit 49. Accordingly, the first communication unit 31 of the terminal apparatus 30 receives screen information of the application process information creation screen. An example of the application process information creation screen is illustrated in FIG. 10.

S6: The administrator can edit the template and assign an application name such as "new record registration" or create application process information, on the application information creation screen. Further, the administrator sets the items to be set by the user and the items that are not to be set by the user when executing the cooperation source application. For example, a setting is made to display the scan reading setting but not to display the storage destination. This becomes screen information stored in the application process information storage unit 17.

S7, S8: When the administrator creates the application process information, the first communication unit 31 of the terminal apparatus 30 transmits the application name, the application process information, and the request to register the screen information to the terminal screen providing unit 42 of the information processing system 10. The terminal screen providing unit 42 transmits the application name, the application process information, and the screen information to the application managing unit 49. The application managing unit 49 sets a cooperation source application ID and stores the application name, the application process information, and the screen information in the application process information storage unit 17 in association with the cooperation source application ID. The cooperation source application ID is transmitted to the terminal apparatus 30.

S9, S10: The administrator performs an operation of releasing the application. Releasing means to enable a user to use the cooperation source application. When the operation accepting unit 33 of the terminal apparatus 30 accepts the operation, the first communication unit 31 specifies the cooperation source application ID and transmits an application release request to the terminal screen providing unit 42. The terminal screen providing unit 42 transmits the cooperation source application ID and the application release request to the application data managing unit 41. The application data managing unit 41 stores the cooperation source application ID and the cooperation source application setting screen in association with each other in the application data storage unit 13. The screen information of the cooperation source application setting screen is prepared in advance for each of the external service systems 40. Therefore, in the application data of Table 3, the external service system 40, the cooperation source application ID, and the cooperation source application setting screen will be registered. Then, the cooperation source application ID and an n number of field codes are also registered in the application data of Table 3 by setting from the cooperation source application setting screen, which will be described later.

In the terminal apparatus 30, the administrator associates the cooperation source application ID with the function of the terminal apparatus 30. For example, when a cooperation source application in which the component of fax reception is used is created, an operation is performed to register the cooperation source application ID of the created cooperation source application in the fax processing unit 25.

Accordingly, the cooperation source application can be identified from the fax processing unit 25 and the like. To give a supplementary explanation, when the cooperation source application is executed from the fax processing unit 25 and the like, it is not possible to identify the cooperation source application to be executed, and, therefore, by setting a unique ID (a cooperation source application ID) in the terminal apparatus 30 and the application data at the timing when the cooperation source application is released, the fax processing unit 25 will be able to specify the cooperation source application with respect to the information processing system 10.

FIG. 10 is a diagram illustrating an example of an application process information creation screen. The application process information can be set by the administrator by placing icons 2001 and 2002, each representing one of the processes, in squares. This icon 2001 or 2002 corresponds to one of the processes within the component 18. The processes are executed in order from left to right, and the order of execution is illustrated by an arrow 2003. FIG. 10 illustrates the application process information in which the information processing system 10 registers the image data, generated by scanning by the device, in a record of the external service system 40, and then subsequently transmits a mail.

<Example Screen for Registering Cooperation Destination Application to External Service System>

Hereinafter, an example of a screen displayed by the terminal apparatus 30 according to screen information acquired from the external service system 40 when the user registers the cooperation destination application in the external service system 40, will be described. Application registration to the external service system 40 is one phase of the preparatory stage described in FIG. 1A.

When the administrator registers a new cooperation destination application, the terminal apparatus 30 is connected to the external service system 40, and the cooperation destination application registration screen is displayed. With regard to the screens illustrated in FIGS. 11 to 17, the terminal apparatus 30 has transmitted a HTTP request to the external service system 40, screen information has been transmitted in a HTTP response by the external service system 40, and this screen information is displayed in each of these screens by the terminal apparatus 30.

FIG. 11 illustrates an example of a cooperation destination application registration screen (part 1) 200 displayed by the terminal apparatus 30. The field names for identifying the fields are listed at the top of the columns of FIG. 11. For example, the "record number", the "customer name" and the "telephone number" in FIG. 11 are referred to as field names. It is possible that the same field name is assigned to different fields. For this reason, in each field, field identification information that identifies a field in the cooperation destination application, is stored in association with each field in the cooperation destination application.

In FIG. 11, as a matter of convenience of explanation, the field name of the cooperation destination application already registered in the information processing system 10 is displayed. A field name is not displayed when a field is to be newly set, but the registration method of the cooperation destination application is the same in FIG. 12 and onwards.

In the present embodiment, an application ID 212 is displayed in the Uniform Resource Locater (URL). https://company.ExService_A.com/2575/The "2575" in the above URL is the application ID 212.

In the cooperation destination application registration screen (part 1) 200, the fields of the field names (a record number 201, a customer name 202, a telephone number 203, a case status 204, new/addition 205, a delivery date 206, a design request 207, a proposed design 208, a fixed character string 209, and a numerical value 210n) indicated in the application information in Table 4 and a person in charge of case 213 are displayed, and a value is set in each field. One row is referred to as a record (an example of a storage location) and a record number is assigned to each record. The user can display or edit the value of the field in the cooperation destination application registration screen (part 1) 200. In FIG. 11, a blank space represents a field in which a value is not set (or no authority to display the value).

To give a supplementary explanation, it is possible to set a user having an authority in each record. The types of authorities include, for example, a viewing authority, an editing authority, and a deletion authority. When the user has the editing authority, the user can register or replace image codes or character strings in records or fields. A user name (identification information) having authority is registered in authority information 214 in association with the viewing authority, the editing authority, or the deletion authority. In FIG. 11, the authority information 214 may be registered for each record of the cooperation destination application, but the authority information may be set for each field.

The person in charge of case 213 is the person in charge of the record. This person may be referred to as the administrator. The person in charge of the case may be, for example, a user who has registered the record. By registering the record, the user (login user) of the external service system 40 corresponding to the user operating the device 20, is automatically set in the item of the person in charge of case 213 (see FIG. 46). Further, the administrator can set the person in charge of case 213 from the cooperation destination application registration screen (part 1) 200 in FIG. 11.

Figure 18:
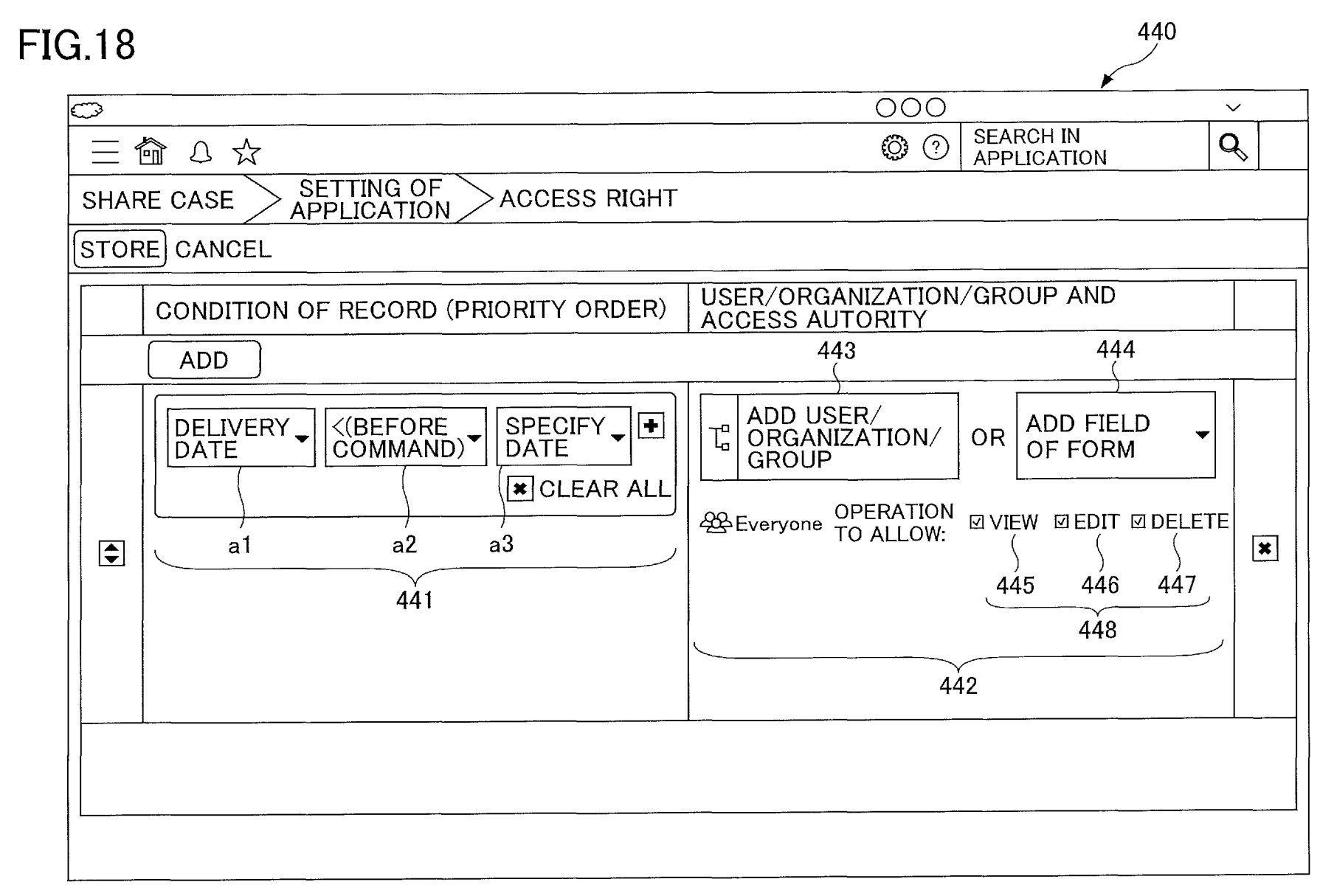

When the user is managed in units of groups in the external service system 40, one or more authorities of the viewing authority, the editing authority, and the deletion authority may be given to other users in the same group as the user who has registered the record. Further, as illustrated in FIG. 18, it is possible to set the application so as to give, to a specified user, the authority of a record that matches the specified condition.

When image data is registered in an existing record, a user operating the device 20 may be registered as the person in charge of the case. In this case, the user may be added to the person in charge of case 213 or the person in charge of case 213 may be replaced by the user.

The cooperation destination application registration screen (part 1) 200 includes a setting button 211. When the administrator presses the setting button 211, the terminal apparatus 30 displays a cooperation destination application registration screen (part 2) 210 and allows the administrator to edit the field name.

Figure 12:
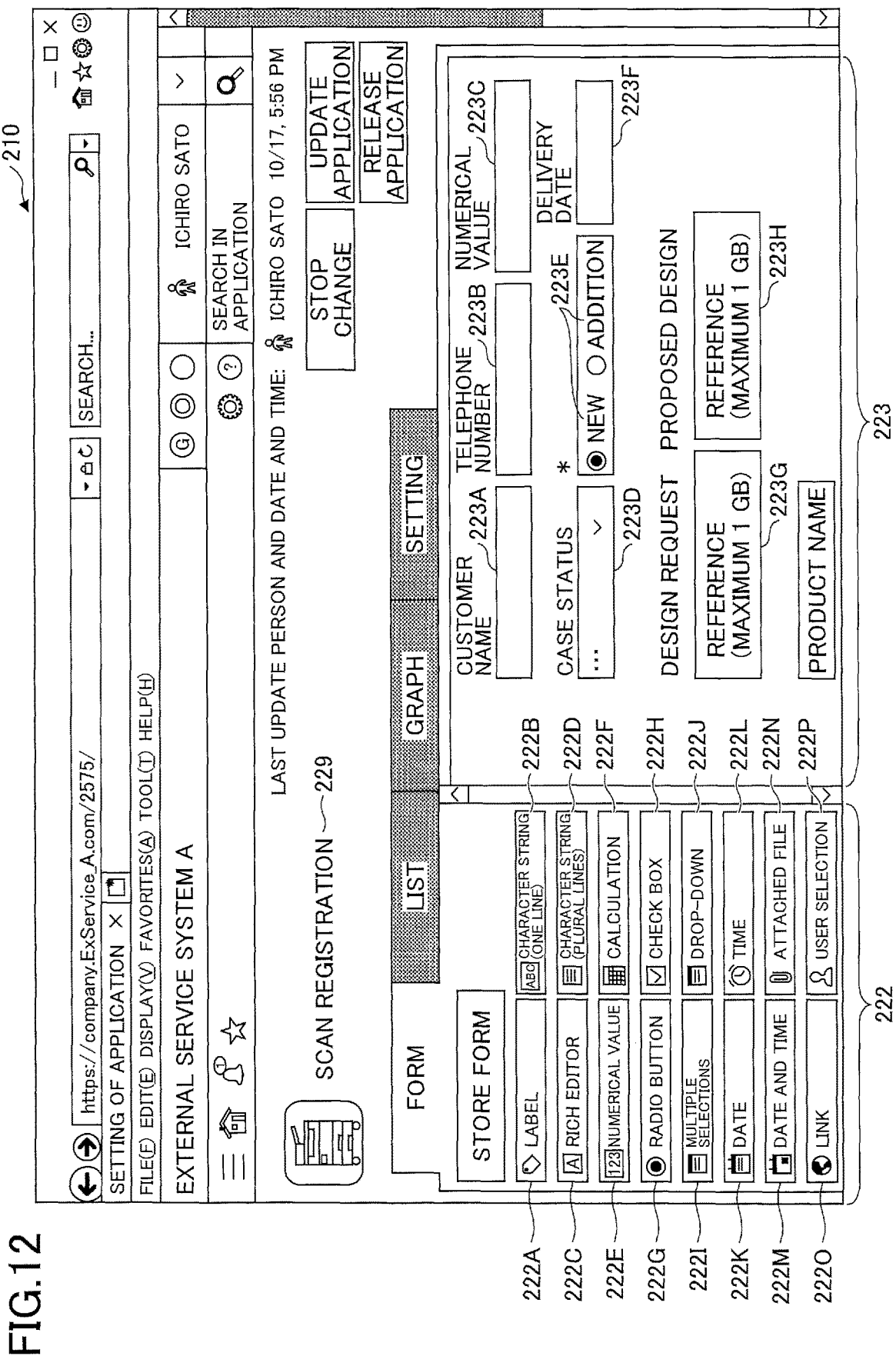
FIG. 12 is a diagram illustrating an example of a cooperation destination application registration screen (part 2) displayed by a terminal apparatus according to an embodiment of the present invention.

FIG. 12 illustrates an example of the cooperation destination application registration screen (part 2) 210 displayed by the terminal apparatus 30. The cooperation destination application registration screen (part 2) 210 includes an application name field 229, a form field 222, and a work area 223. The administrator can set the application name in the application name field 229, and this application name in the application name field 229 becomes the cooperation destination application name in Table 4. In the form field 222, the functions available for use with the service provided by the external service system 40 are displayed as forms. For example, there are forms such as a label field 222A, a character input field 222B, a rich editor 222C, a character string input field 222D, a numerical value field 222E, calculation 222F, a radio button 222G, a check box 222H, a multiple selection field 222I, a drop-down field 222J, a date field 222K, a time field 222L, a date and time field 222M, an attached file field 222N, a link field 222O, a user selection field 222P, and the like. The user can arrange a form in the work area by dragging the desired form from the form field 222 into the work area. This form becomes a field.

For example, the attached file field 222N is a field in which the image data generated by scanning is registered. In the present embodiment, the image data generated by the device 20 is set in the field "design request", while the field "design request" is created by the form of an attached file. That is, the image data is positioned as an attached file attached to the cooperation destination application. When there is a form such as "image", the "design request" field may be created using this form.

In FIG. 12, in the work area 223, fields of the field names and values (currently blank) in Table 4 are displayed. That is, there is a customer name field 223A, a telephone number field 223B, a numerical value field 223C, a case status field 223D, a new/addition field 223E, a delivery date field 223F, a design request field 223G, and a proposed design field 223H. The user can edit, copy, and delete a field or set a new field. For example, when the user moves the mouse pointer to the upper right of a field, possible work items 221 (see FIG. 13, etc.) are displayed.

Figure 13:
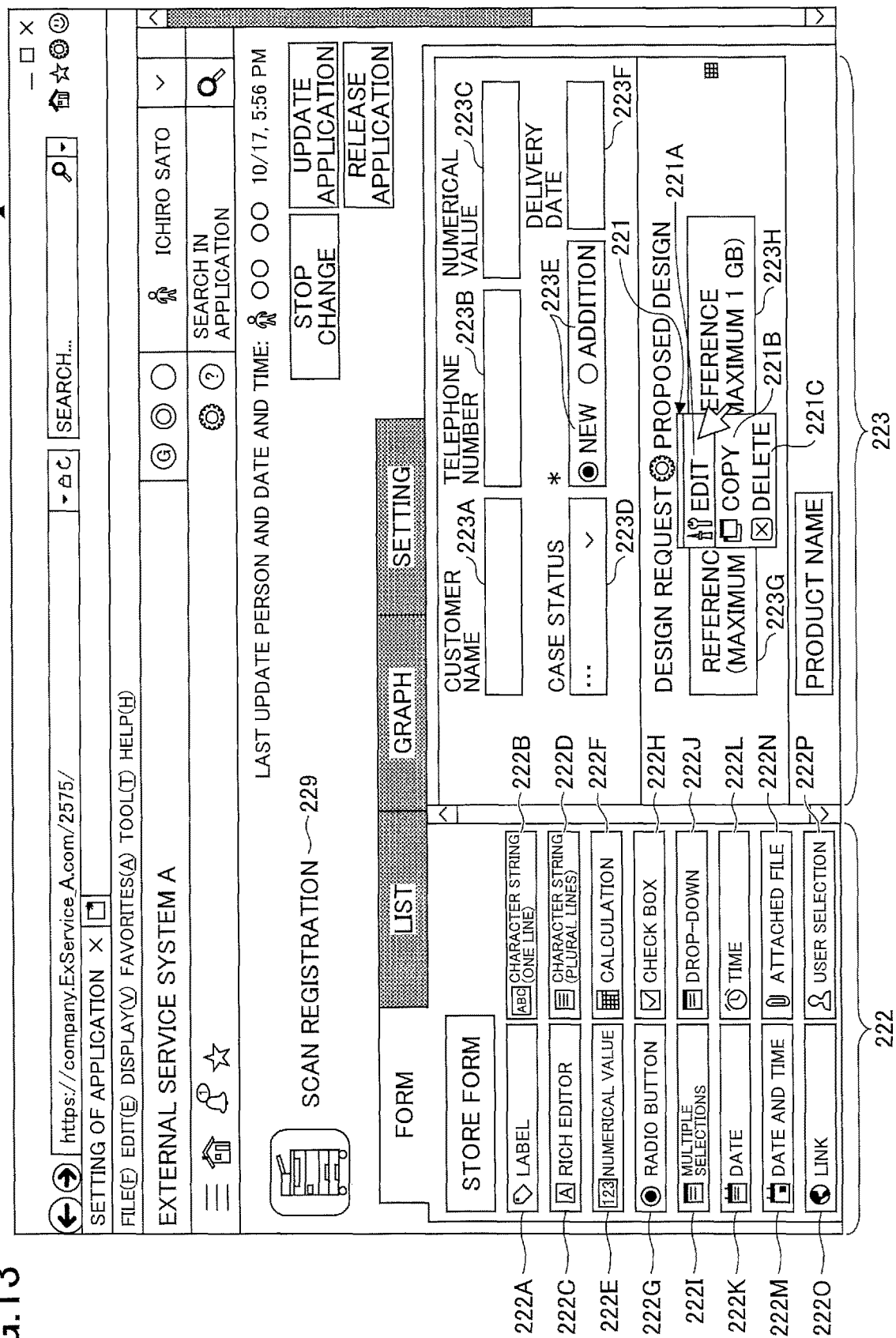
FIG. 13 is a diagram illustrating an example of a cooperation destination application registration screen (part 3) displayed by a terminal apparatus according to an embodiment of the present invention.

FIG. 13 illustrates an example of a cooperation destination application registration screen (part 3) 220 including the displayed work items 221 displayed by the terminal apparatus 30. In FIG. 13, as the work items 221, an edit button 221A, a copy button 221B, and a delete button 221C are displayed. Assume that the user presses the edit button 221A. Accordingly, a detailed pop-up screen that allows the user to edit the form is displayed.

Figure 14:
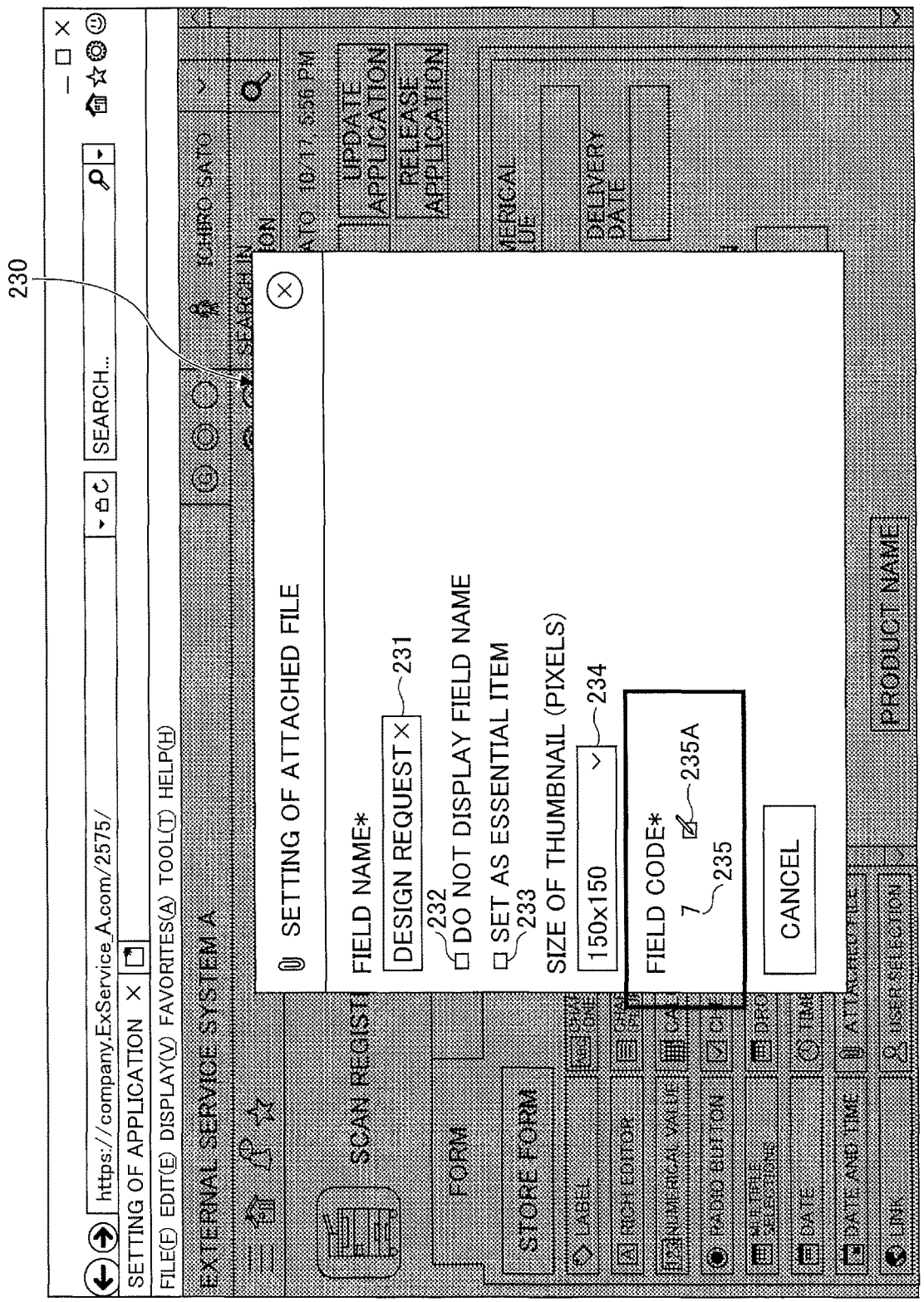
FIG. 14 is a diagram illustrating an example of a detailed pop-up screen in which details of a form of an attached file are set according to an embodiment of the present invention.

FIG. 14 illustrates an example of a detailed pop-up screen 230 in which details of an attached file form (field of "design request") are set. The detailed pop-up screen 230 includes a field name field 231, a check box 232 associated with "do not display field name", a check box 233 associated with "set as essential item", a thumbnail size selection field 234, and a field code field 235.

The field name field 231 . . . the field name.
The check box 232 associated with "do not display field name" . . . when checked, the field name is not displayed.
The check box 233 associated with "set as essential item" . . . when checked, the field name becomes an essential item.
The thumbnail size selection field 234 . . . the size of the thumbnail of the attached file (image data) is displayed in a pull-down format.
The field code field 235 . . . the field code of this form ("design request") is displayed and editing is possible. When the user moves a mouse pointer to a pen mark 235A, a field code input field is displayed and any field code can be input.

In FIG. 14, "7" is the field code for the "design request" field. Thus, the field code may be the same as the field name. The application registration accepting unit 64 of the external service system 40 may set a default field code that is the same as the field name. As long as there is no duplication in the application, the user can set the field code to be a character, a number, an alphabet letter, etc., or a combination thereof, as appropriate. In FIG. 14, "7" is set as the field code (see FIG. 43). The field code is set to uniquely identify a field in the cooperation destination application, because there may be a possibility that different fields are given the same field name.

Figure 15:
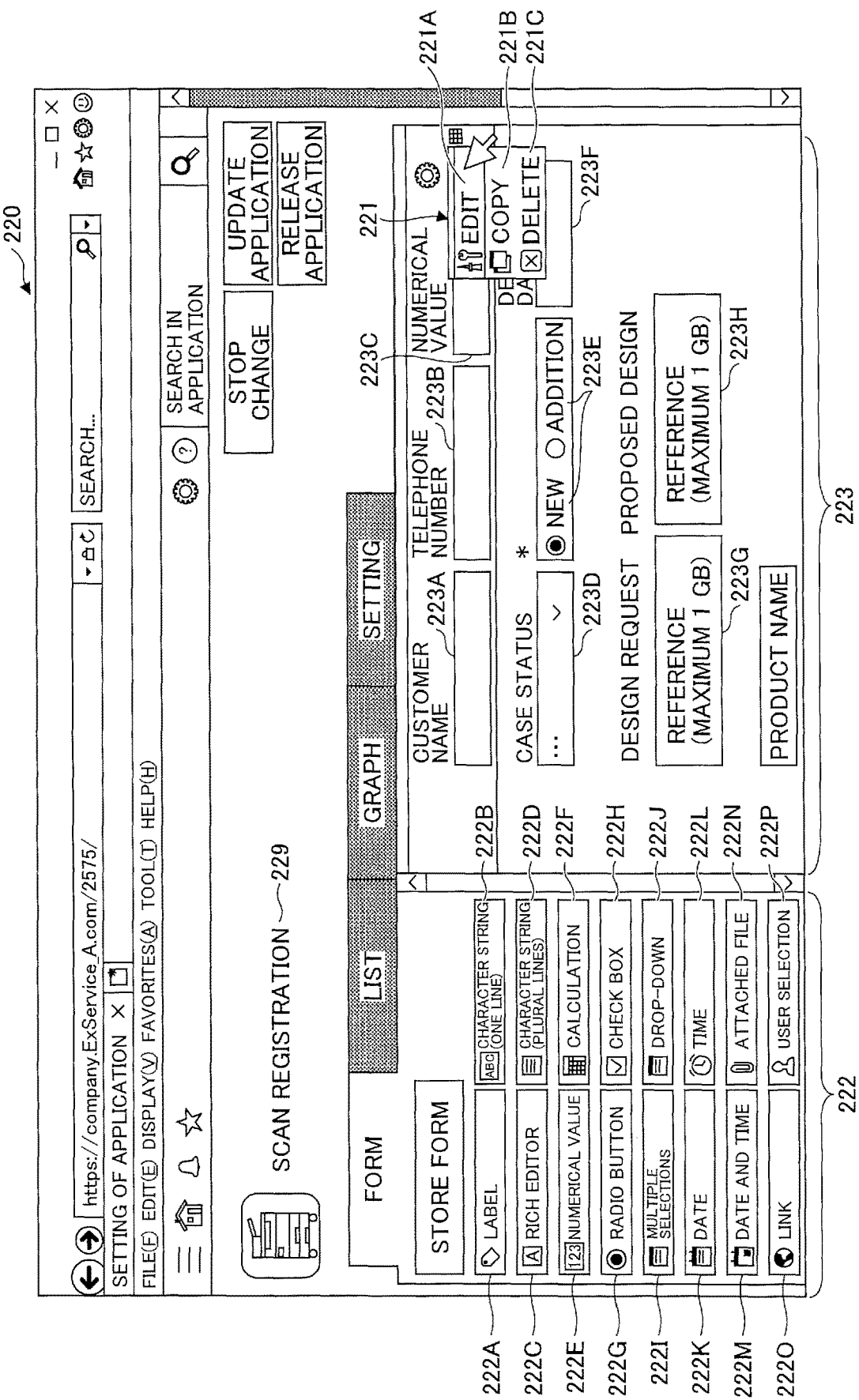
FIG. 15 is a diagram illustrating an example of a cooperation destination application registration screen (part 4) in which work items are displayed according to an embodiment of the present invention.

Similarly, with reference to FIGS. 15 and 16, the editing of the field code of the numerical value field 223C will be described. FIG. 15 illustrates an example of a cooperation destination application registration screen (part 4) 220 including displayed work items is displayed by the terminal apparatus 30. In FIG. 15, the mouse pointer has been moved to the upper right of the numerical value field 223C. Therefore, the work items 221 are displayed. The user has pressed the edit button 221A.

Figure 16:
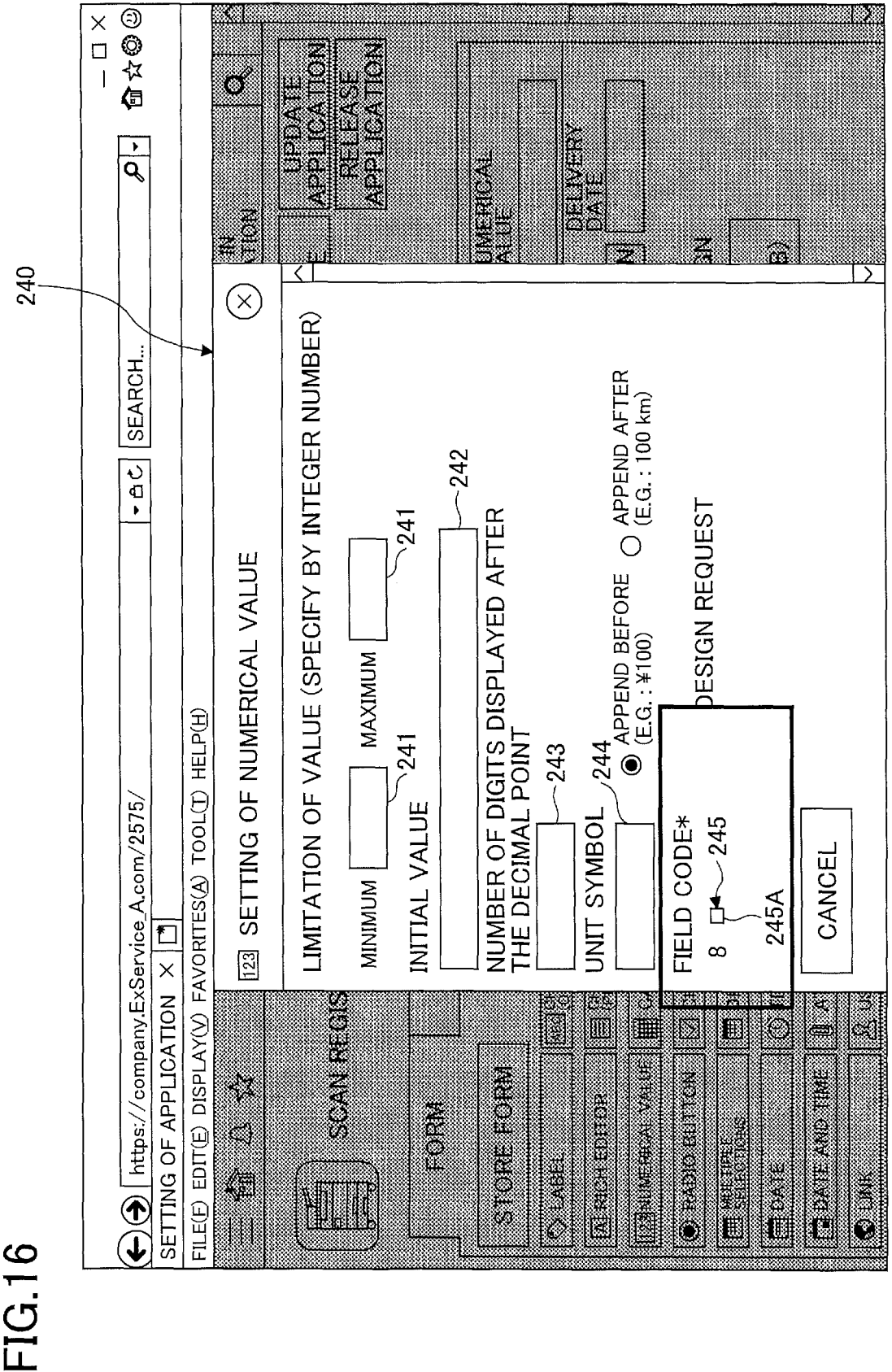
FIG. 16 is a diagram illustrating an example of a detailed pop-up screen in which details of a form referred to as a numerical value field are set according to an embodiment of the present invention.

FIG. 16 is an example of a detailed pop-up screen 240 in which details of the numerical value field 223C form are set. The detailed pop-up screen 240 of FIG. 16 includes a value limit field 241, an initial value field 242, a field of number of digits displayed after the decimal point 243, a unit symbol field 244, and a field code field 245.

The value limit field 241 . . . the maximum value and the minimum value that can be input in the numerical value field are specified.
The initial value field 242 . . . the initial value to be displayed without having the user input a value, is specified.
The field of number of digits displayed after the decimal point 243 . . . when there is a decimal point, the number of digits to be displayed is specified.
The unit symbol field 244 . . . the unit of the numerical values is specified.
The field code field 245 . . . may be the same as in FIG. 14. The field code in FIG. 16 is "numerical value".

FIG. 17 is a diagram illustrating an example of a cooperation destination application list screen 249 displayed by the terminal apparatus 30. For example, the administrator specifies a space ID and causes a list of cooperation destination applications to be displayed. The cooperation destination application list screen 249 includes items such as an application ID 249A and an application name 249B. The application ID 249A means the cooperation destination application ID. The administrator can also confirm the cooperation destination application ID in this screen. When the administrator selects an application name, the cooperation destination application registration screen (part 2) 210 as illustrated in FIG. 12 is displayed.

FIG. 18 is an example of an authority setting screen 440 for setting the authority information in a record. The authority setting screen 440 is a screen used by the administrator for specifying a record and setting the authority for each cooperation destination application of the external service system 40. The authority setting screen 440 includes a record condition setting field 441 and an authority setting field 442.

The record condition setting field 441 includes several items a1 to a3, and conditions can be set according to the field. In FIG. 18, "delivery date" is specified as a field in the item a1. This "delivery date" is set in the delivery date 206 in the cooperation destination application registration screen (part 1) 200 in FIG. 11 or in the delivery date field 223F in the cooperation destination application registration screen (part 3) 210.

In the item a2, a symbol "<" expressing the magnitude relationship is specified. Further, the administrator can specify <, =, ≥, ≤, etc. In the item a3, "2020/2/17" is specified as an example of the date.

Accordingly, in the record condition setting field 441, the condition for specifying "a record in which before 2020/2/17 is set as the delivery date" is set.

The authority setting field 442 includes a user selection field 443, a field code selection field 444, and an authority type field 448. The user selection field 443 and the field code selection field 444 are input fields to set which user is to be given the authority. For example, in the user selection field 443, the administrator may select an individual user, an organization (e.g., a position), or a group (e.g., a department, a team, etc.). In the field code selection field 444, a field may be specified by a field code and the authority may be set for the user of that field. For example, it is possible to automatically set the authority for the person registering the case.

In the authority type field 448, it is possible to select "view" 445, "edit" 446, or "delete" 447, in association with a check box. The "view" 445 is the authority to display a record, the "edit" 446 is the authority to edit a record, and the "delete" 447 is the authority to delete a record.

Each user of the external service system 40 may belong to one or more organizations or groups. The user may belong to, for example, a group of managers, a group of general employees, an external employee group, a team A, a team B, etc. In FIG. 18, the field of the delivery date 206 is set as a condition in the record condition setting field 441. However, for example, the field of the person in charge of case 213 in FIG. 11 can be set in the record condition setting field 441. By making this setting, it is possible to give the authority only to the person in charge of the case, or to give the authority only to the users who belong to the group of the person in charge of the case.

<<Setting Flow>>

Figure 19:
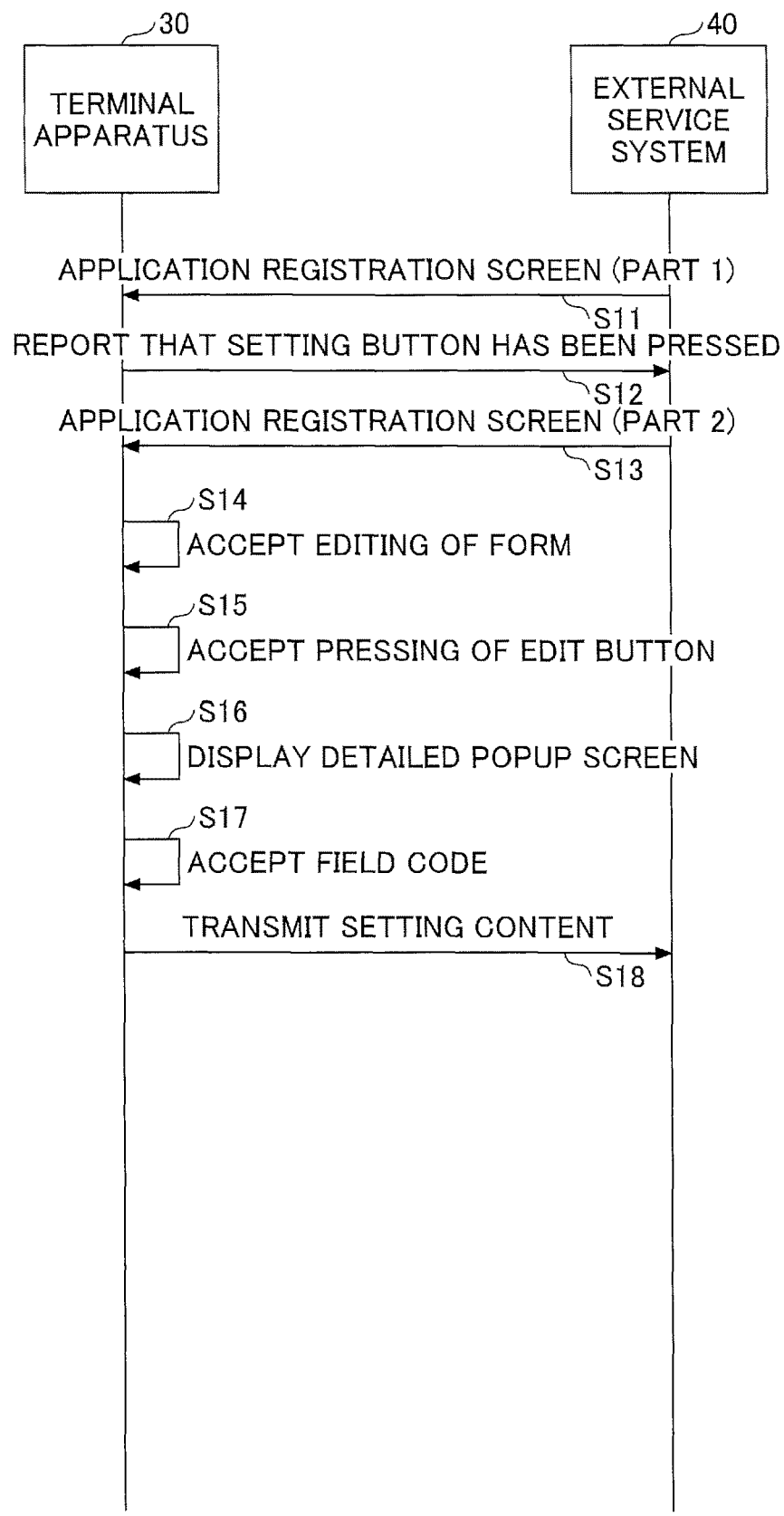
FIG. 19 is an example of a sequence diagram explaining the procedures by which an administrator registers an application in an external service system according to an embodiment of the present invention.

FIG. 19 is an example of a sequence diagram illustrating a procedure in which an administrator registers an application to the external service system 40.

S1: The administrator connects the terminal apparatus 30 to the external service system 40 and logs in, and displays the cooperation destination application registration screen (part 1) 200. The administrator confirms the cooperation destination application ID.

S12: When the administrator presses the setting button 211, the operation accepting unit 33 of the terminal apparatus 30 accepts the pressing, and the first communication unit 31 transmits a message that the setting button 211 has been pressed to the external service system 40.

S13: The fourth communication unit 61 of the external service system 40 receives the message that the setting button 211 has been pressed, and the application registration accepting unit 64 transmits the screen information of the cooperation destination application registration screen (part 2) 210 to the terminal apparatus 30 via the fourth communication unit 61.

S14: The first communication unit 31 of the terminal apparatus 30 receives the screen information of the cooperation destination application registration screen (part 2) 210, and the display control unit 32 of the terminal apparatus 30 displays the cooperation destination application registration screen (part 2) 210 on the display 506. Because the administrator edits the form as appropriate, the operation accepting unit 33 accepts the editing of the form.

S15: When the administrator presses the edit button 221A to edit the field, the operation accepting unit 33 accepts the pressing of the edit button 221A.

S16: Accordingly, the display control unit 32 displays the detailed pop-up screen 230 on the display 506. Note that JavaScript (registered trademark) is used for the transition of a screen that does not involve communication with the external service system 40.

S17: Next, when the administrator sets a field code, the operation accepting unit 33 of the terminal apparatus 30 accepts the field code. Steps S14 to S17 are executed repeatedly as appropriate.

S18: When the administrator completes the registration of the cooperation destination application and presses a predetermined button, the first communication unit 31 transmits the setting contents concerning the cooperation destination application set by the administrator to the external service system 40. The fourth communication unit 61 of the external service system 40 receives the setting contents, and the application registration accepting unit 64 stores the field name, the field code, and the like in the application information storage unit 65. Thus, a cooperation destination application in which the service provided by the external service system 40 is customized has been registered.

<Setting Authentication Information to Information Processing System Cooperating with External Service System>

Subsequently, the setting of the authentication information to the information processing system 10 for the information processing system 10 to cooperate with the cooperation destination application of the external service system 40 will be described. This phase is one of the phases in the preparatory stage, although not illustrated in FIG. 1A. This phase is performed by the administrator or the user, but as a matter of convenience of explanation, it is explained that this phase is mainly performed by the administrator.

In order to cooperate with the cooperation destination application of the external service system 40 when each user operates the device 20, the user needs to be able to log in to the external service system 40 through the information processing system 10. For this reason, the administrator registers, in the information processing system 10, the authentication information and the like of the user in the external service system 40, as follows. The administrator connects the terminal apparatus 30 to the information processing system 10 to display a user information registration screen. With respect to the screens of FIGS. 20 to 24 described below, the terminal apparatus 30 transmits a HTTP request to the information processing system 10, and screen information in a HTTP response transmitted by the information processing system 10, is displayed in the screens by the terminal apparatus 30.

Figure 20:
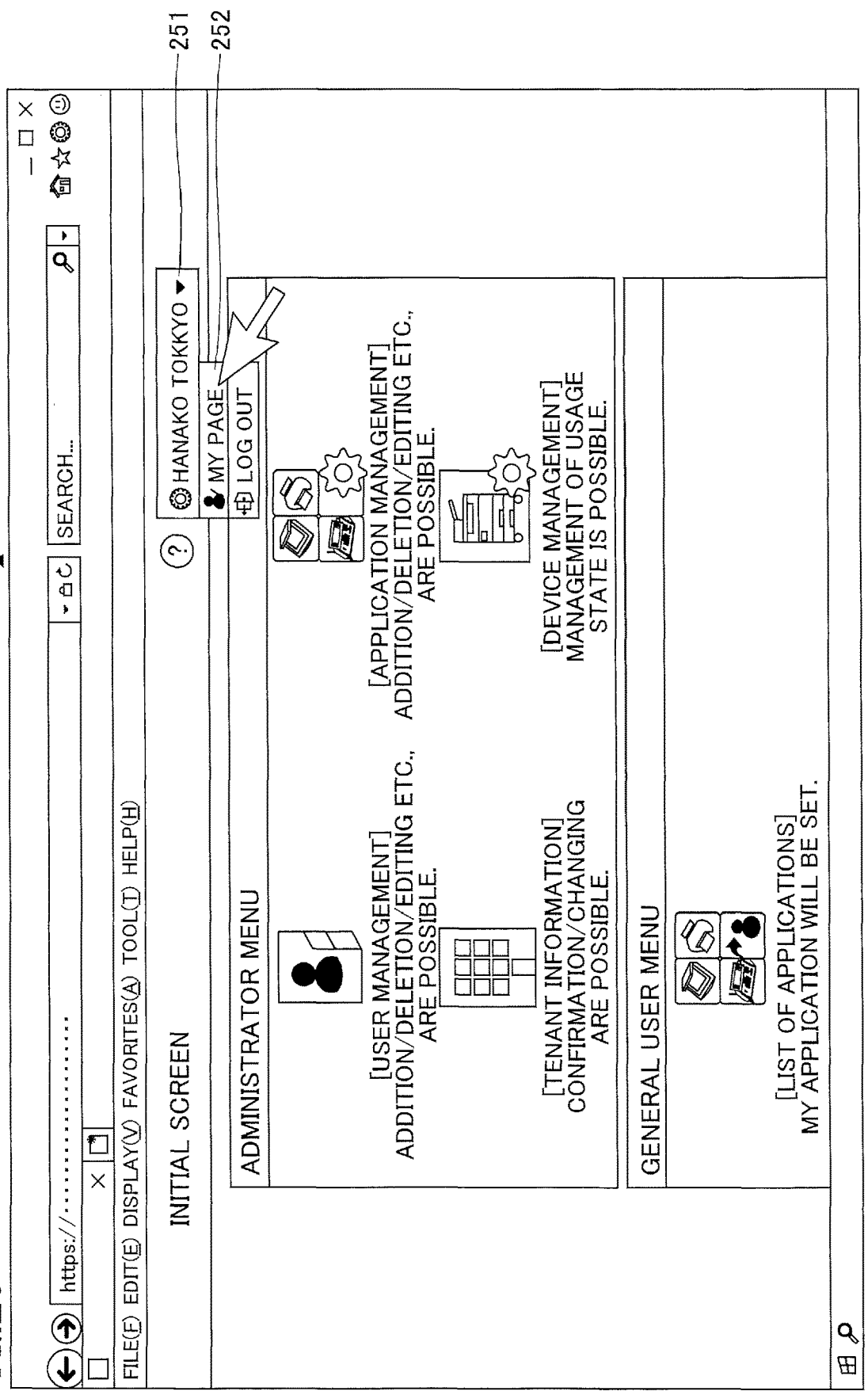
FIG. 20 is a diagram illustrating an example of an initial screen displayed by a terminal apparatus according to an embodiment of the present invention.

FIG. 20 illustrates an example of an initial screen 250 displayed by the terminal apparatus 30. The administrator has already logged in to the information processing system 10, and, therefore, the user name is displayed in a user name field 251. When the administrator presses the user name field 251, a menu is displayed, and the administrator presses a my page button 252 to display a my page in which user information is to be set. When the my page button 252 is pressed, the initial screen 250 transitions to a my page screen.

Figure 21:
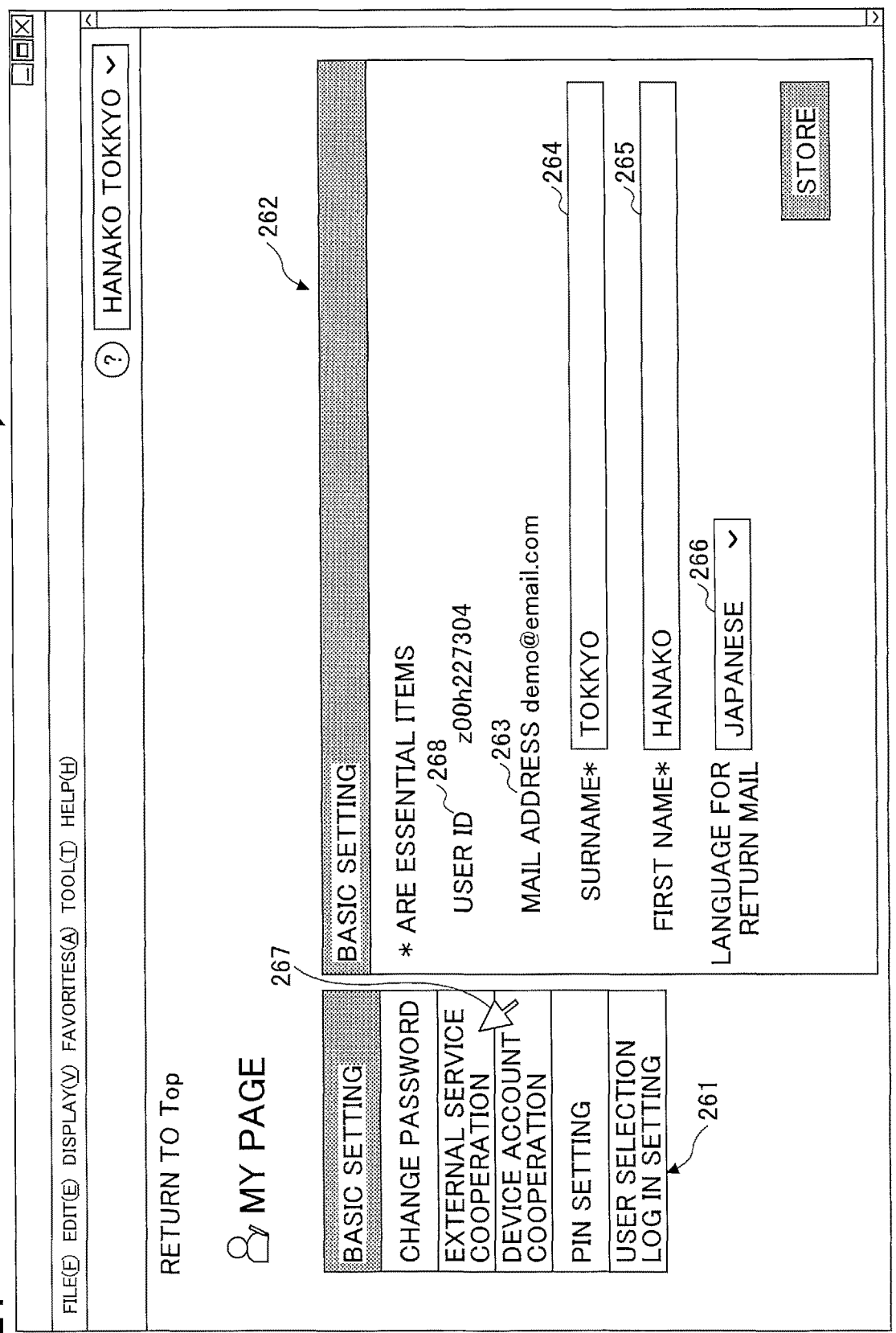
FIG. 21 is a diagram illustrating an example of a my page screen (part 1) displayed by a terminal apparatus according to an embodiment of the present invention.

FIG. 21 illustrates an example of a my page screen (part 1) 260 displayed by the terminal apparatus 30. The my page screen (part 1) 260 includes a setting content selection field 261 and a detailed display field 262. Immediately after the my page screen (part 1) 260 is displayed, the contents of the basic settings of the setting content selection field 261 are displayed in the detailed display field 262. The information processing system 10 transmits the information managed by the user managing unit 44 to the terminal apparatus 30.

In the detailed display field 262 of FIG. 21, a user ID 268, a mail address 263, a surname field 264, a first name field 265, and a language for return mail field 266 are displayed. The administrator may edit the surname field 264 and the first name field 265 and select the language for return mail in the language for return mail field 266. Editing the user ID and the mail address requires a connection to another system. When the administrator presses external service cooperation 267 in the setting content selection field 261, the screen transitions to a my page screen (part 2).

Figure 22:
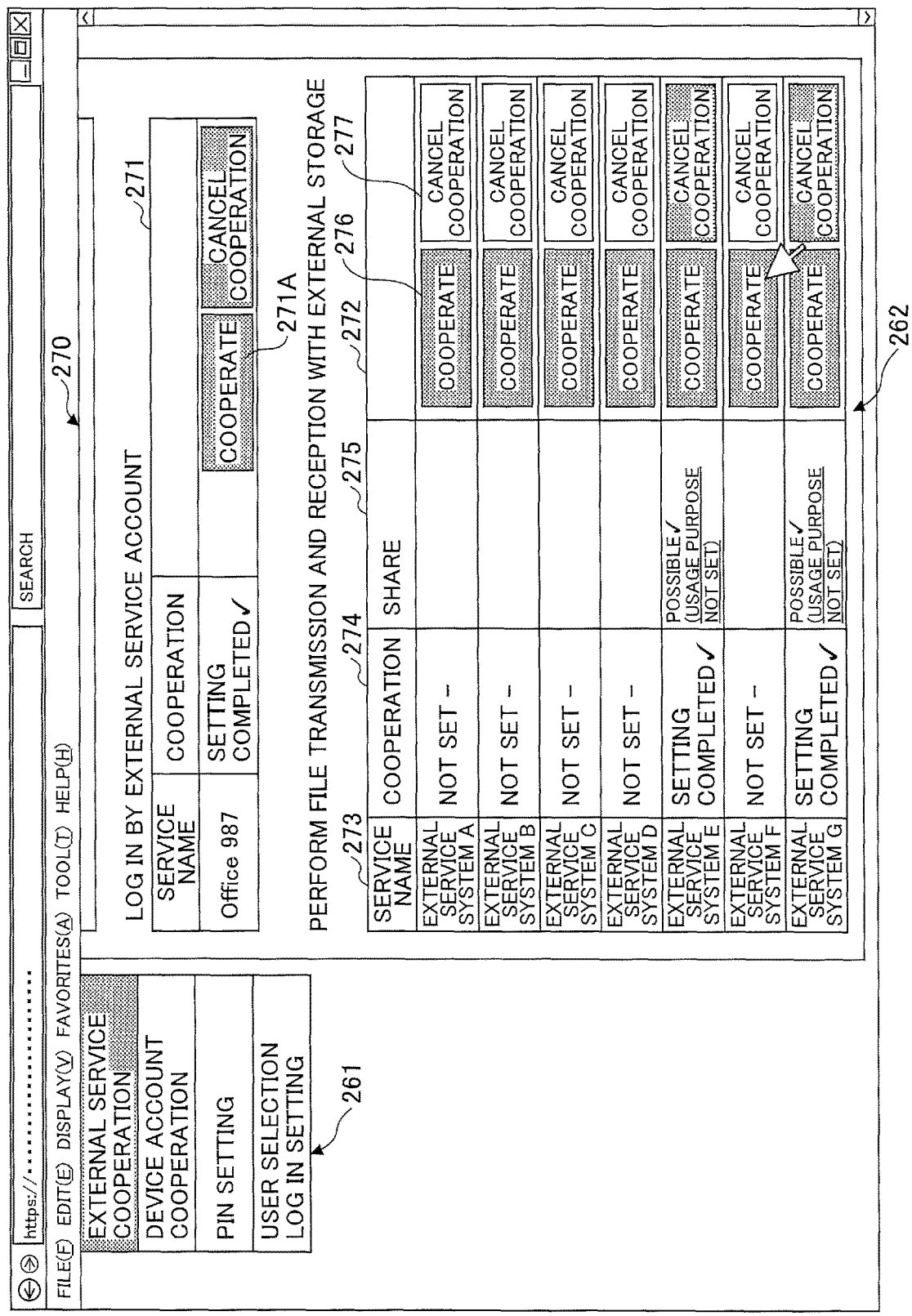
FIG. 22 is a diagram illustrating an example of a my page screen (part 2) displayed by a terminal apparatus according to an embodiment of the present invention.

FIG. 22 illustrates an example of a my page screen (part 2) 270 displayed by the terminal apparatus 30. The detailed display field 262 of the my page screen (part 2) 270 includes an external service account login setting field 271 and an external service file transmission/reception setting field 272.

The external service account login setting field 271 is a field in which the administrator sets whether to execute so-called single sign-on by using a mechanism such as OAUTH. When a "cooperate" button 271A for the external service system 40 with which the administrator wishes to cooperate, is pressed, the administrator logs in to the information processing system 10 with the account (user ID and password) of the external service system 40 displayed in the external service account login setting field 271. Thus, in this case, the administrator does not have to register the authentication information of the external service system 40.

Although OAUTH may be used in the present embodiment, a method of performing authentication with a password and the like registered in the external service system 40 will be described below. The external service file transmission/reception setting field 272 includes an external service name 273, a cooperation field 274, a share field 275, a cooperate button 276, and a cancel cooperation button 277. The external service name 273 is a list of services that can be purchased by a company to which the administrator belongs (referred to as the tenant from the information processing system 10). The external service name 273 is displayed regardless of whether the service is actually purchased. When the administrator sets the cooperation with the external service system 40 that the company has not purchased, an error indicating that there is no license is output when the cooperation source application is executed.

In the cooperation field 274, it is displayed whether cooperation has been set. The cooperation setting is displayed as "setting completed" when the information processing system 10 has been able to log in to the external service system 40 with the authentication information of the user. That is, the value of the "cooperation setting" managed by the user managing unit 44 in Table 2 is displayed.

In the share field 275, it is displayed whether the cooperation destination application of the external service system 40 can be shared with other users. The administrator can set whether to share the cooperation destination application on the screen illustrated in FIG. 23.

Figure 23:
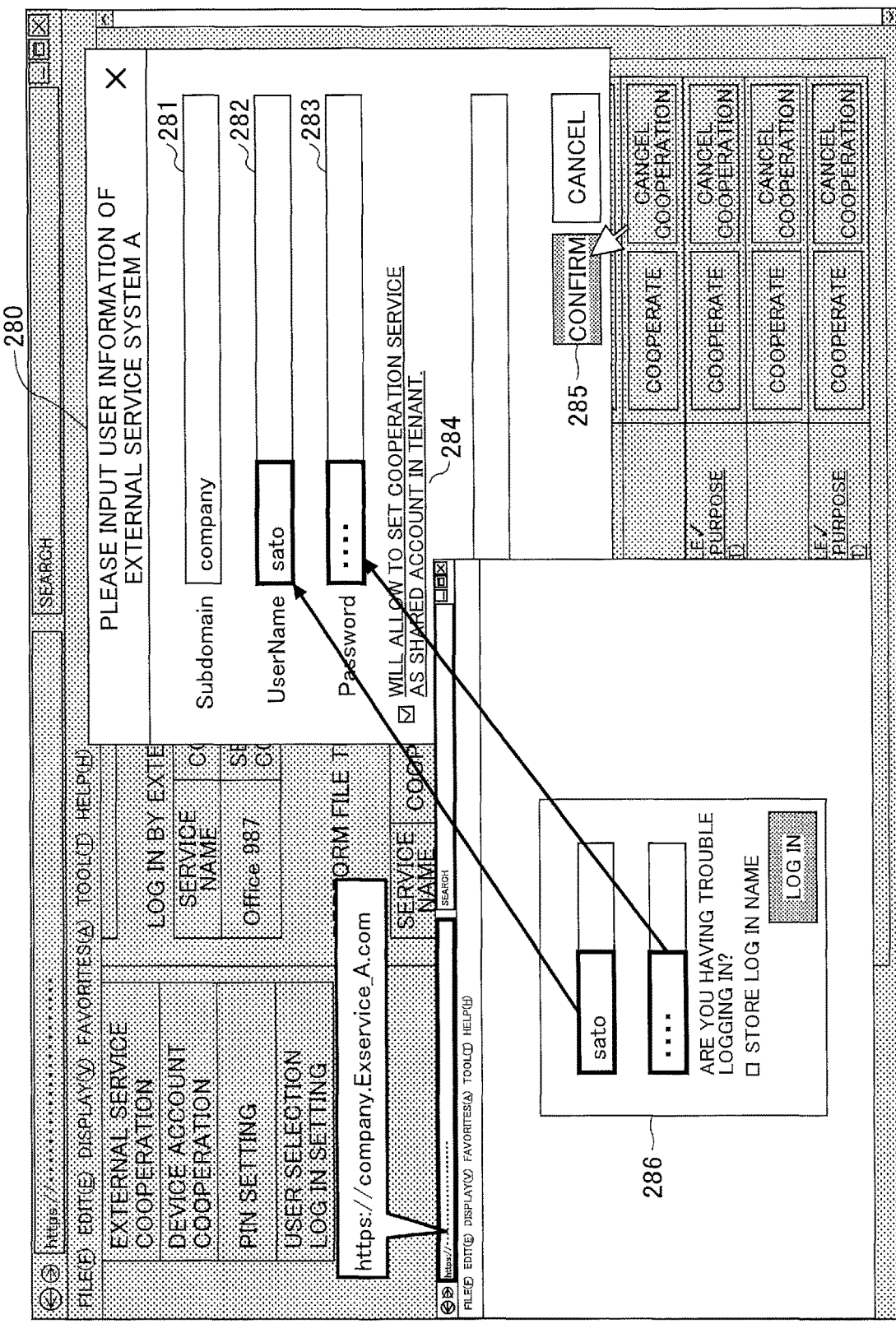
FIG. 23 is a diagram illustrating an example of an authentication information setting pop-up screen displayed by a terminal apparatus according to an embodiment of the present invention.

The cooperate button 276 is a button for the user to make settings with respect to the cooperation with the cooperation destination application of the external service system 40, and the cancel cooperation button 277 is a button for cancelling the cooperation. When the cooperate button 276 is pressed, an authentication information setting pop-up screen illustrated in FIG. 23 is displayed. The cancel cooperation button 277 can be pressed only when setting completed is set in the cooperation field 274. When the cancel cooperation button 277 is pressed, the value of the "cooperation setting" in Table 2 managed by the user managing unit 44 will no longer be "completed", and "setting completed" is erased from the cooperation field 274.

FIG. 23 illustrates an example of an authentication information setting pop-up screen 280 displayed by the terminal apparatus 30. The authentication information setting pop-up screen 280 includes a subdomain field 281, a user name field 282, a password field 283, a check box 284 for "Will allow to set cooperation service as shared account in tenant.", and a confirm button 285. Also, for the purpose of explanation, in FIG. 23, a login screen 286 of the external service system 40 is displayed.

The login screen 286 of the external service system 40 is provided for each group, such as a company to which the user belongs, and the URL of the login screen is provided for a particular company. For this reason, the URL "https://company.ExService_A.com" includes information by which a company can be identified. In the URL, "company" is the information by which a company can be identified. This is referred to as a subdomain. Such a login screen is provided due to the design of the external service system 40, and a subdomain may not be included.

The administrator inputs a subdomain in the subdomain field 281, a user name for logging in to the external service system 40 in the user name field 282, and a password for logging in to the external service system 40 in the password field 283, respectively. When the administrator presses the confirm button 285, the terminal apparatus 30 transmits a subdomain, a user name, and a password to the information processing system 10. The authentication processing unit 51 of the information processing system 10 attempts to log in to the external service system 40 with the subdomain, the user name, and the password. In the present embodiment, a case in which the login has been successfully completed will be described.

Note that the check box 284 of "Will allow to set cooperation service as shared account in tenant." is a check box for the administrator to set the cooperation destination application as a shared application. When this check box is checked, "possible" is set in the share field 275 of FIG. 22.

Figure 24:
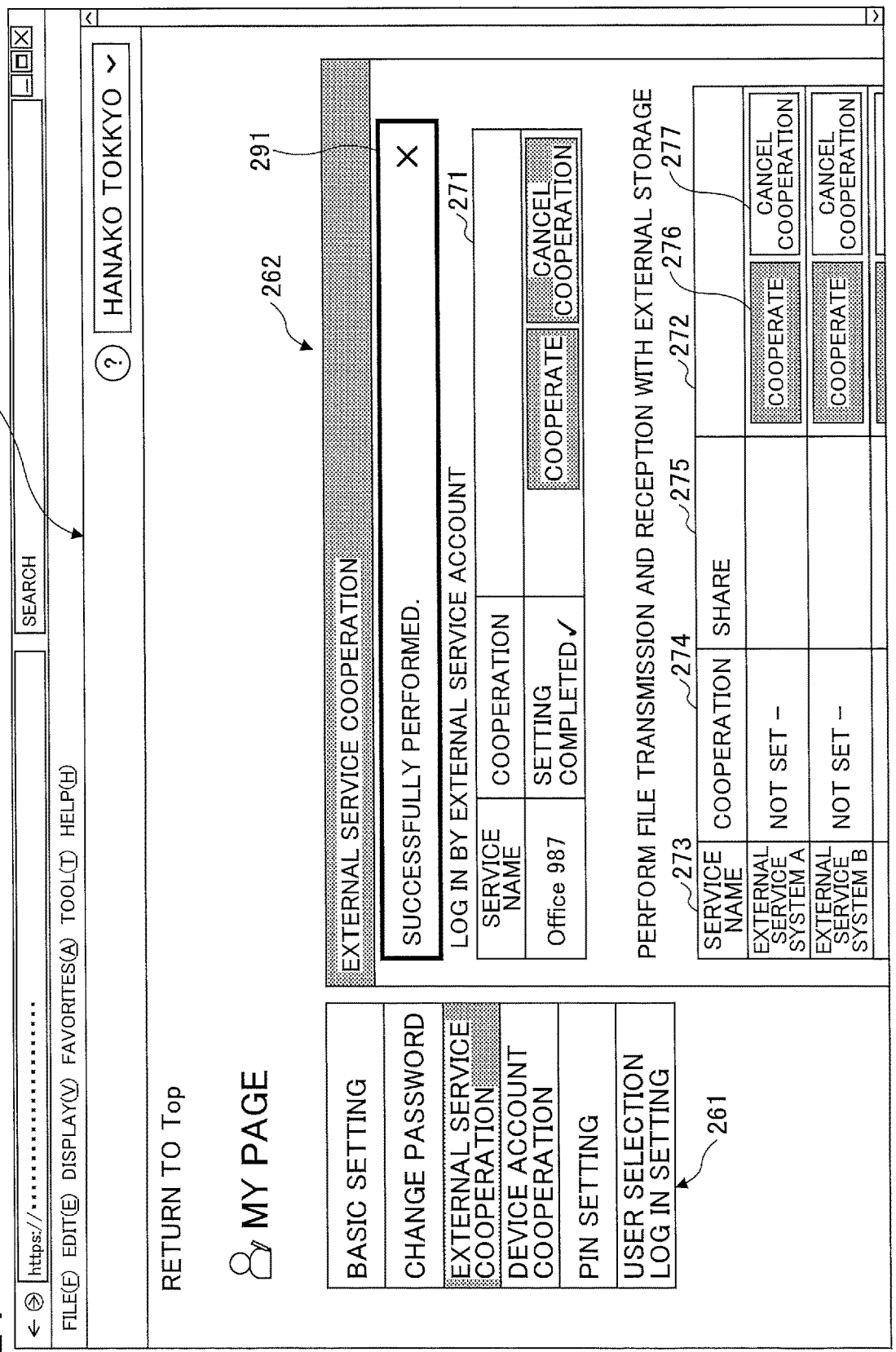
FIG. 24 is a diagram illustrating an example of a my page screen (part 3) displayed by the terminal apparatus when the information processing system has been able to log in to the external service system according to an embodiment of the present invention.

FIG. 24 is an example of a my page screen (part 3) 290 displayed by the terminal apparatus 30 when the information processing system 10 has been able to log in to the external service system 40. In the my page screen (part 3) 290 of FIG. 24, a message 291 of "Successfully performed." is displayed. That is, it is displayed that the login is completed and that the cooperation setting has been completed. When the login is completed, as illustrated in Table 2, the authentication processing unit 51 of the information processing system 10 registers the subdomain, the user name, and the password in the user managing unit 44 and registers "completed" in the cooperation setting.

<<Operation Procedure for Setting Authentication Information to Information Processing System>>

Figure 25:
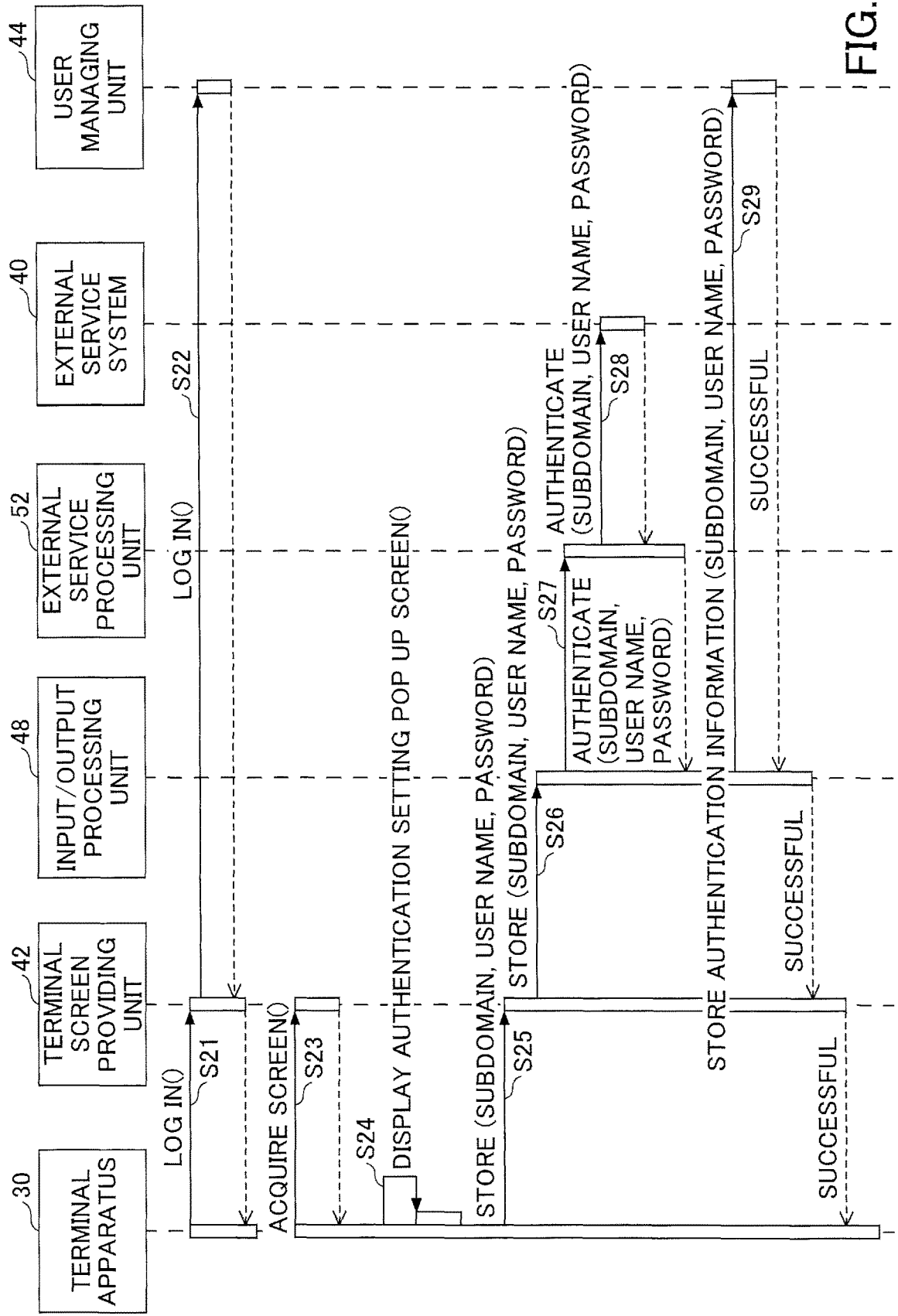
FIG. 25 is an example of a sequence diagram explaining a procedure by which an administrator registers authentication information in the information processing system according to an embodiment of the present invention.

FIG. 25 is an example of a sequence diagram illustrating a procedure in which an administrator registers the authentication information to the information processing system 10. The communication is performed by the communication unit 19 in the information processing system 10, but the communication unit 19 is omitted from the explanation of the sequence diagram below as a matter of convenience.

S21: The administrator logs in to the information processing system 10 using the user name and password of the information processing system 10. The operation accepting unit 33 of the terminal apparatus 30 accepts the input, and the first communication unit 31 specifies a user name and a password and transmits a login request to the terminal screen providing unit 42.

S22: The terminal screen providing unit 42 receives the login request. The terminal screen providing unit 42 specifies the user name and password and transmits the login request to the user managing unit 44, and, therefore, the user managing unit 44 authenticates the administrator based on whether the transmitted user name and password are registered in the user information managed therein. In the present embodiment, it is assumed that the authentication is successful.

S23: As the authentication is successful, the first communication unit 31 of the terminal apparatus 30 requests the terminal screen providing unit 42 to provide screen information of the initial screen 250, the my page screen (part 1)

260, and the my page screen (part 2) 270 according to an operation by the administrator.

S24: The first communication unit 31 of the terminal apparatus 30 receives the screen information of the initial screen 250, the my page screen (part 1) 260, and the my page screen (part 2) 270, and the display control unit 32 of the terminal apparatus 30 displays these screens. The display control unit 32 displays the authentication information setting pop-up screen 280 according to an operation by the administrator.

S25: The administrator inputs the subdomain, the user name, and the password of the external service system in the authentication information setting pop-up screen 280. The operation accepting unit 33 of the terminal apparatus 30 receives these inputs, and the first communication unit 31 transmits the subdomain, the user name, and the password to the terminal screen providing unit 42.

S26: The terminal screen providing unit 42 receives the subdomain, the user name, and the password. The terminal screen providing unit 42 requests the input/output processing unit 48 to store the subdomain, the user name, and the password. The subdomain may not be essential.

S27: The input/output processing unit 48 specifies the subdomain, the user name, and the password and requests the external service processing unit 52 to authenticate the external service system 40.

S28: The external service processing unit 52 requests the external service system 40 to perform authentication using the subdomain, the user name, and the password. In the present embodiment, it is assumed that the authentication is successful.

S29: When authentication is successful, the input/output processing unit 48 transmits the authentication information (the subdomain, the user name, and the password) of the external service system 40 to the user managing unit 44 and the user managing unit 44 stores the authentication information. Thus, the authentication information of the external service system 40 is registered in the information processing system 10.

Note that in a case where the cooperation source application is not a shared application, the authentication information set here becomes an account used in the cooperation source application. In the case where the cooperation source application is a shared application, authentication information set by the administrator can be used by each user.

In the case of an individual application that is not a shared application, the authentication process illustrated in FIG. 25 is performed for each user. Accordingly, it is possible to associate each user of the service providing system with the user of the external service system in a one-to-one manner.

Accordingly, each user of the service providing system can make an operation request as different particular users of the respective external service systems 40, from within the service providing system. Thus, for example, as will be described later, the application screen of the external service system 40 can display the user name of the external service system 40 in which the user has registered the image data. Further, the information of the external service system 40 that differs for each user can be displayed on the screen of the cooperation source application displayed by the device 20. On the other hand, in the case of a shared application, it is advantageous that each user does not need to perform an authentication process.

<Setting Cooperation Source Application of Information Processing System for Cooperating with External Service System>

Subsequently, the setting of the cooperation source application of the information processing system 10 for the information processing system 10 to cooperate with the cooperation destination application of the external service system 40 will be described. This phase is one of the phases in the preparatory stage described in FIG. 1A. This phase is performed by the administrator on the customer side in the case of a shared application, and is performed by each user in the case of an individual cooperation source application.

The administrator sets the cooperation information in the cooperation source application so that each user can cooperate with the cooperation destination application of the external service system 40. The administrator or the user has already registered, in the information processing system 10, the application process information and screen information of the "new record registration" for cooperating with the cooperation destination application of the external service system 40 in the application process information creation screen described in FIG. 10. The application of "new record registration" is a cooperation source application that adds data transmitted from the device 20 as a new record, in the cooperation destination application illustrated in FIG. 11. That is, this is a cooperation source application for adding a new row to the table managed by the cooperation destination application illustrated in FIG. 11 and storing the data in the row. Further, the application of "existing record registration" is a cooperation source application that stores the data transmitted from the device 20 in a record that already exists, in the cooperation destination application illustrated in FIG. 11; that is, this is an application for storing the data in one of the lines specified by the device 20 in the table managed by the cooperation destination application illustrated in FIG. 11.

The administrator or the user sets a cooperation destination application ID and a field code and the like as cooperation information in the application process information. Further, the administrator or the user sets information relating to the display of a screen in the screen information.

The administrator or the user connects the terminal apparatus 30 to the information processing system 10 to display the initial screen. With respect to the screens of FIGS. 26 to 32 described below, the terminal apparatus 30 transmits a HTTP request to the information processing system 10, and screen information in a HTTP response transmitted by the information processing system 10, is displayed in the screens by the terminal apparatus 30.

Figure 26:
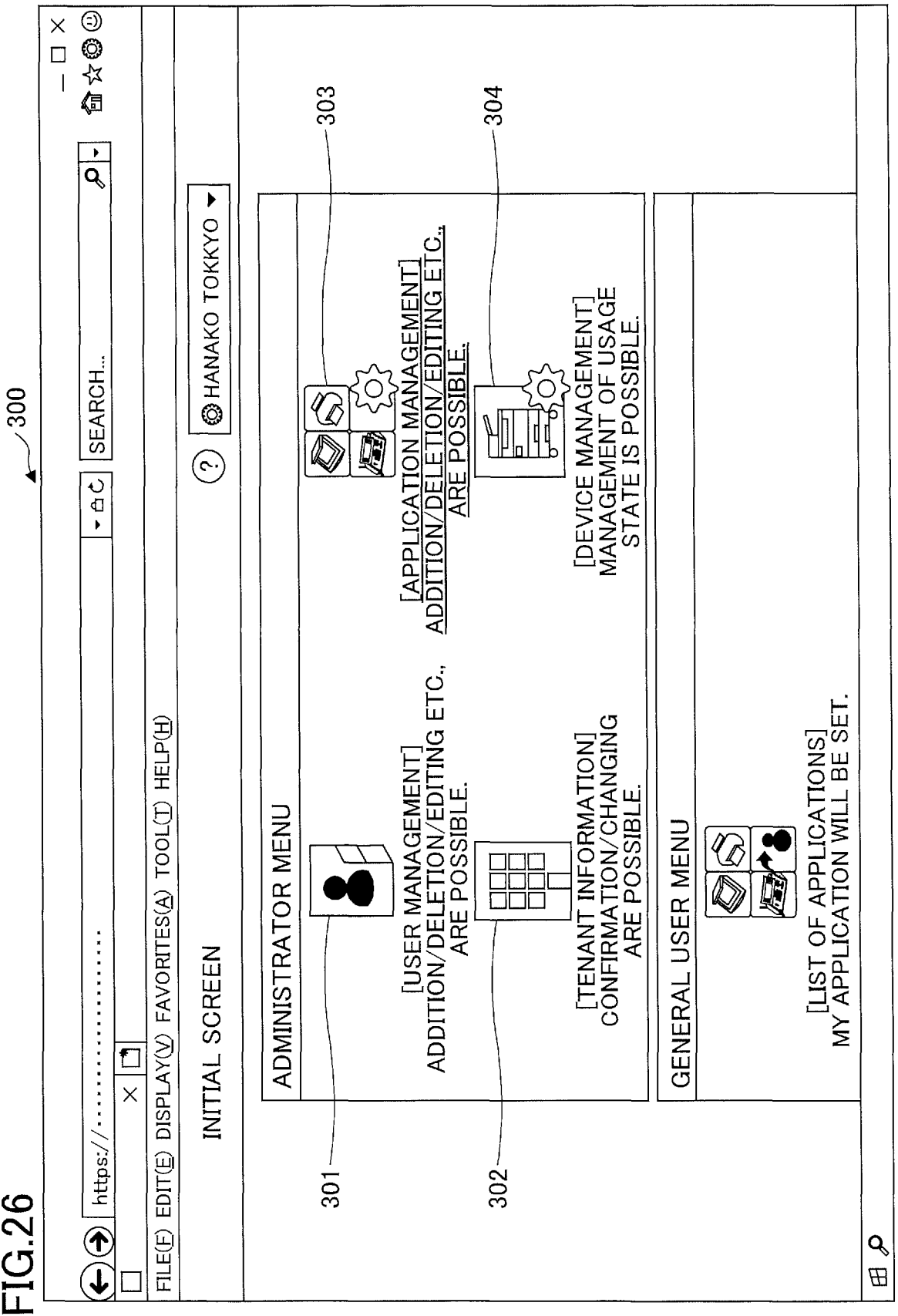
FIG. 26 is a diagram illustrating an example of an initial screen displayed by a terminal apparatus according to an embodiment of the present invention.

FIG. 26 illustrates an example of an initial screen 300 displayed by the terminal apparatus 30. The initial screen 300 includes an administrator menu and a general user menu, and the administrator menu will be described below. The initial screen 300 includes a user management icon 301, a tenant information icon 302, an application management icon 303, and a device management icon 304. The user management icon 301 is an icon for the administrator to perform the addition, deletion, editing, and the like of a user. The tenant information icon 302 is an icon for confirming and modifying the kind of contract the customer has made in relation to the cooperation source application to be provided. The application management icon 303 is an icon for performing the addition, deletion, editing, and the like of a cooperation source application (i.e., application process information). The device management icon 304 is an icon for managing how the device 20 is used. The administrator presses the application management icon 303 to edit the cooperation source application. Accordingly, a service selection screen is displayed.

Figure 27:
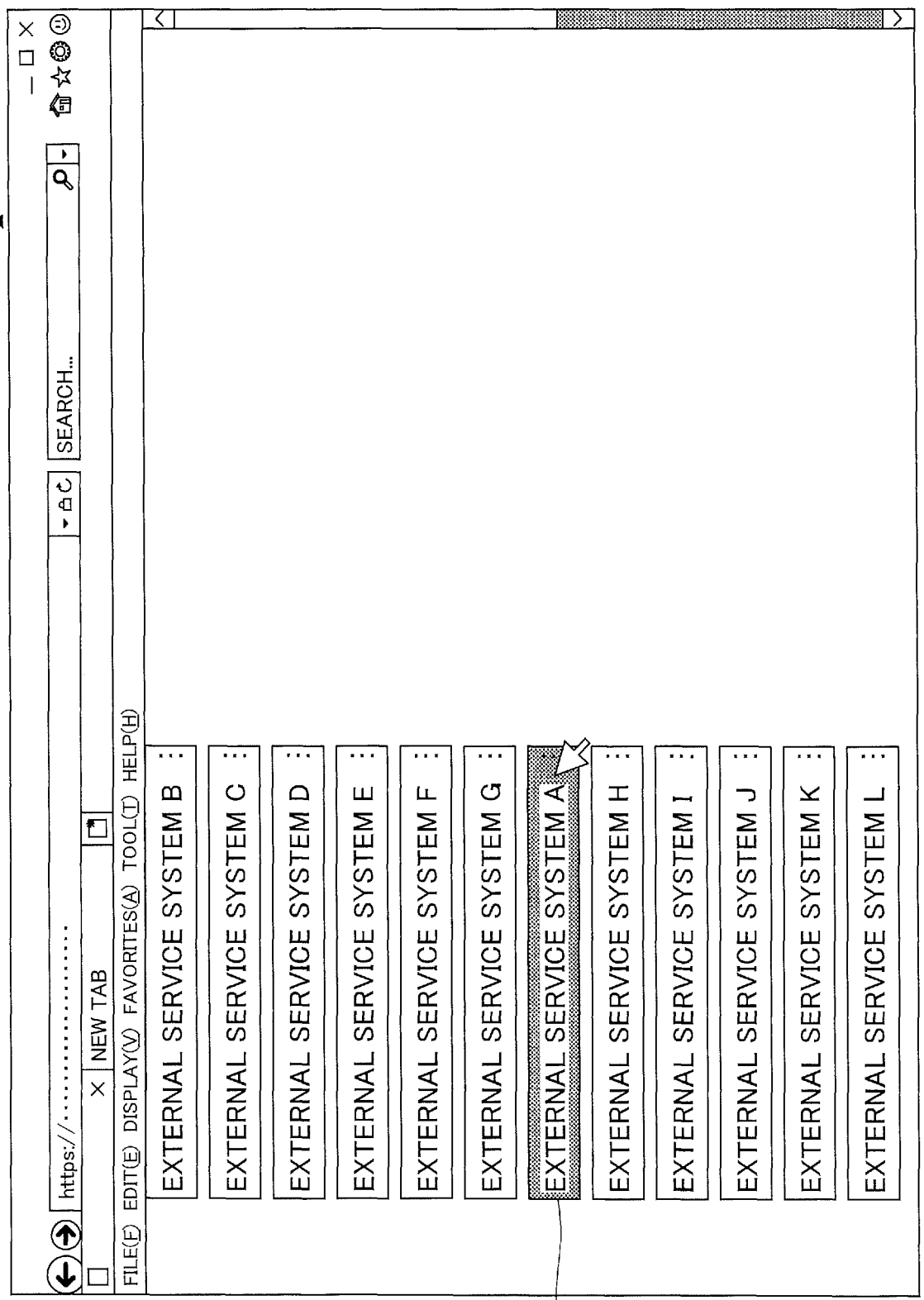
FIG. 27 is a diagram illustrating an example of a service selection screen displayed by a terminal apparatus according to an embodiment of the present invention.

FIG. 27 illustrates an example of a service selection screen 310 displayed by the terminal apparatus 30. The service selection screen 310 displays a list of names of the external service systems 40 with which the information processing system 10 can cooperate. In order to cooperate with the external service system 40, the tenant needs to purchase a license, but regardless of whether a license is possessed, a list of names of the external service system 40 is displayed.

When the administrator selects an "external service system A" 311 from the list, the information processing system 10 transmits, to the terminal apparatus 30, the application name and the like of the cooperation source application associated with the "external service system A". That is, the application data managing unit 41 identifies the cooperation source application associated with the "external service system A" from the application data and acquires the application name of the cooperation source application from the application managing unit 49.

Figure 28:
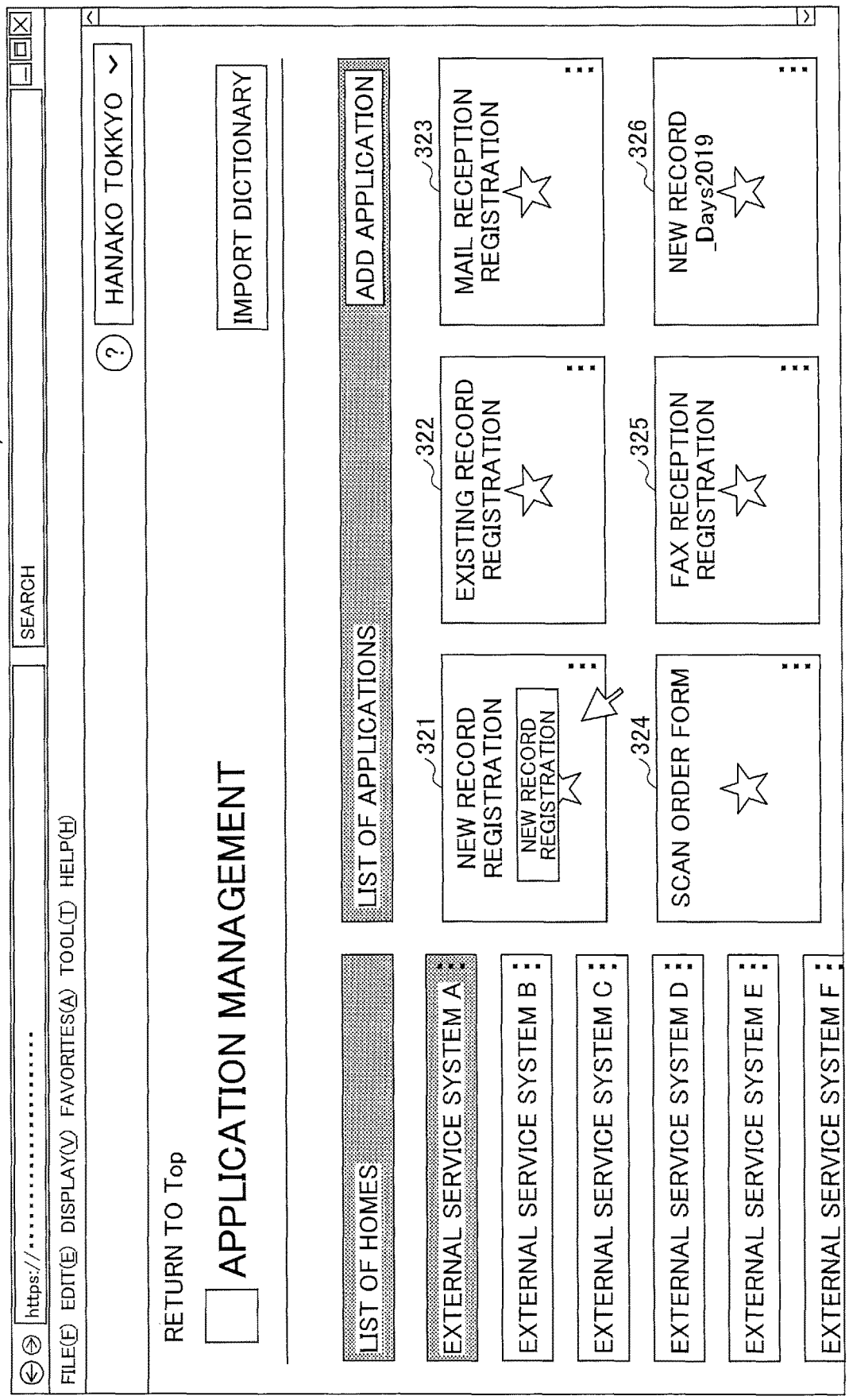
FIG. 28 is a diagram illustrating an example of a cooperation source application selection screen displayed by a terminal apparatus according to an embodiment of the present invention.

FIG. 28 is an example of a cooperation source application selection screen 320 displayed by the terminal apparatus 30. In FIG. 27, the administrator has selected "external service system A" from the list, and, therefore, the cooperation source application selection screen 320 displays the list of the cooperation source applications that cooperate with the cooperation destination application of the "external service system A". In FIG. 28, icons 321 to 326 of the six cooperation source applications are displayed, but the number of cooperation source applications depends on the number of pieces of application process information registered by the administrator. It would be sufficient if there is at least one application, but in some cases, the number may be zero before registration of a cooperation destination application.

All of these six cooperation source applications can cooperate with the cooperation destination application of "external service system A", but the cooperation destination application of "external service system A" may be the same or may not be the same. That is, different cooperation destination applications may be associated with the same cooperation source application, or the same cooperation destination application may be associated with different cooperation source applications, or different cooperation destination applications may be associated with different cooperation source applications. Further, in the case where a plurality of cooperation source applications are associated with the same cooperation destination application, the field code may be the same or may be different. In the following, a description is given by assuming that a cooperation source application of "new record registration" has been selected.

Figure 31:
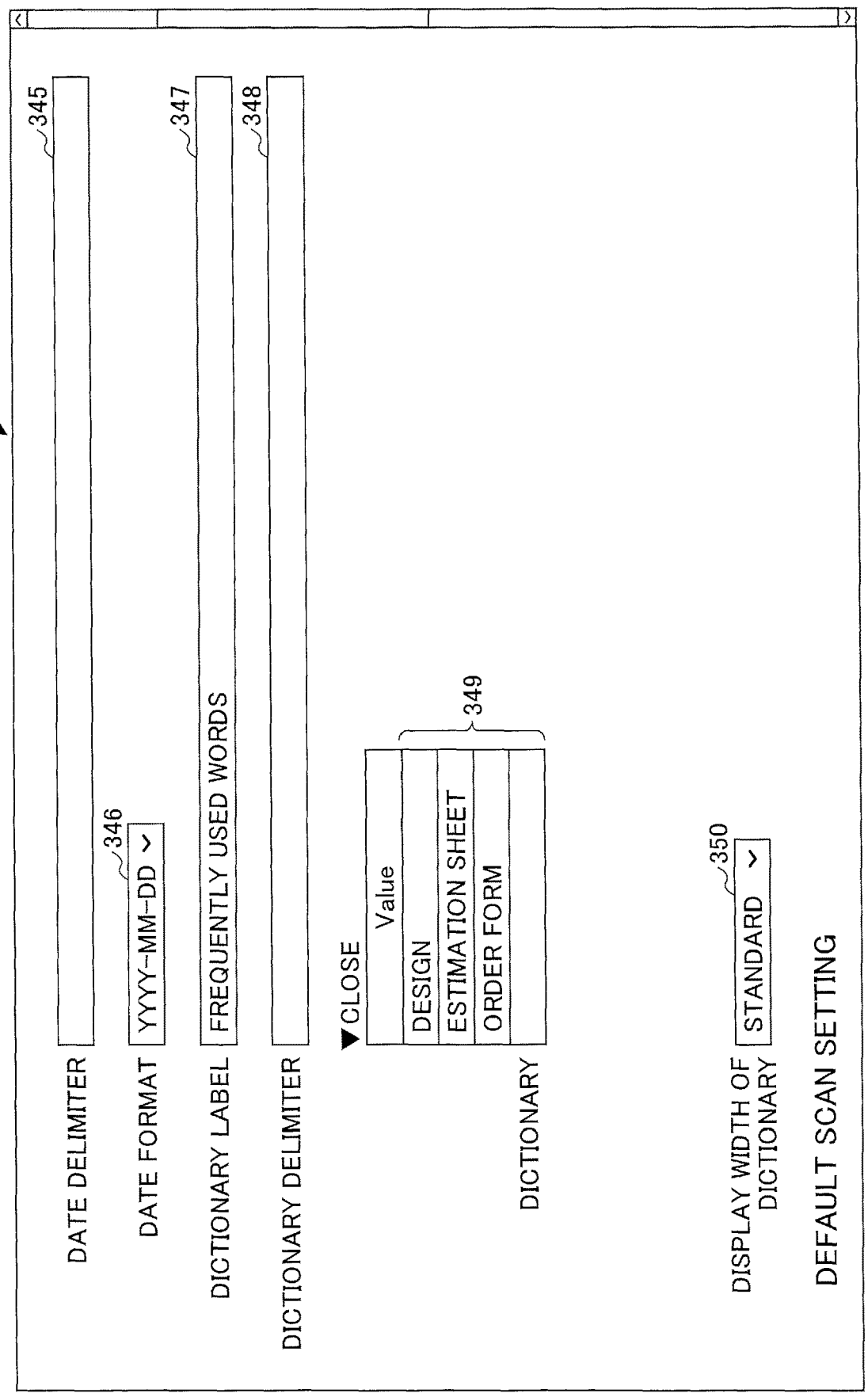
FIG. 31 is a diagram illustrating an example of a cooperation source application setting screen (part 3) displayed by a terminal apparatus according to an embodiment of the present invention.
Figure 32:
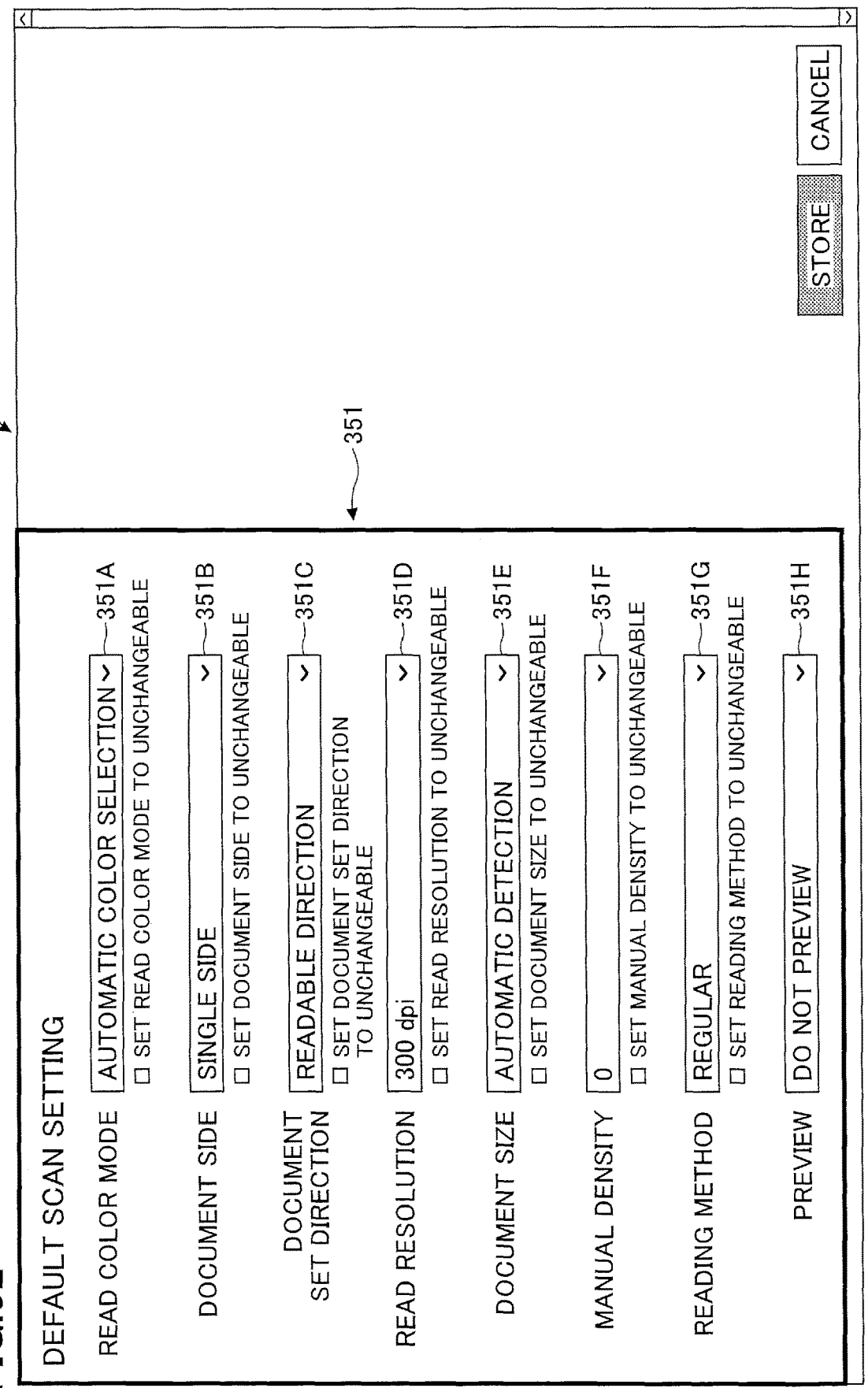
FIG. 32 is a diagram illustrating an example of a cooperation source application setting screen (part 4) displayed by a terminal apparatus according to an embodiment of the present invention.

FIG. 29 illustrates an example of the cooperation source application setting screen (part 1) 330 displayed by the terminal apparatus 30 when a cooperation source application of "new record registration" is selected, FIG. 30 illustrates an example of a cooperation source application setting screen (part 2) 340, FIG. 31 illustrates an example of a cooperation source application setting screen (part 3) 350, and FIG. 32 illustrates an example of a cooperation source application setting screen (part 4) 360. In FIG. 29, FIG. 30, FIG. 31, and FIG. 32, one screen is divided into four diagrams as a matter of convenience in creating the diagrams.

In these screens, in addition to the above-described setting (A) of cooperation information such as the cooperation destination application ID and a field code, an icon display setting (B) of how the device 20 displays the icon of the cooperation source application, a setting (C) relating to the execution of the cooperation source application, and a scan setting (D) are also included. The setting (A) of the cooperation information is set in the application data, the setting (C) relating to the execution of the cooperation source application and the scan setting (D) are set in the application process information 53, and the icon display setting (B) is set in the screen information 54.

The cooperation source application setting screens (part 1) through (part 4) include an external service name 331, a user name selection field 332, an application ID setting field 333, a space ID field 334, a character string field code field 335, a character string field input field 336, an image data field code field 337, a mail address field 338, a mail subject name field 339, an OCR language selection field 340, an output format selection field 341, a blank sheet removal setting field 342, a file name field 343, a date label field 344, a date delimiter field 345, a date format field 346, a dictionary label field 347, a dictionary delimiter field 348, a dictionary specification field 349, a dictionary display width field 350, a default print setting field 351 (a read color mode field, a document side field, a document set direction field, a read resolution field, a document size field, a manual density field, a reading method field, and a preview field).

The external service name 331 . . . . The name of the external service system 40 selected in the "external service system A" 311 of FIG. 27.

The user name selection field 332 (C) . . . . When using a shared application, it is set as to which administrator's authentication information is to be used. This is because in the case of a shared application, the user is not specified and there may be cases where multiple administrators exist. By this setting, it is possible to identify the authentication information of the user managing unit 44.

The application ID setting field 333 (A) . . . . The cooperation destination application in the external service system 40 with which the cooperation source application is to cooperate, is set by a cooperation destination application ID. The cooperation destination application ID is displayed on the terminal apparatus 30 as illustrated in FIG. 11.

The space ID field 334 (A) . . . . Identification information of the space to be managed by grouping together a plurality of coalition source applications is set.

The character string field code field 335 (A) . . . . A field for setting a field code of a character string field included in a cooperation source application. The field code is displayed on the terminal apparatus 30 as illustrated in FIG. 14. The information processing system 10 can cause the terminal apparatus 30 to display the field code.

The character string field input field 336 (B) . . . . The initial value of the character string field is set.

The image data field code field 337 (A) . . . . The field code of the field in which the image data is to be stored, is set. In addition to the manual input of the field code by the administrator, it may be possible to display the field code from a pull-down menu, etc. When the cooperation destination application ID is input in the application ID setting field 333, the terminal apparatus 30 transmits the cooperation destination application ID to the information processing system 10, and the information processing system 10 acquires, from the external service system 40, all field codes set in the cooperation destination application identified by the cooperation destination application ID. Accordingly, the terminal apparatus 30 can display a list of field codes.

The mail address field 338 (C) . . . . The mail address of the contact when an error occurs during the execution of the cooperation source application is set.

The mail subject name field 339 (C) . . . . The mail subject name is set.

The OCR language selection field 340 (C) . . . . The language to be recognized by OCR is selected. When this setting is not available, the language is automatically selected.

The output format selection field 341 (C) . . . . The format used when outputting the image data is selected.

The blank sheet removal setting field 342 (C) . . . Whether to remove a blank sheet is selected.

The file name field 343 (C) . . . . The file name of image data is set.

The date label field 344 (B) . . . . The display name of the date field is set (e.g., "creation date and time").

The date delimiter field 345 (B) . . . . The delimiter for dividing the numbers in the date ('-' in YY-MM-DD, etc.) is specified.

The date format field 346 (B) . . . . The display format of the date (the order of YY, MM, and DD) is selected.

The dictionary label field 347 (B) . . . . The display name in the dictionary field is set. A dictionary is a list of words that aids the user in inputting information in the device 20. The words in the dictionary specification field 349 (B) are displayed in the device 20.

The dictionary delimiter field 348 (B) . . . . The dictionaries and the delimiter between the dictionaries (",", ":", etc.) are specified.

The dictionary specification field 349 (B) . . . . A list of words displayed by the device 20 is specified. "Design", "estimation sheet", and "order form" are examples of words.

The dictionary display width field 350 (B) . . . . The size of the dictionary field to be displayed by the device 20 is set.

A read color mode field 351A (D) . . . . The mode of reading a document is set, from among color, monochrome, and automatic determination.

A document side field 351B (D) . . . . The side to be read (one side or both sides) is set.

A document set direction field 351C (D) . . . . The reading direction of the document is set.

A read resolution field 351D (D) . . . . The resolution when reading is set.

A document size field 351E (D) . . . . The size of the document is set.

A manual density field 351F (D) . . . . The density when reading is set.

A reading method field 351G (D) . . . . Bulk scanning or individual scanning (regular) is set.

A preview field 351H(D) . . . . Whether to display a preview is set.

<<Operation Procedure for Setting Cooperation Information, Etc., in Information Processing System>>

Figure 33:
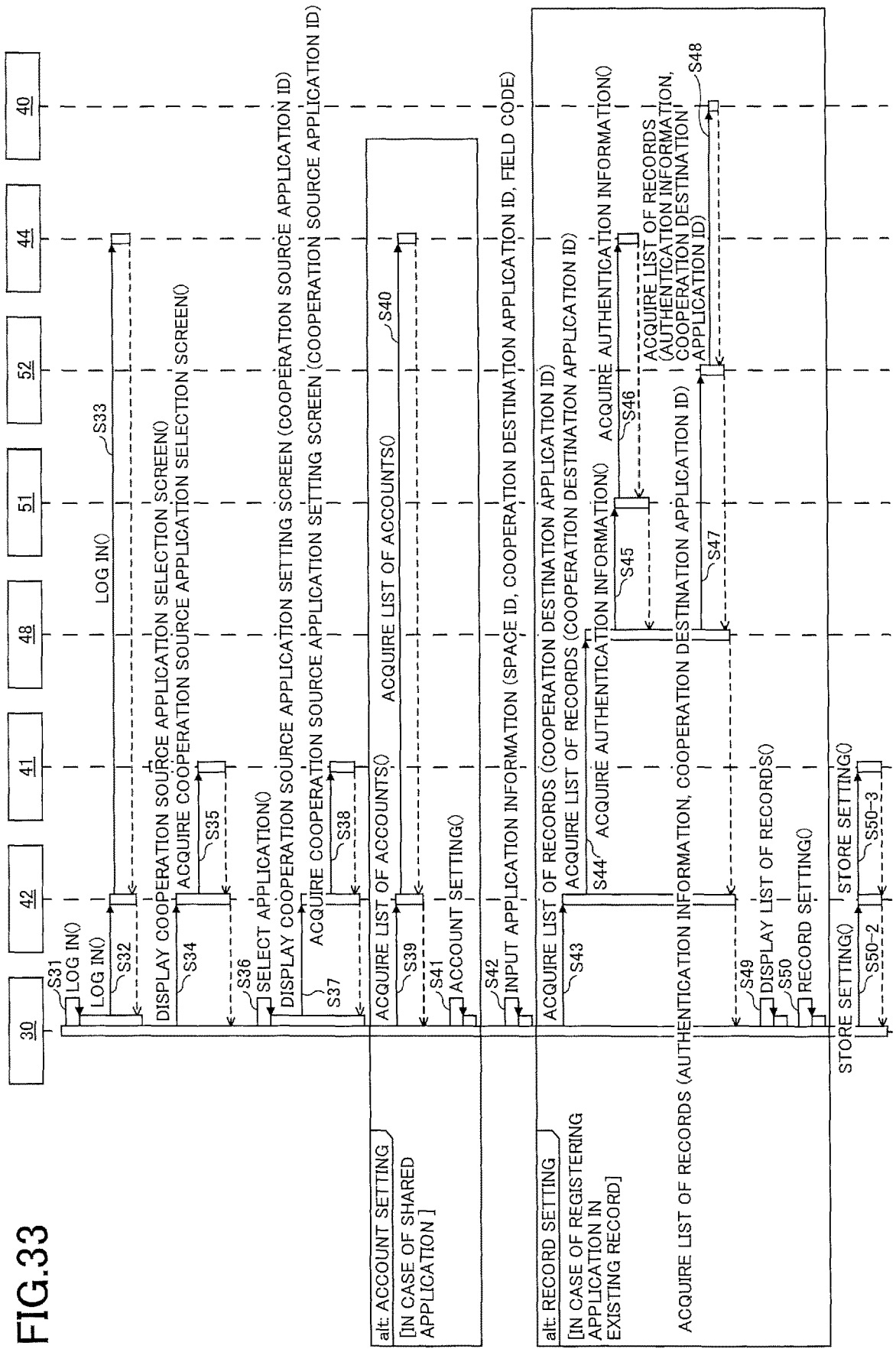
FIG. 33 is an example of a sequence diagram explaining the procedure for setting the cooperation information, etc., to the information processing system by the administrator according to an embodiment of the present invention.

FIG. 33 is an example of a sequence diagram illustrating a procedure in which an administrator sets the cooperation information in the information processing system 10.

S31 to S33: The administrator connects the terminal apparatus 30 to the information processing system 10 and logs in. The login method may be the same as that illustrated in FIG. 25.

S34: The terminal apparatus 30 displays the above-described initial screen 300 and the service selection screen 310 and the user performs an operation of specifying the external service system 40 to display the cooperation source application selection screen 320. The operation accepting unit 33 of the terminal apparatus 30 accepts the operation, and the first communication unit 31 requests the terminal screen providing unit 42 to provide the cooperation source application selection screen 320.

S35: The terminal screen providing unit 42 receives the request for the cooperation source application selection screen 320. The terminal screen providing unit 42 specifies the identification information of the external service system 40 and requests the application data managing unit 41 to provide a list of cooperation source applications. The application data managing unit 41 transmits a list of applications (the application name can be acquired from the application managing unit 49) associated with the external service system 40 to the terminal screen providing unit 42. The application list may include an application that is associated with the external service system 40 as well as an application that cooperates with another external service system or an application that does not cooperate with other systems. Accordingly, the terminal screen providing unit 42 generates screen information of the cooperation source application selection screen 320. Note that the cooperation source application selection screen 320 includes a cooperation source application ID. The terminal screen providing unit 42 includes, in in the cooperation source application selection screen 320, only the cooperation source application for which the logged-in administrator or user has the usage authority (all of the individual applications and the shared applications in the case of an administrator, and a cooperation source application for which the user has the usage authority among individual applications in the case of a user). The authorities are managed by the user managing unit 44 as illustrated in Table 2.

S36: When the administrator selects a cooperation source application, the operation accepting unit 33 of the terminal apparatus 30 accepts the selection.

S37: The first communication unit 31 of the terminal apparatus 30 transmits the cooperation source application ID of the selected cooperation source application to the terminal screen providing unit 42.

S38: The terminal screen providing unit 42 receives the cooperation source application ID. The terminal screen providing unit 42 specifies the cooperation source application ID and acquires screen information of the cooperation source application setting screens (part 1) 330 to (part 4) 360 registered in the application data managing unit 41 at the time of the application release. The screen information of the cooperation source application setting screen is transmitted to the terminal apparatus 30, and, therefore, the terminal apparatus 30 displays the cooperation source application setting screens (1) 330 to (4) 360.

S39 to S41 are executed when the cooperation source application selected by the administrator is a shared application.

S39: In the case of a shared application, it is necessary to set the administrator who is to log in. Therefore, the first communication unit 31 requests the terminal screen providing unit 42 to provide a list of accounts. In this case, the authentication information of an administrator in the same tenant as the administrator who has logged in, is requested.

S40: The terminal screen providing unit 42 receives the request for a list of accounts. The terminal screen providing unit 42 requests the user managing unit 44 to provide a list of accounts. The user managing unit 44 acquires authentication information of an administrator who belongs to the same tenant as the administrator who has logged in.

S41: The first communication unit 31 receives the list of accounts and the display control unit 32 of the terminal apparatus 30 displays the user names of administrators in the user name selection field 332 (C) in a selectable manner. The administrator sets an administrator for using a shared application. In the case of an individual cooperation source application, this setting is not necessary because the authentication information of each individual is used.

S42: The administrator inputs the cooperation information (A), the icon display setting (B), the setting relating to execution of the cooperation source application (C), and the scan setting (D), in the cooperation source application' setting screens (part 1) 330 to (part 4) 360. The operation accepting unit 33 of the terminal apparatus 30 accepts these inputs.

When the cooperation source application is for "new record registration", the setting is completed by the above steps. However, when the cooperation source application is for "existing record registration", the user registers image data in an existing record in the table of the cooperation destination application. Therefore, the setting of an initial value indicating which record is to be used for the registration, is performed in steps S43 to S50.

S43: The administrator performs an operation to acquire a record list (list of records), and the operation accepting unit 33 of the terminal apparatus 30 accepts the operation. The first communication unit 31 specifies the cooperation destination application ID and transmits the record list request to the terminal screen providing unit 42. A record list may be requested without an operation by the administrator.

S44: The terminal screen providing unit 42 receives the record list request. The terminal screen providing unit 42 specifies the cooperation destination application ID and transmits the record list request to the input/output processing unit 48.

S45: The input/output processing unit 48 specifies the administrator (or user) who has logged in and requests the authentication processing unit 51 to provide the authentication information of the external service system 40.

S46: The authentication processing unit 51 acquires the authentication information of the external service system 40 associated with the administrator, from the user managing unit 44.

S47: The input/output processing unit 48 specifies the authentication information of the external service system 40 and the cooperation destination application ID and requests the external service processing unit 52 to acquire the record list.

S48: The external service processing unit 52 specifies the authentication information (subdomain, user name, and password) and the cooperation destination application ID and acquires the record list from the external service system 40. It is preferable that the field code specified by the administrator in step S42 is transmitted to the external service system 40, and in this case, the record list of the field specified by the field code is to be acquired.

S49: The record list is transmitted to the terminal apparatus 30, and the display control unit 32 of the terminal apparatus 30 displays the record list. With reference to FIG. 34, a cooperation source application setting screen in which the record list is displayed, will be described.

S50: The administrator sets an initial value indicating which record in the record list is to be used to register the image data generated by scanning. The operation accepting unit 33 of the terminal apparatus 30 accepts the setting.

S50-2: When the administrator performs an operation of storing the information set in the cooperation source application setting screen, the operation accepting unit 33 accepts this operation, and the first communication unit 31 transmits the cooperation information (A), the icon display setting (B), the setting relating to the execution of the cooperation source application (C), and the scan setting (D) to the terminal screen providing unit 42.

S50-3: The terminal screen providing unit 42 receives the cooperation information (A), the icon display setting (B), the setting relating to the execution of the cooperation source application (C), and the scan setting (D). The terminal screen providing unit 42 sets these pieces of information in the application data managing unit 41 or the application managing unit 49, and, therefore, the application data managing unit 41 sets these pieces of information in the application data, and the application managing unit 49 sets these pieces of information in the application process information or screen information. Accordingly, the cooperation source application of the information processing system 10 and the cooperation destination application of the external service system 40 are associated with each other.

FIG. 34 is an example of a cooperation source application setting screen 370 including a record setting field. The cooperation source application setting screen 370 includes a record ID field 353. The administrator presses the record ID field 353 and the like to display a list of records in the cooperation source application setting screen 370. In FIG. 34, "2" is specified in a field code field 352, and, therefore, a list of customer names is displayed in the record ID field 353 as a list of records (an example of a setting specifying which data in the external service system is to be displayed on the device). For example, in the example illustrated in FIG. 11, "Umeko Osaka" and "Taro Umeda" are displayed. When the administrator selects a record, the record ID is displayed in the record ID field 353 corresponding to the selected record. The set record ID is set as the default of the storage destination of the data acquired by the cooperation source application in the screen information of "existing record registration".

According to this setting, in the device 20, the "customer name" (such as "Umeko Osaka" and "Taro Umeda") in the record of the record ID set in the record ID field 353 is displayed as the initial value of the data storage destination. In the field code field 352, it is possible to display a list of field codes in which each field code is associated with a field name, by using the field code and the field name acquired from the cooperation destination application. A specification of a field code, from the displayed field code list, is accepted from the administrator. A display setting field 354 specifies the method of displaying the record list.

When storing accompanying information, other than the data acquired by the cooperation destination application, in the cooperation destination application, in addition to specifying the field that is the storage destination of the the data acquired by the cooperation source application, the cooperation source application setting screen 370 accepts a specification of a field in which the accompanying information is to be stored. The accompanying information is data other than image data such as scan data, fax data, and attached file data acquired by the cooperation source application. For example, the accompanying information is information such as the user name of the user who logs in to the service providing system from the device 20, the affiliation information of the login user, the fax number, and the reception date and time. In this case, the field code field 352 of each piece of accompanying information is displayed in the cooperation source application setting screen 370 and the specification of a field code is to be accepted from the administrator.

Note that it is also possible to store accompanying information with respect to the cooperation destination application, even in the cooperation source application of "new record registration". In this case, the field code field 352 of each piece of accompanying information is displayed on the application setting screen of the cooperation source application of "new record registration" and the specification of a field code is to be accepted from the administrator.

<Example of Display of Screen of Device>

By the operations described above, the registration of the cooperation destination application to the external service system 40, the acquisition of the cooperation destination application ID, and the setting of the cooperation source application to the information processing system 10 have been completed, and, therefore, the user can operate the device 20 to execute the cooperation source application. Next, several screens that are displayed by the device 20 when the user operates the device 20 will be described. This phase is one of the phases of the execution stage described in FIG. 1B. This phase is performed by a user on the customer side.

The user can select a cooperation source application or make some simple settings, such as file names. The user operates the device 20 to display a cooperation source application list screen. With respect to the screens of FIGS. 35, 36, and 39 described below, the device 20 transmits a HTTP request to the information processing system 10, and screen information in a HTTP response transmitted by the information processing system 10, is displayed in the screens by the device 20.

FIG. 35 illustrates an example of a cooperation source application list screen 380 displayed by the device 20. As described above, the device 20 communicates with one or more of the external service systems 40 via the information processing system 10 and cooperates with the service (cooperation destination application created by customizing the service). When the user selects one of the external service systems 40, the application managing unit 49 of the information processing system 10 acquires the cooperation source application associated with the selected external service system 40, and transmits the screen information of the cooperation source application list screen 380 in which the icon of each cooperation source application is displayed on the device 20.

The cooperation source application list screen 380 of FIG. 35 includes six icons 381 to 386 corresponding to six cooperation source applications. One of these icons is the icon 381 of "new record registration". When the user presses the icon 381 of the "new record registration", a message reporting this is transmitted to the information processing system 10, the application managing unit 49 of the information processing system 10 acquires the screen information 54 associated with the cooperation source application ID of the "new record registration", and the device screen providing unit 47 generates the screen information of the setting screen of the "new record registration", and transmits the screen information to the device 20.

Figure 36:
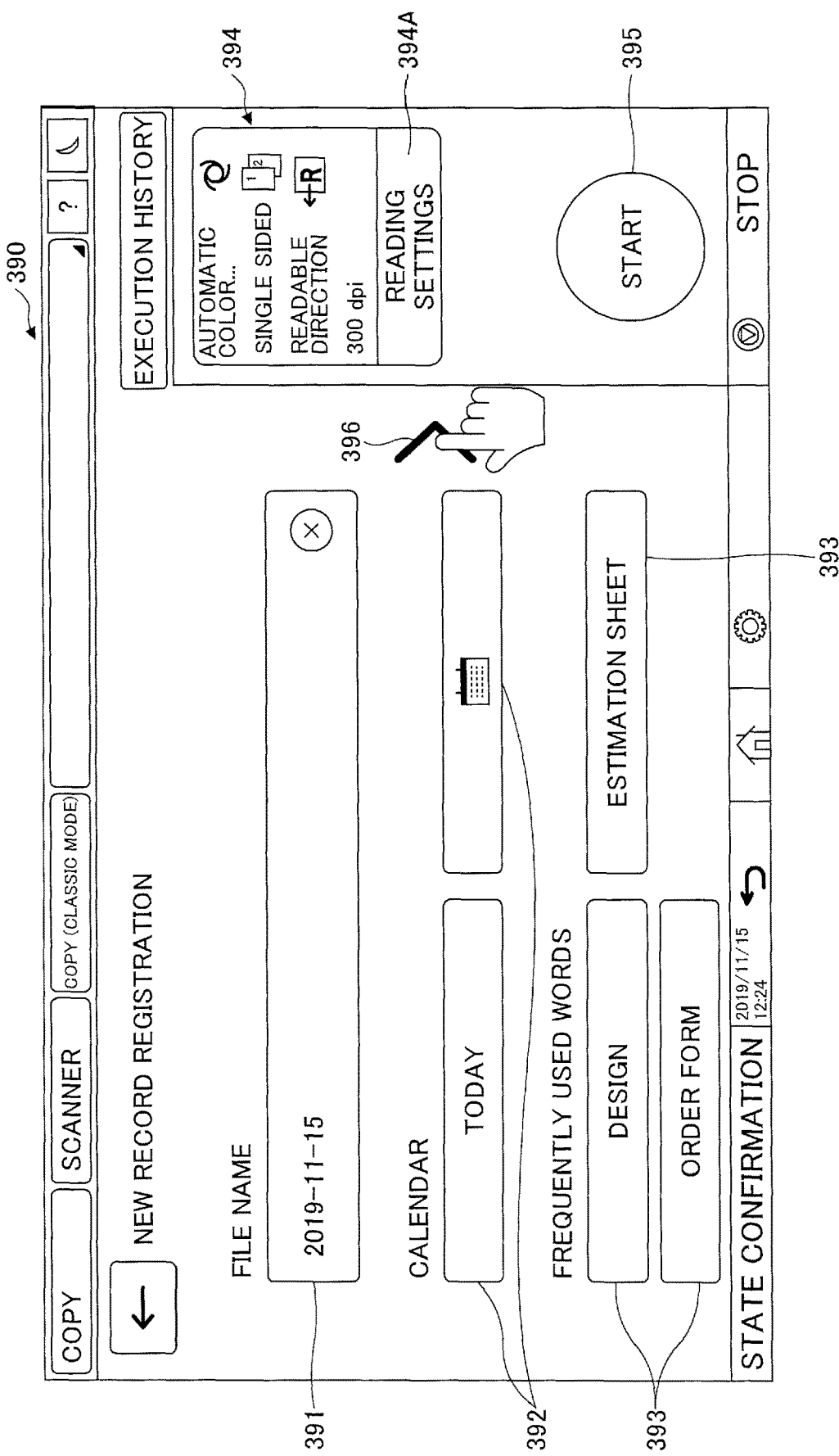
FIG. 36 is a diagram illustrating an example of a setting screen of "new record registration" displayed by the device according to an embodiment of the present invention.

FIG. 36 is an example of a setting screen 390 of "new record registration" displayed by the device 20. The setting screen 390 of "new record registration" includes a file name field 391, a calendar field 392, a dictionary field 393, a read setting field 394, a start button 395, and a transition button 396. The cooperation source application illustrated in FIG. 36 is for "new record registration", and, therefore, in this setting screen, the user cannot select a record.

The file name field 391 . . . The file name set in the file name field 343 in FIG. 30 is automatically displayed. In FIG. 36, the file name is today's date.

The calendar field 392 . . . The characters set in the date label field 344 in FIG. 30 are displayed. The calendar field 392 includes a today button and a calendar button, and the today button is used to input today's date in the file name field 391 and the calendar button is used to display a calendar.

The dictionary field 393 . . . The dictionary set in the dictionary specification field 349 in FIG. 31 is displayed. When each dictionary is pressed, the corresponding characters "design", etc., are input in the file name field 391.

The read setting field 394 . . . The read setting set in the scan setting (D) in FIG. 32 is displayed. The user can change the content set in the scan setting (D) by pressing a read setting button 394A.

The start button 395 . . . A button for the user to start executing the "new record registration" of the cooperation source application.

The transition button 396 . . . A button for causing the setting screen 390 of "new record registration" to transition to the next screen.

Figure 37A:
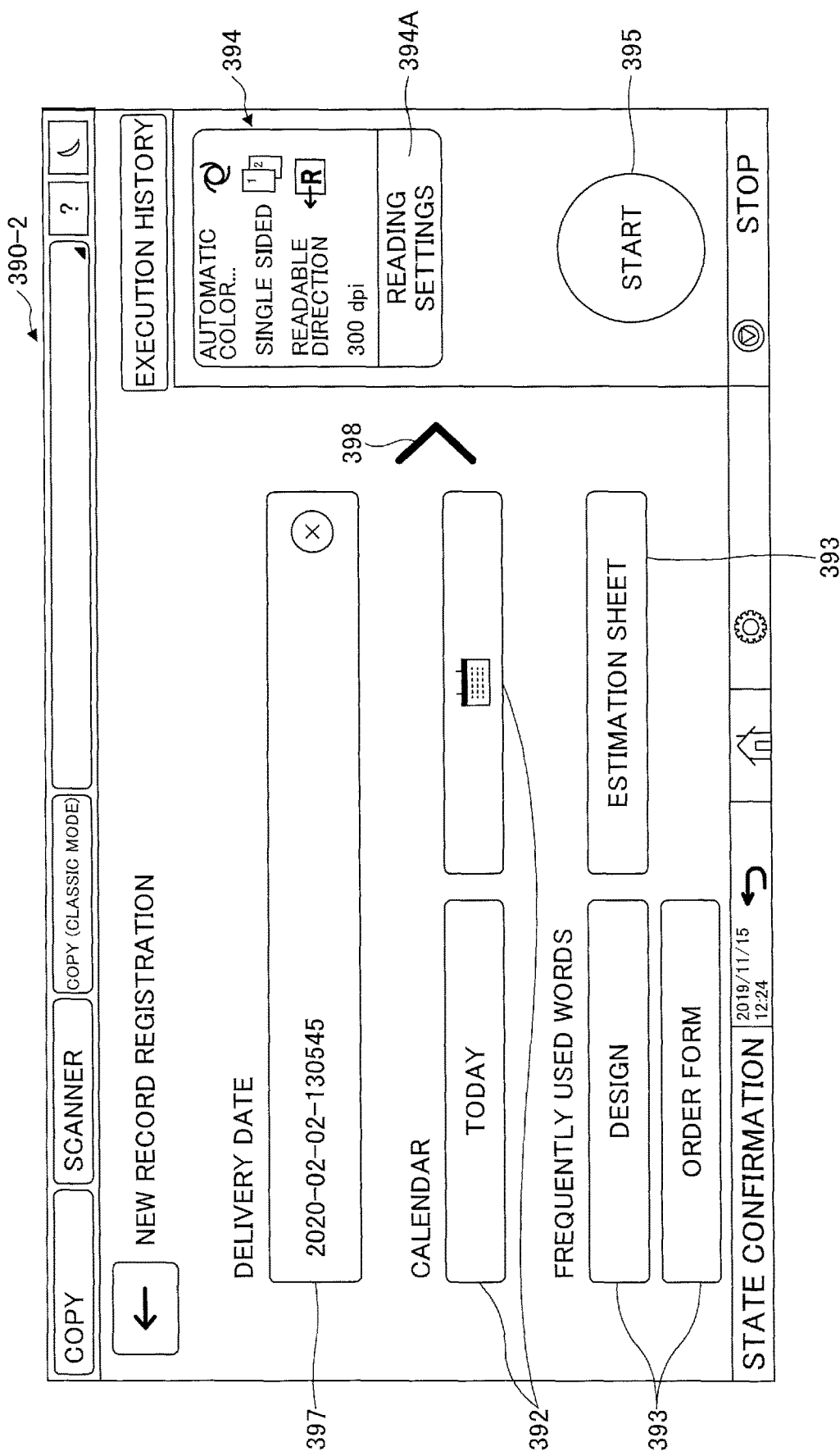
FIGS. 37A and 37B are diagrams illustrating an example of a "new record registration" setting screen displayed when the transition button is pressed according to an embodiment of the present invention.

FIG. 37A is an example of a setting screen 390-2 of the "new record registration" displayed when the transition button 396 is pressed. In the setting screen 390-2, a delivery date field 397 is displayed. The administrator can specify the information to be input in the field specified in the "field code for storing character string" in FIG. 29. For example, if a field code 6 is specified (not set in FIG. 29), the delivery date field 397 is displayed. The user may directly input a character string (date) with a keyboard or specify a character string by selecting the calendar field 392 and selecting a date from the calendar.

Figure 37B:
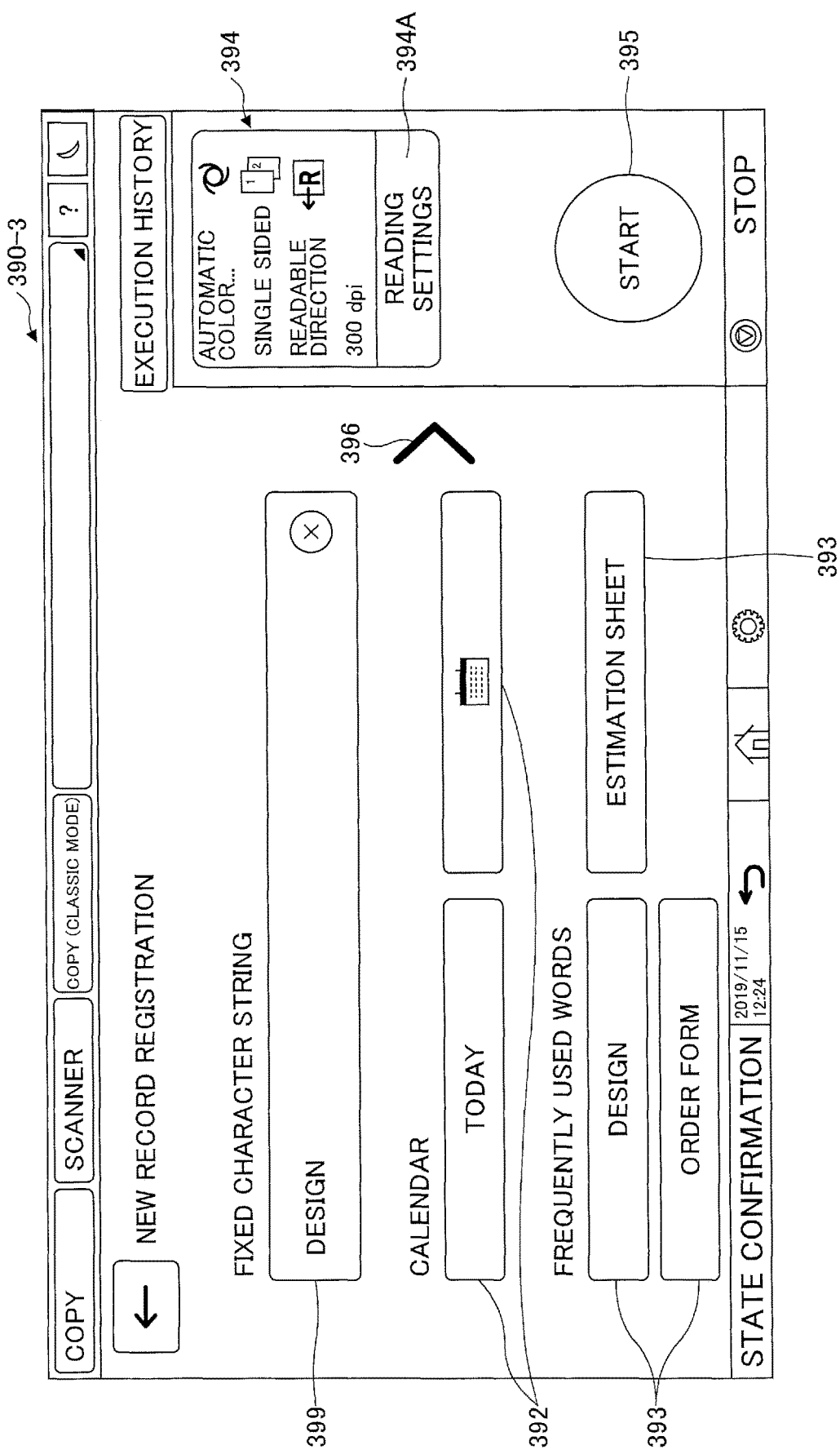

FIG. 37B illustrates an example of a setting screen 390-3 of the "new record registration" displayed when a transition button 398 is pressed. A fixed character string field 399 is displayed in the setting screen 390-3. For example, when a field of a field code 9 has been set to be displayed as illustrated in FIG. 29, the fixed character string field 399 is displayed. The user may directly input a character string with a keyboard or select a character string from the dictionary field 393.

The character string displayed in the dictionary specification field 349 can be set by the administrator from the cooperation source application setting screen (3) in FIG. 31. When an administrator adds a character string, a candidate character string is displayed in the dictionary specification field 349.

In the example of FIG. 31, the character strings of design, estimation sheet, and order form are displayed as a dictionary as illustrated in FIGS. 37A and 37B. The user can select a character string from this dictionary or combine the character strings of the dictionary. Alternatively, a character string of a dictionary may be combined with a character string directly input with a keyboard displayed on the device 20. The administrator can specify an item displayed on the device 20 (item for which the user inputs a character string) according to FIGS. 29 to 31. A field in which any character string can be input is associated with a cooperation destination application in the cooperation source application setting screen.

As described above, as data other than the image data received by fax registered in the external service system 40, a character string specified at the device 20 may be used.

<<Operation Procedure Until Device Executes Cooperation Source Application>>

Figure 38:
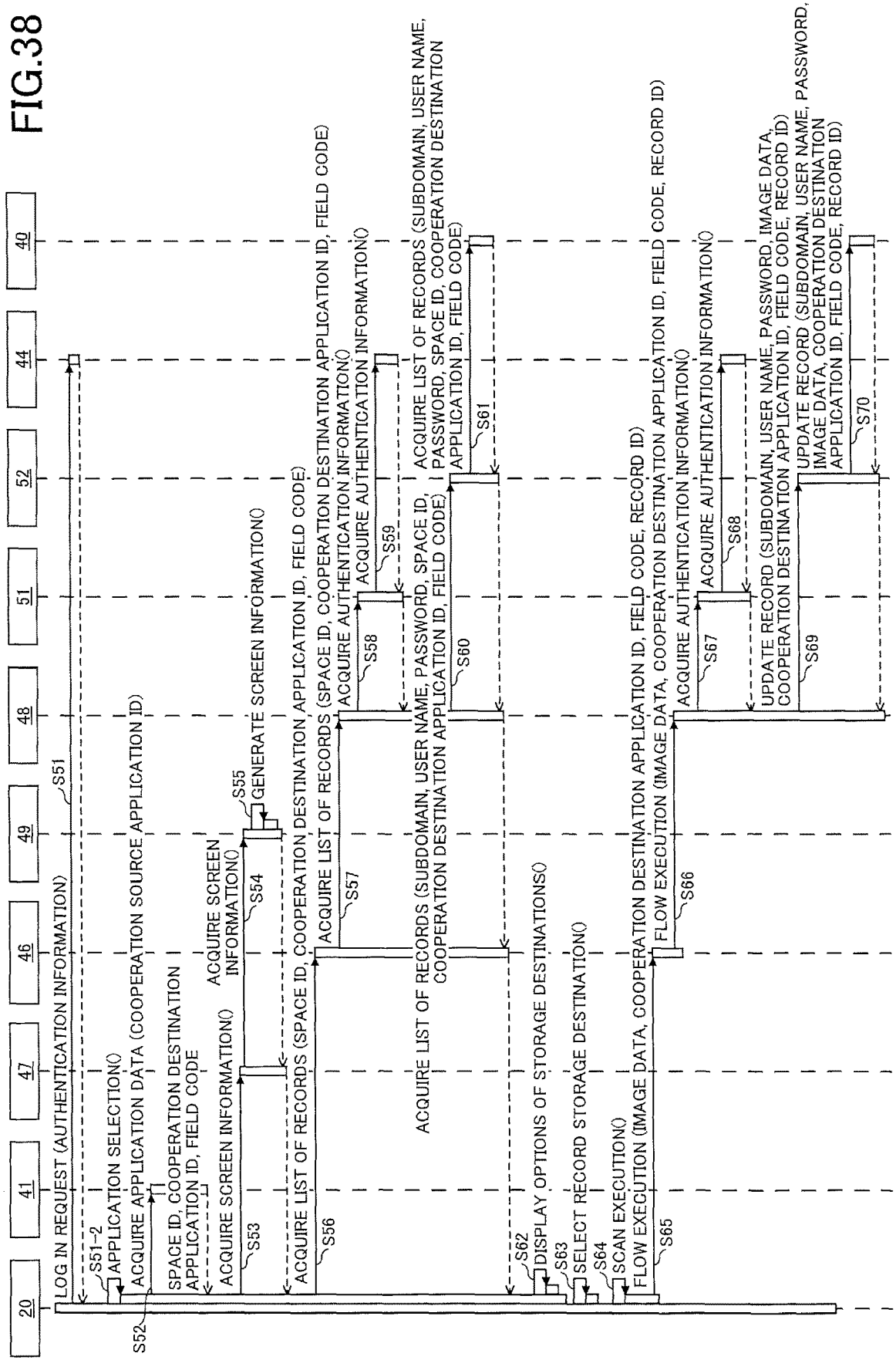
FIG. 38 is an example of a sequence diagram illustrating a procedure in which a user operates a device to display a cooperation source application list screen by the device and execute the cooperation source application selected by the user according to an embodiment of the present invention.

FIG. 38 is an example of a sequence diagram illustrating a procedure in which a user operates the device 20 so that the device 20 displays the cooperation source application list screen 380 and the cooperation source application selected by the user is executed.

S51: The operation accepting unit 23 of the device accepts input of the authentication information of the information processing system 10 from a user, and the second communication unit 21 requests log in to the user managing unit 44 of the information processing system 10. Here, it is assumed that login is allowed. Accordingly, the second communication unit 21 of the device 20 receives a cooperation source application list screen from the web service processing unit 15, and the display control unit 22 displays the cooperation source application list screen on the display.

S51-2: The user performs an operation of selecting a desired cooperation source application from the cooperation source application list screen 380. It is assumed that "existing record registration" 382 has been selected by the user from the cooperation source application list screen 380.

S52: When the operation accepting unit 23 of the device 20 accepts an operation to select a cooperation source application, the second communication unit 21 requests the application data managing unit 41 of the information processing system 10 to acquire application data (a space ID, a cooperation destination application ID, a field code, and the like). A space ID may not be necessary. By the cooperation source application ID, the cooperation destination application in which the image data, etc., is to be stored, is identified. By the field code, the field in the cooperation destination application in which the image data, etc., is to be stored, is identified.

S53: The first communication unit 31 specifies the cooperation source application ID of the cooperation source application selected by the user and requests the device screen providing unit 47 to provide a setting screen of "existing record registration".

S54: The device screen providing unit 47 receives the request for a setting screen of "existing record registration". The device screen providing unit 47 specifies the cooperation source application ID and requests the application managing unit 49 to provide a setting screen of the cooperation source application.

S55: The application managing unit 49 acquires the screen information identified by the cooperation source application ID from the application process information storage unit 17 and transmits the acquired screen information to the device screen providing unit 47. Accordingly, the device screen providing unit 47 can generate a setting screen of the "existing record registration".

S56: Because this is a case of "existing record registration", the terminal apparatus 30 acquires information relating to the record from the information processing system 10 so that a user can select a record. The second communication unit 21 specifies the space ID, the cooperation destination application ID, and the field code, and transmits a request to acquire a record list to the cooperation source application executing unit 46. A space ID may not be necessary.

S57: The cooperation source application executing unit 46 specifies the space ID, the cooperation destination application ID, and the field code and requests the input/output processing unit 48 to acquire a record list.

S58: The input/output processing unit 48 requests the authentication processing unit 51 to provide the authentication information of the external service system 40 illustrated in Table 2 corresponding to the logged-in user (the user name is known). In the case of a shared application, the authentication information of the administrator is used by a plurality of users, and, therefore, the input/output processing unit 48 requests the authentication processing unit 51 to provide common authentication information. In the case of an individual application, the input/output processing unit 48 requests the authentication processing unit 51 to provide the authentication information of the external service system 40 corresponding to the user of the information processing system. Note that for a user of the same information processing system, the information processing system may be configured such that a user of a different external service system is associated according to the application. In this case, in addition to the information of the user of the information processing system who has logged in, the input/output processing unit 48 may specify the cooperation source application ID specified in S53 and request the authentication processing unit 51 to provide the authentication information of the external service system 40.

S59: The authentication processing unit 51 acquires the authentication information (subdomain, user name, and password) of the user from the user managing unit 44.

S60: The input/output processing unit 48 specifies the authentication information, the space ID, the cooperation source application ID, and the field code and requests the external service processing unit 52 to provide a record list. A space ID and a field code may not be necessary. When there is no field code, all fields are acquired.

S61: The external service processing unit 52 receives authentication by the authentication information, specifies the cooperation destination application ID and the field code, and requests the external service system 40 to provide a record list for which the user has the editing authority. The data processing unit 63 of the external service system 40 transmits only the records for which the user identified by the authentication has the editing authority, to the external service processing unit 52. That is, as described in FIG. 11 the authority information is set for each record, and, therefore, when the user name registered as having the editing authority in the authority information and the user name identified by authentication (the user operating the device 20) match each other, the data processing unit 63 provides the corresponding record. As described above, in the record, it is possible to set the viewing authority and the editing authority for each user or group managed by the external service system 40, and, therefore, even when the device 20 acquires a record for which only the viewing authority is given, the user cannot register the data in this acquired record.

Therefore, in the case of an individual application, the record acquired may differ according to the user. For example, when a user has editing authorities for all records in the cooperation destination application, all records will be displayed as a record list in the device, and when a user has the editing authority for only some of the records in the cooperation destination application, only some of the records are displayed as options that can be selected.

Here, the user means a user of an external service cooperation system associated with the user of the service providing system who has logged in at the device. The authority differs according to the settings of the record and the field of each cooperation destination application of the external service system. For example, it is assumed that a user X can view and edit all of the records (or fields) in the cooperation destination application A, and the user X has the editing authority for only some of the records in a cooperation destination application B but does not have the viewing authority for other records in the cooperation destination application B. When the user X cooperates with the cooperation destination application A, all records are displayed in the setting screen of the "existing record registration", and when the user X cooperates with cooperation destination application B, only records for which the user X has the editing authority (only some of the records of the cooperation destination application) are displayed. Further, it is possible to make a setting such that for a cooperation destination application C, all users have the viewing authority and the editing authority for all records.

Figure 39:
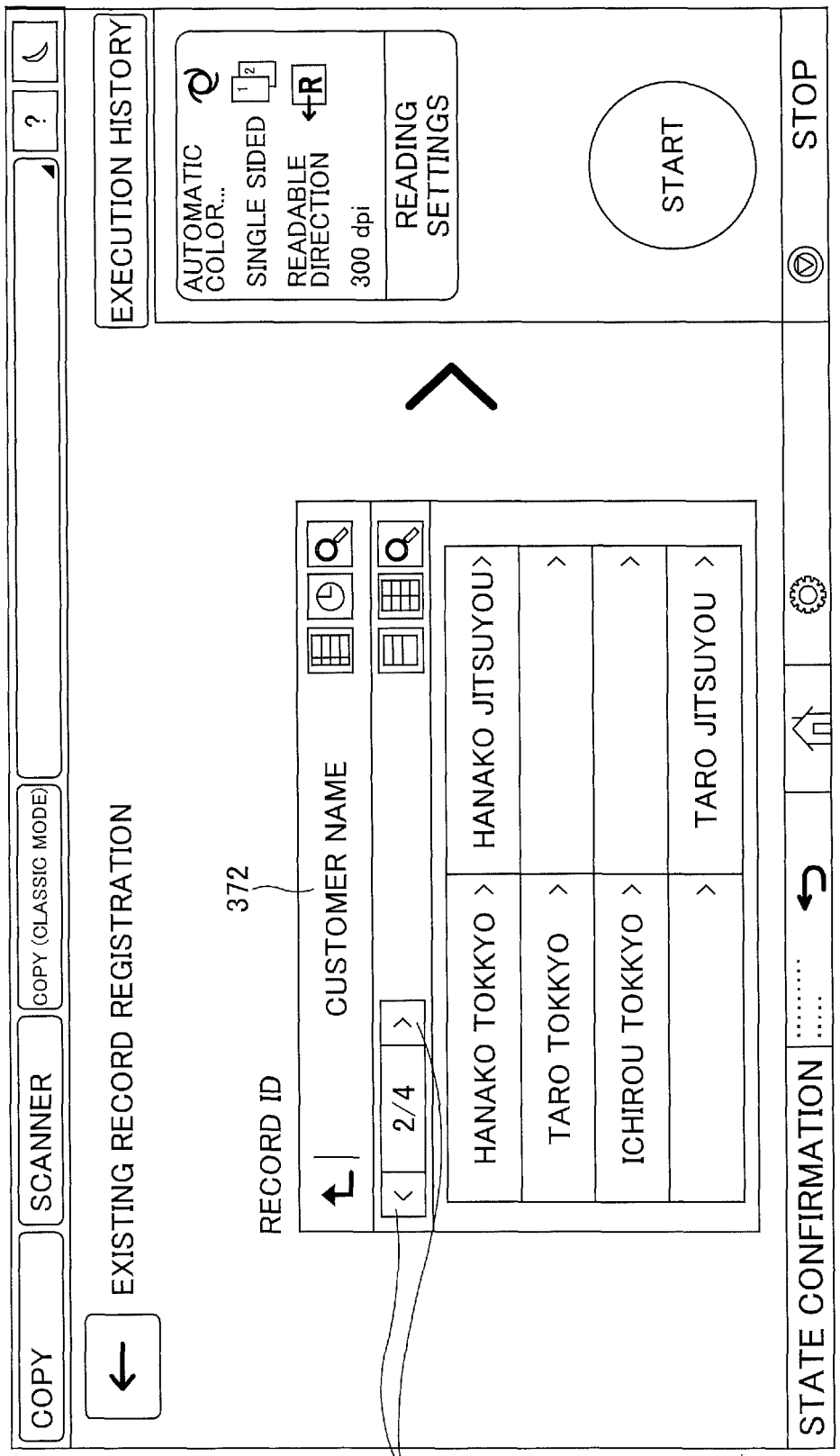
FIG. 39 is a diagram illustrating an example of a list of records displayed by a device according to an embodiment of the present invention.

S62 and S63: The record list is transmitted to the device 20, and the second communication unit 21 acquires data for which the user of the external service system 40 associated with the user of the information processing system 10 has the authority, among the data related to the cooperation source application that the external service system 40 includes. The display control unit 22 displays a screen that accepts one selection from the data for which the user has authority. The user can select a record to which the image file is to be registered. The operation accepting unit 23 accepts the data for which a selection has been accepted via the screen. The initial value of the record is already set, so the user does not have to select a value. A list of the displayed records is illustrated in FIG. 39.

S64: Next, the user presses the start button 395 to execute the scanning. The image data generating unit 24 of the device 20 scans a document and generates image data.

S65: The second communication unit 21 of the device 20 transmits the image data, the cooperation destination application ID, the field code, and the record ID to the cooperation source application executing unit 46. That is, the second communication unit 21 makes a request for the information acquired by the device 20 to be stored in the external service system 40 in association with the accepted data.

S66: The cooperation source application executing unit 46 specifies the image data, the cooperation destination application ID, the field code, and the record ID and requests the input/output processing unit 48 to execute the cooperation source application.

S67 and S68: The input/output processing unit 48 acquires the authentication information of the logged-in user via the authentication processing unit 51.

S69: The input/output processing unit 48 sets the cooperation destination application ID, the field code, and the record ID in the parameters of the application process information and transmits the image data together with the authentication information to the external service processing unit 52.

S70: The external service processing unit 52 receives authentication by the authentication information and transmits the cooperation destination application ID, the field code, the record ID set as the parameters of the application process information, and the image data, to the external service system 40. Accordingly, the data processing unit 63 can register the image data in the record identified by the record ID of the field identified by the field code of the cooperation destination application identified by the cooperation destination application ID.

In the process of FIG. 38, although the application data of the cooperation source application is transferred by the device 20 via the cooperation source application executing unit 46, when there is no change in parameters (in the case where the parameters set in the cooperation source application setting screen are transmitted to the external service system without any changes), the input/output processing unit 48 may directly refer to the application data associated with the cooperation source application ID from the application data managing unit 41. In the above sequence, the cooperation source application executing unit 46 requests the input/output processing unit 48 to perform the process, but the process may be executed via the application data service unit 11.

FIG. 39 is an example of a list of records displayed by the device 20. FIG. 39 is part of a setting screen for "existing record registration". FIG. 39 illustrates a case where a field of "customer name" is set in the field code and a list of "customer names" (a list of records) is displayed (based on the setting, the specified data included in the external service system is displayed in order to prompt the selection of a storage destination of data relating to the first application). In FIG. 39, eight "customer names" are displayed in one screen. The "customer names" that cannot be displayed are displayed when the user switches the page by using a page switching button 371. Currently, the second page of the four pages is displayed. In a field name 372, the field name corresponding to the field code set in the cooperation source application setting screen is displayed.

With respect to a "customer name" that is not displayed (a blank space in the list), this is not displayed because the "customer name" has not yet been registered in the external service system 40. That is, the image data has been registered by executing "new record registration", so a corresponding record per se exists, but the "customer name" is not registered in the record.

As described in step S61 of FIG. 38, the displayed record is a record for which the user has the editing authority. When the user has editing authorities for all of the records in the cooperation destination application, all of the records are displayed. When the user has editing authorities for only some of the records in the cooperation destination application, only some of the records are displayed as options that can be selected.

In the case of an individual application, a record for which the user of the external service system 40 associated with the user of each service providing system, has the editing authority, is displayed. Further, in the case of a shared application, a record for which the user (administrator) indicated by the authentication information of the external service system 40 associated with the cooperation source application, has the authority, is displayed.

The user can select a record for storing the image data, from the list as described above (this corresponds to requesting to store data in the external service system according to the information included in the external service system that has accepted the selection via the screen). Thus, the device 20 that executes the cooperation source application can display a setting screen of the record and to make settings relating to the external service system to be used.

Note that immediately after the device 20 displays the record list, the record set in the record ID field 353 of FIG. 34 is set.

In FIG. 39, the field code of the application data set in the cooperation source application setting screen is specified, and, therefore, a record list of a certain field is displayed, but a field list of all of the fields may be displayed. The user may select a field from the field list and the device 20 may request the information processing system 10 to provide a record list corresponding to the selected field.

<Other Settings in Cooperation Source Application Setting Screen>

Descriptions have been given with reference to FIG. 29, etc., regarding the setting of the cooperation destination application ID, the field code, or the record ID in the cooperation source application setting screen. Next, a description is given of other settings that can be made by the administrator, etc., in the cooperation source application setting screen.

Figure 40:
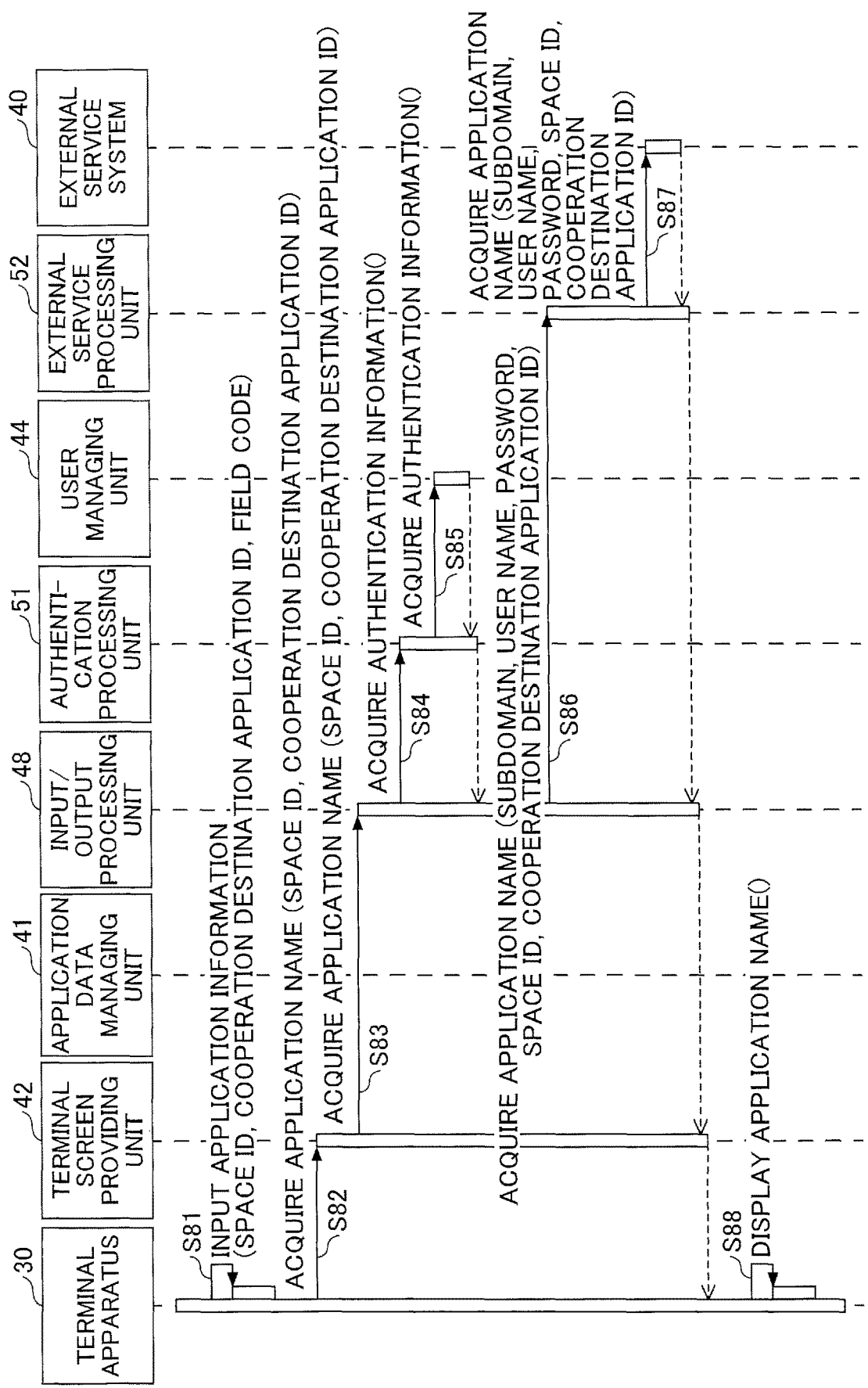
FIG. 40 is an example of a sequence diagram in which the terminal apparatus displays the name of the cooperation destination application of the external service system according to an embodiment of the present invention.

FIG. 40 is an example of a sequence diagram in which the terminal apparatus 30 displays the name of the cooperation destination application of the external service system 40. Note that the process of FIG. 40 is performed following the cooperation source application setting screens of FIGS. 29 to 32 or in a part thereof. This process is effective when the administrator wishes to confirm which cooperation destination application corresponds to the cooperation source application ID.

S81: The administrator inputs the space ID and the cooperation destination application ID of the cooperation destination application of the external service system 40. The operation accepting unit 33 of the terminal apparatus 30 accepts the input. A space ID may not be necessary.

S82: The first communication unit 31 of the terminal apparatus 30 specifies the space ID and the cooperation destination application ID of the cooperation destination application, and requests the terminal screen providing unit 42 to provide the application name.

S83: The terminal screen providing unit 42 receives the request for the application name. The terminal screen providing unit 42 specifies the space ID and the cooperation destination application ID of the cooperation destination application and requests the input/output processing unit 48 to provide the application name.

S84 and S85: The input/output processing unit 48 acquires the authentication information (subdomain, user name, and password) of the administrator that has logged in, from the user managing unit 44 via the authentication processing unit 51.

S86 and S87: The input/output processing unit 48 receives authentication by the authentication information via the external service processing unit 52 and acquires the application name of the cooperation destination application from the external service system 40 by using the specified cooperation destination application ID (if necessary, the space ID).

S88: The application name is transmitted to the terminal apparatus 30. The display control unit 32 of the terminal apparatus 30 displays the application name of the cooperation destination application.

As described above, when the terminal apparatus 30 can display the application name of the cooperation destination application, the administrator can confirm which cooperation destination application corresponds to the cooperation source application ID.

<<Display Whether User has Authority to Use Cooperation Destination Application Specified by Administrator or User>>

Figure 41:
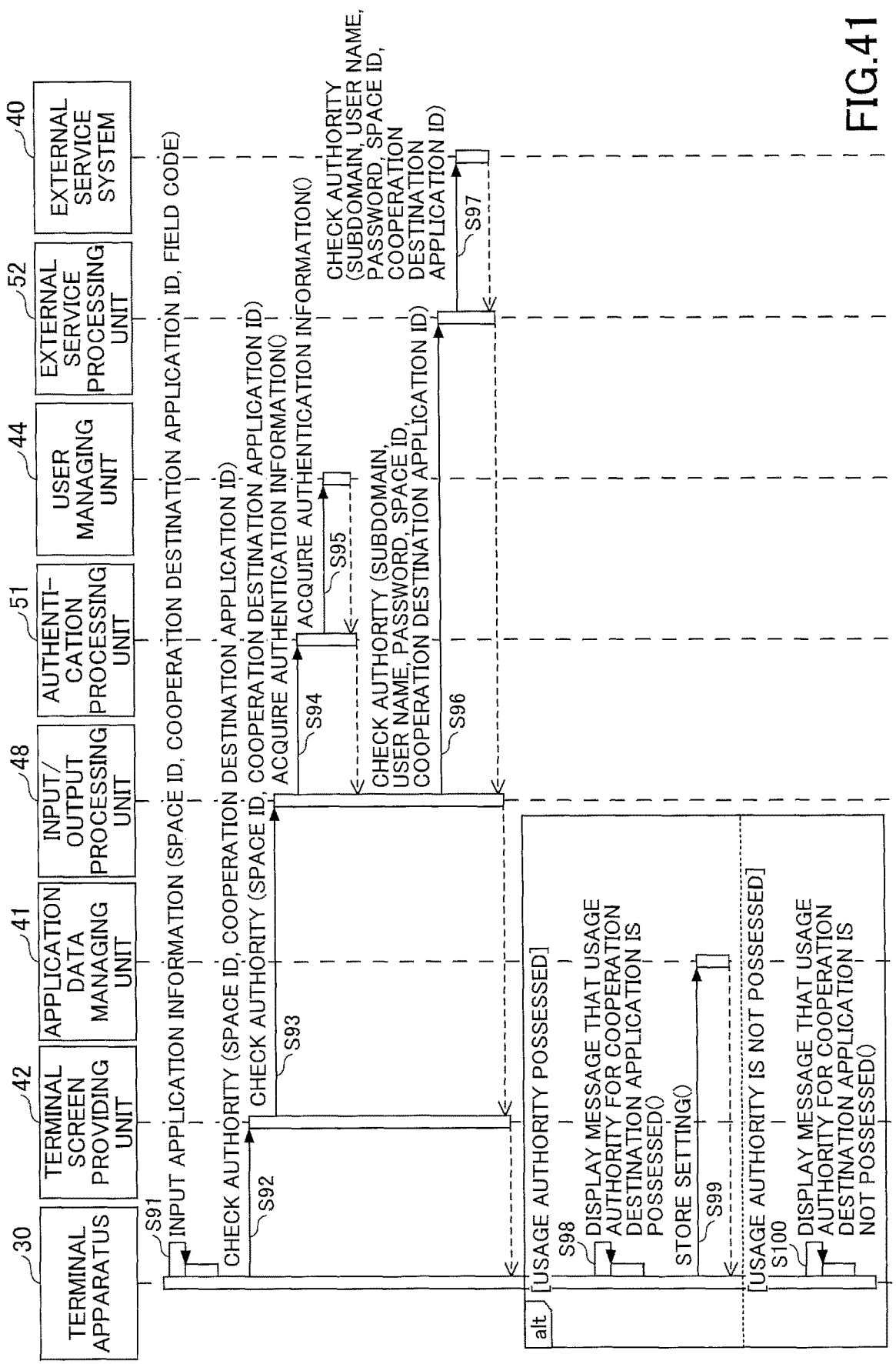
FIG. 41 is an example of a sequence diagram for displaying whether the user has the authority to use a cooperation destination application by the terminal apparatus according to an embodiment of the present invention.

FIG. 41 is an example of a sequence diagram for displaying whether the user has the authority to use a cooperation destination application, by the terminal apparatus 30. Note that the process of FIG. 41 is performed following the cooperation source application setting screens of FIGS. 29 to 32 or in a part thereof. The confirmation made by performing this process is effective because it is not possible to execute a cooperation source application when the information processing system 10 cooperates with a cooperation destination application for which the user does not have the usage authority.

S91: The administrator or the user inputs a space ID and the cooperation destination application ID of a cooperation destination application of the external service system 40. The operation accepting unit 33 of the terminal apparatus 30 accepts the input. A space ID may not be necessary.

S92: The first communication unit 31 of the terminal apparatus 30 specifies the space ID and the cooperation destination application ID of the cooperation destination application and requests the terminal screen providing unit 42 to check the authority.

S93: The terminal screen providing unit 42 receives the request for the authority check. The terminal screen providing unit 42 specifies the space ID and the cooperation destination application ID of the cooperation destination application and requests the input/output processing unit 48 to check the authority.

S94 and S95: The input/output processing unit 48 acquires the authentication information of the logged-in administrator or user from the user managing unit 44 via the authentication processing unit 51. Accordingly, the user name of the external service system 40 is known.

S96 and S97: The input/output processing unit 48 receives authentication by the authentication information via the external service processing unit 52, specifies the cooperation destination application ID (if necessary, the space ID) and the user name, and acquires information as to whether the administrator or user who has logged in from the external service system 40 has the authority for the cooperation destination application. A report of whether the administrator or user has the authority is transmitted to the terminal apparatus 30.

S98: When the user has the authority, the display control unit 32 of the terminal apparatus 30 displays a message that the user has the authority for the cooperation destination application.

S99: The first communication unit 31 of the terminal apparatus 30 transmits a message reporting that the user has the authority, to the application data managing unit 41, and stores the cooperation destination application ID in association with the user name. A user for which a report of whether the user has the authority is not given, can be recognized as a user who has not undergone the authority check, and therefore this information is displayed at the time of executing the cooperation source application from the device 20.

S100: When the user does not have the authority, the display control unit 32 of the terminal apparatus 30 displays a message that the user does not have the authority.

In this way, information indicating that the user has the authority is stored in the application data managing unit 41, and it can be known that the user can use the cooperation source application that cooperates with the cooperation destination application. In FIG. 41, the authority of the logged-in administrator or user is checked, but the authority of any user may be checked.

<<Acquire Field Code from Cooperation Destination Application ID and Display as Option>>

Figure 42:
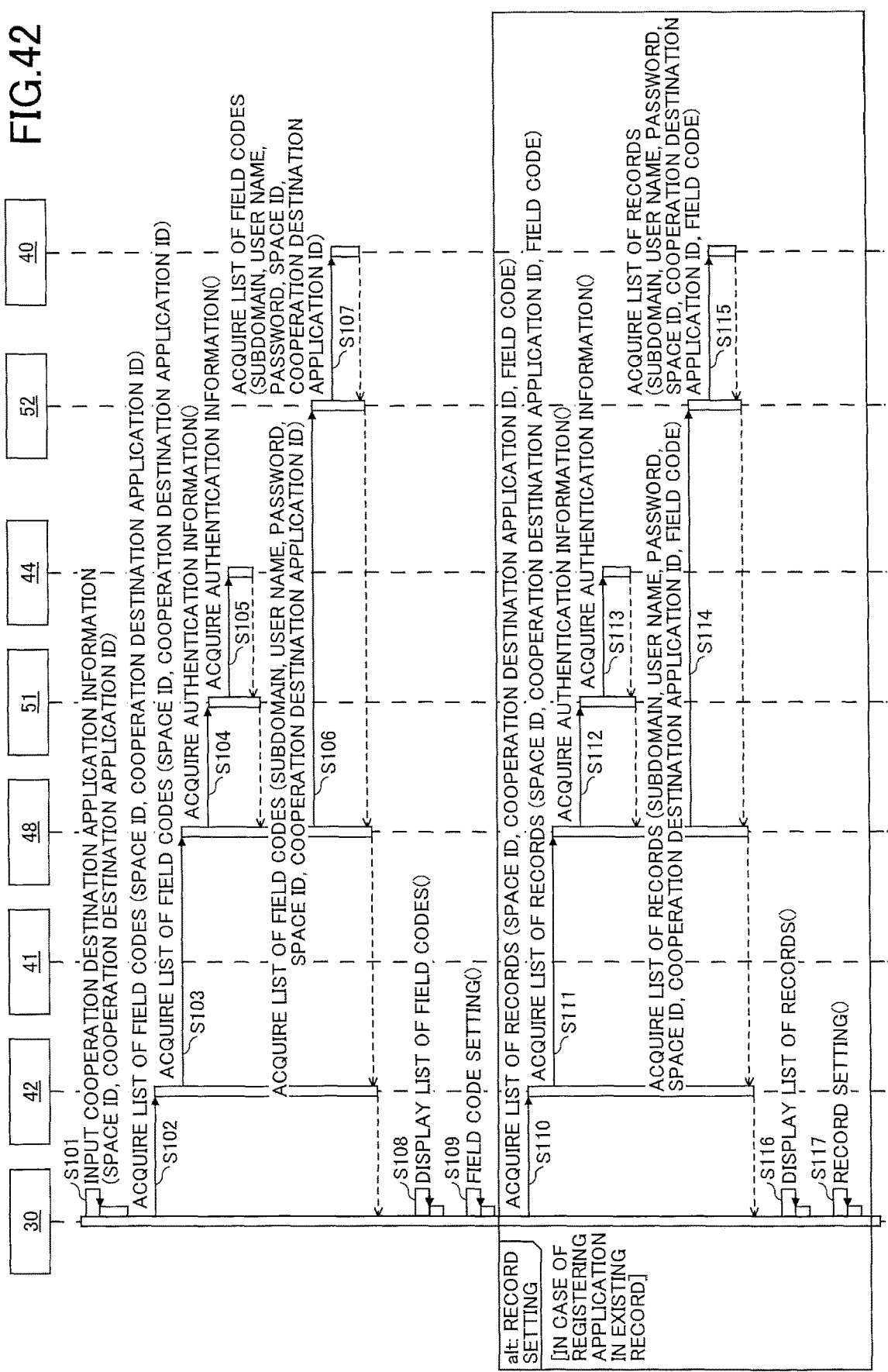
FIG. 42 is an example of a sequence diagram in which a terminal apparatus displays a field code from a cooperation destination application ID according to an embodiment of the present invention.

FIG. 42 is an example of a sequence diagram in which the terminal apparatus 30 displays a field code from the cooperation destination application ID. Note that the process of FIG. 42 is performed following the cooperation source application setting screens of FIGS. 29 to 32 or in a part thereof. This process is effective for displaying a list of field codes when the administrator does not know the field code in which the image data is to be stored.

S101: The administrator inputs the space ID and the cooperation destination application ID of the cooperation destination application of the external service system 40. The operation accepting unit 33 of the terminal apparatus 30 accepts the input. A space ID may not be necessary.

S102: The first communication unit 31 of the terminal apparatus 30 specifies the space ID and the cooperation destination application ID of the cooperation destination application and requests the terminal screen providing unit 42 to provide a field code list.

S103: The terminal screen providing unit 42 receives the request for the field code list. The terminal screen providing unit 42 specifies the space ID and the cooperation destination application ID of the cooperation destination application and requests the input/output processing unit 48 to provide a field code list.

S104 and S105: The input/output processing unit 48 acquires authentication information (subdomain, user name, and password) of the user who has logged in, from the user managing unit 44 via the authentication processing unit 51.

S106 and S107: The input/output processing unit 48 receives authentication by the authentication information via the external service processing unit 52, specifies the specified cooperation destination application ID (if necessary, the space ID), and acquires a field code list of the cooperation destination application from the external service system 40. The field code list is transmitted to the terminal apparatus 30. The field name cannot be known only by the field code, and, therefore, the field name is also to be transmitted.

S108: The display control unit 32 of the terminal apparatus 30 displays a field code list.

S109: The administrator can set which field code is to be the registration destination of the image data, from the field code list.

Similarly, the administrator can display a record list in steps S110 to S117.

S110 to S117: These steps may be the same as steps S56 to S63 of FIG. 38.

FIG. 43 illustrates an example of a field code list displayed on the cooperation source application setting screen. As illustrated in FIG. 43, a list of field names and field codes is displayed. A field code can be selected from this list, so that the administrator can select a field code in which the image data, etc., is to be stored. The administrator may specify a field and set the selected field code, for example, in the image data field code field 337 for image data of FIG. 30. The setting may be made for other fields.

<<Search for Cooperation Destination Application>>

Figure 44:
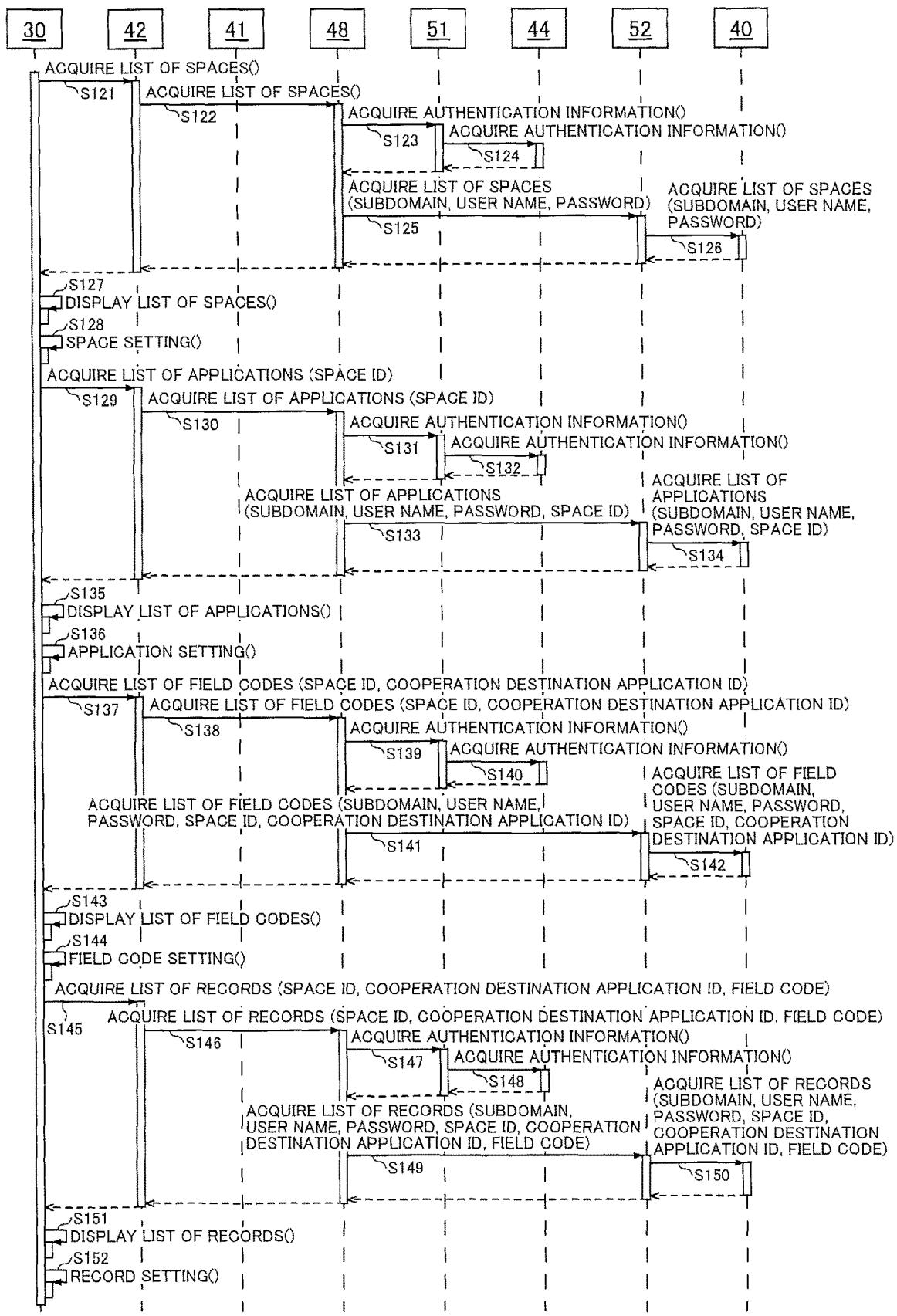
FIG. 44 is an example of a sequence diagram illustrating a procedure for an administrator to search for a cooperation destination application of an external service system according to an embodiment of the present invention.

FIG. 44 is an example of a sequence diagram illustrating a procedure for an administrator to search for a cooperation destination application of the external service system 40. Note that the process of FIG. 44 is performed following the cooperation source application setting screens of FIGS. 29 to 32 or in a part thereof. This process is effective when the administrator wishes to confirm the cooperation destination application. The administrator can make operations to display a list of cooperation destination applications, etc. When a list of cooperation destination applications is displayed, a list of field codes and a list of records can also be displayed.

S121: The administrator performs an operation of acquiring a space list. The operation accepting unit 33 of the terminal apparatus 30 accepts the operation, and the first communication unit 31 transmits the space list acquisition request to the terminal screen providing unit 42.

S122: The terminal screen providing unit 42 receives the request for the space list. The terminal screen providing unit 42 transmits the space list acquisition request to the input/output processing unit 48.

S123 and S124: The input/output processing unit 48 acquires authentication information of the logged-in user via the authentication processing unit 51 from the user managing unit 44 (subdomain, user name, and password).

S125 and S126: The input/output processing unit 48 receives authentication by using the authentication information and acquires a space list from the external service system 40. The space list is transmitted to the terminal apparatus 30.

S127: The display control unit 32 of the terminal apparatus 30 displays the space list.

S128: The administrator selects, from the space list, the space to which the cooperation destination applications, for which the administrator wishes to view a list, belong. The operation accepting unit 33 of the terminal apparatus 30 accepts a selection.

S129 to S134: The terminal apparatus 30 specifies the space ID of the space selected by the user and displays a list of applications belonging to this space. This process may be the same as steps S121 to S126, except that a space ID is specified.

S135: The display control unit 32 of the terminal apparatus 30 displays an application list. At this time, either one of the application name of the cooperation destination application or the cooperation destination application ID or both may be displayed. The administrator has specified the space ID when acquiring the application list, and, therefore, the application list in the space is displayed. When a space is not specified, all of the cooperation destination applications are displayed.

S136: The administrator selects a cooperation destination application from the displayed application list. The operation accepting unit 33 of the terminal apparatus 30 accepts the selection. For example, the administrator selects a cooperation destination application with which the cooperation source application set by the administrator is to cooperate.

S137: The first communication unit 31 specifies the space ID and the cooperation destination application ID and transmits a request to acquire a field code list to the terminal screen providing unit 42.

S138: The terminal screen providing unit 42 receives the request for a field code list. The terminal screen providing unit 42 specifies the space ID and the cooperation destination application ID and transmits a request to acquire the field code list to the input/output processing unit 48.

S139 and S140: The input/output processing unit 48 acquires the authentication information of the logged-in administrator from the user managing unit 44 via the authentication processing unit 51 (subdomain, user name, and password).

S141 and S142: The input/output processing unit 48 receives authentication by the authentication information via the external service processing unit 52, specifies the space ID and the cooperation destination application ID, and acquires a list of field codes of the cooperation destination application from the external service system 40. The field name may also be acquired. The field code list is transmitted to the terminal apparatus 30.

S143: The display control unit 32 of the terminal apparatus 30 displays a field code list. A field code or a field name or both may be displayed.

S144: The administrator selects a field to register the image data, from the displayed field code list. The operation accepting unit 33 of the terminal apparatus 30 accepts the selection. The selected field code is set in the image data field code field 337 as illustrated in FIG. 43.

S145 to S152: Similar to steps S56 to S63 of FIG. 38, the terminal apparatus 30 displays a list of records and the administrator can set the initial value of the record.

As described above, the administrator can display the space list, the application list, the field code list, and the record list, and set the cooperation destination application ID, the field code, and the record in the cooperation source application.

<Procedure of Registering User Name, Etc., in External Service System when Device Executes Cooperation Source Application>

Figure 45:
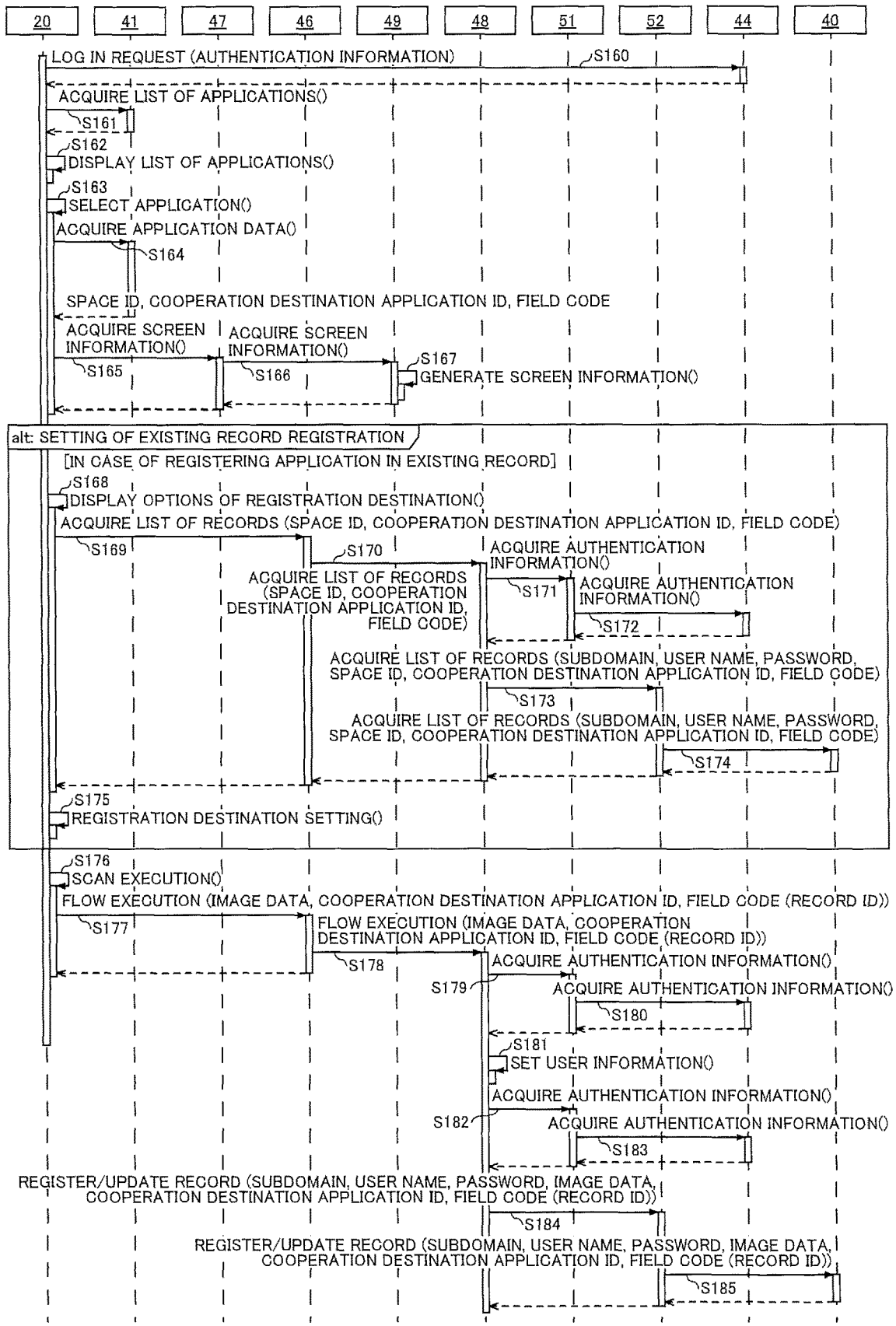
FIG. 45 is an example of a sequence diagram explaining a procedure in which a user operates a device to display a cooperation source application list screen by the device and execute the cooperation source application selected by the user according to an embodiment of the present invention.

Next, a modified example of the process in which the device 20 executes a cooperation source application will be described with reference to FIG. 45. FIG. 45 is an example of a sequence diagram illustrating a procedure in which a user operates the device 20 so that the device 20 displays the cooperation source application list screen and executes the user-selected cooperation source application. In FIG. 45, when executing a cooperation source application, accompanying information, such as the user name of the user who has logged in to the service providing system to use the cooperation source application, is automatically transmitted to the external service system 40. In the description of FIG. 45, the differences from FIG. 38 will be described.

S160: The operation accepting unit 23 of the device 20 accepts input of the authentication information of the information processing system 10 from a user, and the second communication unit 21 requests log in to the user managing unit 44 of the information processing system 10. Here, it is assumed that login is allowed.

S161: The user performs a display operation for displaying a list of cooperation source applications to cooperate with the "external service system A" by using the device 20. The operation accepting unit 23 of the device 20 accepts the authentication information of the user of the information processing system 10, and the second communication unit 21 specifies the authentication information of the user of the information processing system and the "external service system A", and transmits a request to acquire a list of cooperation source applications to the application data managing unit 41 of the information processing system 10. When the acquisition request is received, the application data managing unit 41 returns a list of the cooperation source applications associated with the "external service system A" in the application data storage unit 13. This application list may include an application provided by a service providing system other than the cooperation source application associated with the "external service system A".

S162: The second communication unit 21 of the device 20 receives a list of cooperation source applications and the display control unit 22 displays a cooperation source application list screen on the panel display unit 940a. The cooperation source application list screen may display the cooperation source application ID in association with each cooperation source application.

S163 to S167: These steps may be the same as steps S51 to S55 of FIG. 38.

Subsequently, steps S168 to S175 are executed when "existing record registration" is selected.

S168: The user performs an operation of displaying a record list of records that are to be registration destinations. As an example, a record list screen as illustrated in FIG. 39 is displayed. The operation accepting unit 23 of the device 20 accepts the operation.

S169 to S174: These steps may be the same as steps S56 to S61 in FIG. 38.

S175: The record list is transmitted to the device 20, so that the user can select the record to be the registration destination of the image file. The displayed record list may be the same as that of FIG. 39.

S176: Next, the user presses the start button to execute scanning. The image data generating unit 24 of the device 20 scans a document and generates image data.

S177: The second communication unit 21 transmits the image data and a record ID (no record ID in the case of "new record registration") to the cooperation source application executing unit 46. That is, the second communication unit 21 requests the storage of the data (image data) and the accompanying information (user name) in the external service system. In the case where the cooperation source application is a native application, the data may be transferred directly from the device 20 to the external service system 40.

S178: The cooperation source application executing unit 46 specifies the image data and the record ID and requests the input/output processing unit 48 to execute the cooperation source application.

S179 and S180: The input/output processing unit 48 acquires user information (here, information that identifies the user such as a user name) of a user who has logged in, via the authentication processing unit 51.

S181: The input/output processing unit 48 sets a user name to a parameter of the application process information. The parameter to which the user name is to be set, is determined in advance. The user name is set to "YouuserName" as described in FIG. 7.

S182 and S183: The input/output processing unit 48 acquires the authentication information in the same manner as in steps S67 and S68 of FIG. 38.

S184: The input/output processing unit 48 sets the cooperation destination application ID, the field code, and the record ID in the application process information and transmits the authentication information and the image data to the external service processing unit 52.

S185: The external service processing unit 52 accepts authentication by the authentication information and transmits, to the external service system 40, the cooperation destination application ID set to the parameter, the field code for storing the scan data, the field code for storing the user name, the user name, the record ID, and the image data. Accordingly, the data processing unit 63 can register the image data in the record identified by the record ID, of the field identified by the field code of the cooperation destination application identified by the cooperation destination application ID. In the case of "new record registration", a record ID is not specified, and, therefore, the data processing unit 63 assigns a record ID and registers the image data in a specified field of the new record. The field code for storing the scan data and the field code for storing the user name are the field codes set as the storage destinations of each piece of accompanying information and data in the cooperation source application setting screen.

In both the "existing record registration" and the "new record registration", the data processing unit 63 registers the user name in the item of the person in charge of case 213 of FIG. 11. Note that in the case of "existing record registration", the person in charge of the case may have already been registered. In this case, the data processing unit 63 does not have to change the original person in charge of the case, or may overwrite the original person in charge of the case, or may add a person in charge of the case.

Further, the data processing unit 63 sets the default authority information 214. For example, the data processing unit 63 gives the viewing authority, the editing authority, and the deleting authority to the user who has registered the image data.

Note that FIG. 45 illustrates a case where the data to be acquired by the cooperation source application is scan data. However, even when the data to be acquired by the cooperation source application is fax data, the same process can be performed to store the fax data and the accompanying information in the cooperation destination application.

FIG. 46 is an example of the cooperation destination application registration screen (part 1) 200 in which a person in charge of a case is registered. It is assumed that the user who has logged in to the information processing system 10 in the process of FIG. 45 is U002 indicated in Table 2. Further, it is assumed that the record number of the record in which the user has registered the image data is 70. Therefore, the user name "taro" of the user of the external service system corresponding to the user U002 of the service providing system is registered in the field of the person in charge of case 213. When the person in charge of the case is registered in this manner, the authority can be set according to the user who has registered the record in the authority setting screen 440 illustrated in FIG. 18. As a result, in the setting screen of "existing record registration" as illustrated in FIG. 39, the device 20 can display the records for which the user has the editing authority, including the record registered by the user from the device.

<Registration of Image Data Received by Fax in External Service System>

Hereinafter, registration of image data and data other than image data, received by fax, in the external service system 40, will be described.

FIG. 47 is an example of a cooperation source application setting screen 410 of the cooperation source application referred to as "fax reception registration", displayed by the terminal apparatus 30. In the description of FIG. 47, the difference from FIGS. 29 to 32 will be mainly explained. The cooperation source application setting screen 410 of FIG. 47 includes a field code 491 for registering a fax number, a field code 492 for registering image data, and a field code 493 for registering a reception date and time.

The field code 491 to register a fax number . . . The field code in which the fax number is to be registered, is specified.

The field code 492 to register the image data . . . The field code in which the image data received by fax is to be registered, is specified.

The field code 493 to register the reception date and time . . . The field code in which the reception date and time is to be registered, is specified.

As described above, the administrator can set field codes for the image data, the fax number, and the like in the cooperation source application setting screen 490. Accordingly, data other than the image data in addition to the image data received by fax can be registered in the external service system 40 by the device 20.

Data other than image data does not include metadata and the like that is integral with image data, and is data that is handled independently of image data. The type of data other than image data varies depending on the cooperation source application. "Metadata" refers to data describing the meaning of data. That is, metadata is data including information relating to certain data. The metadata is not the data per se, and is data about the data, and is therefore referred to as meta (higher level) data. For example, the metadata is data is managed by the exchangeable image file format (EXIF) of a Joint Photographic Experts Group (JPEG) image.

Figure 48:
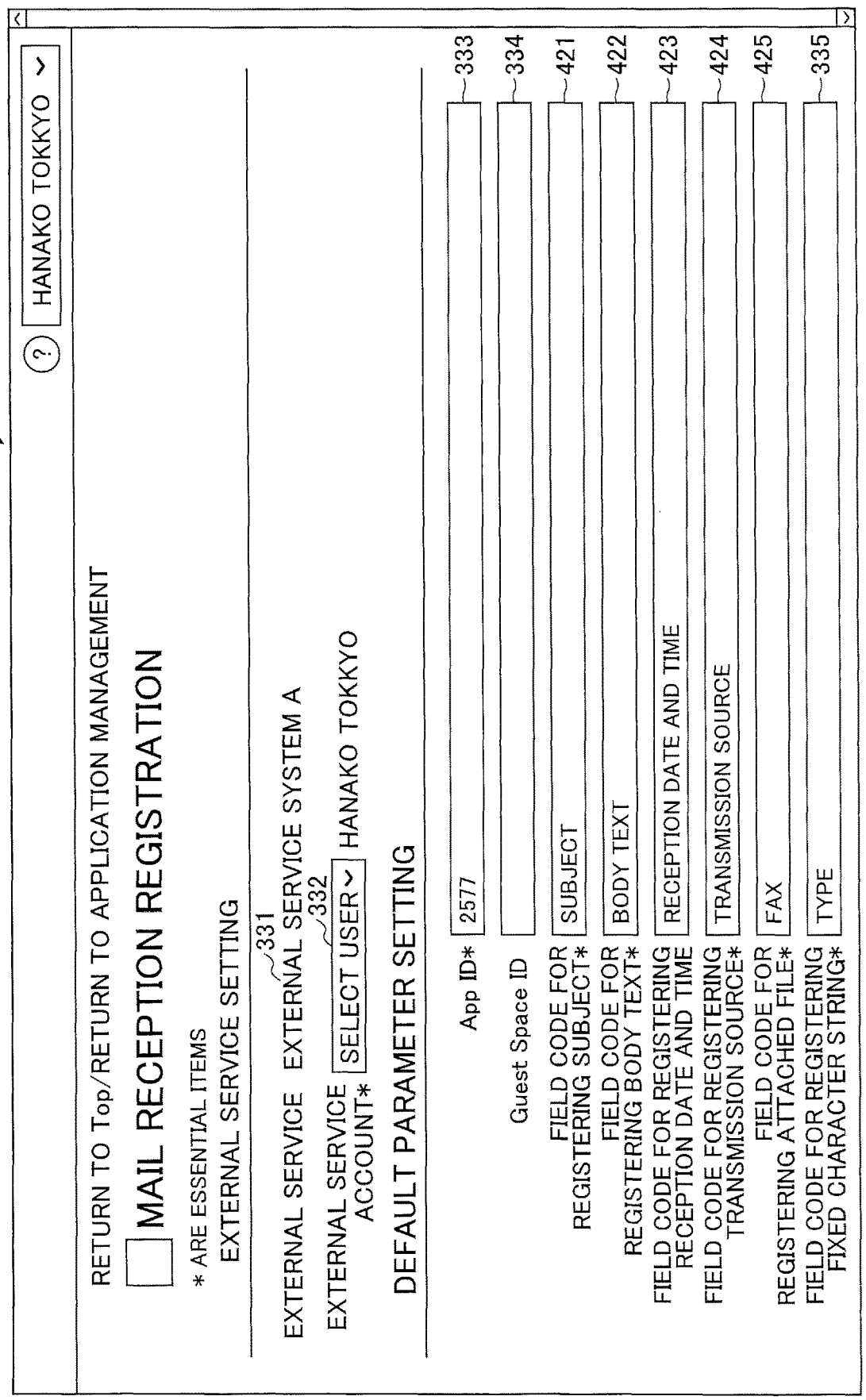
FIG. 48 is a diagram illustrating an example of a cooperation source application setting screen of "mail reception registration" displayed by the terminal apparatus according to an embodiment of the present invention.

Next, a cooperation source application setting screen 420 of "mail reception registration" will be described. FIG. 48 is an example of the cooperation source application setting screen 420 of the cooperation source application of "mail reception registration" displayed by the terminal apparatus 30. The cooperation source application setting screen 420 of FIG. 48 includes a field code 421 for registering a subject, a field code 422 for registering a body text, a field code 423 for registering a reception date and time, a field code 424 for registering a transmission source, and a field code 425 for registering an attached file.

The field code 421 for registering the subject . . . The field code in which the subject of the e-mail is to be registered, is specified.

The field code 422 for registering the body text . . . The field code in which the body text of the e-mail is to be registered, is specified.

The field code 423 for registering the reception date and time . . . The field code in which the reception date and time of the e-mail is to be registered, is specified.

The field code 424 for registering the transmission source . . . The field code in which the transmission source of the e-mail is to be registered, is specified.

The field code 425 for registering the attached file . . . The field code in which the file attached to the e-mail is to be registered, is specified.

Thus, also for an e-mail, data other than the image data, as well as the image data received by the e-mail can be registered in the external service system 40 by the device 20.

<<Process in which Administrator Sets, in Cooperation Source Application Setting Screen, Data Other than Image Data (e.g., Transmission Source Fax Number) in Addition to Image Data Received by Fax Processing Unit, so that Device Stores Fax in Particular Field in Cooperation Destination Application Upon Receiving Fax>>

Figure 49:
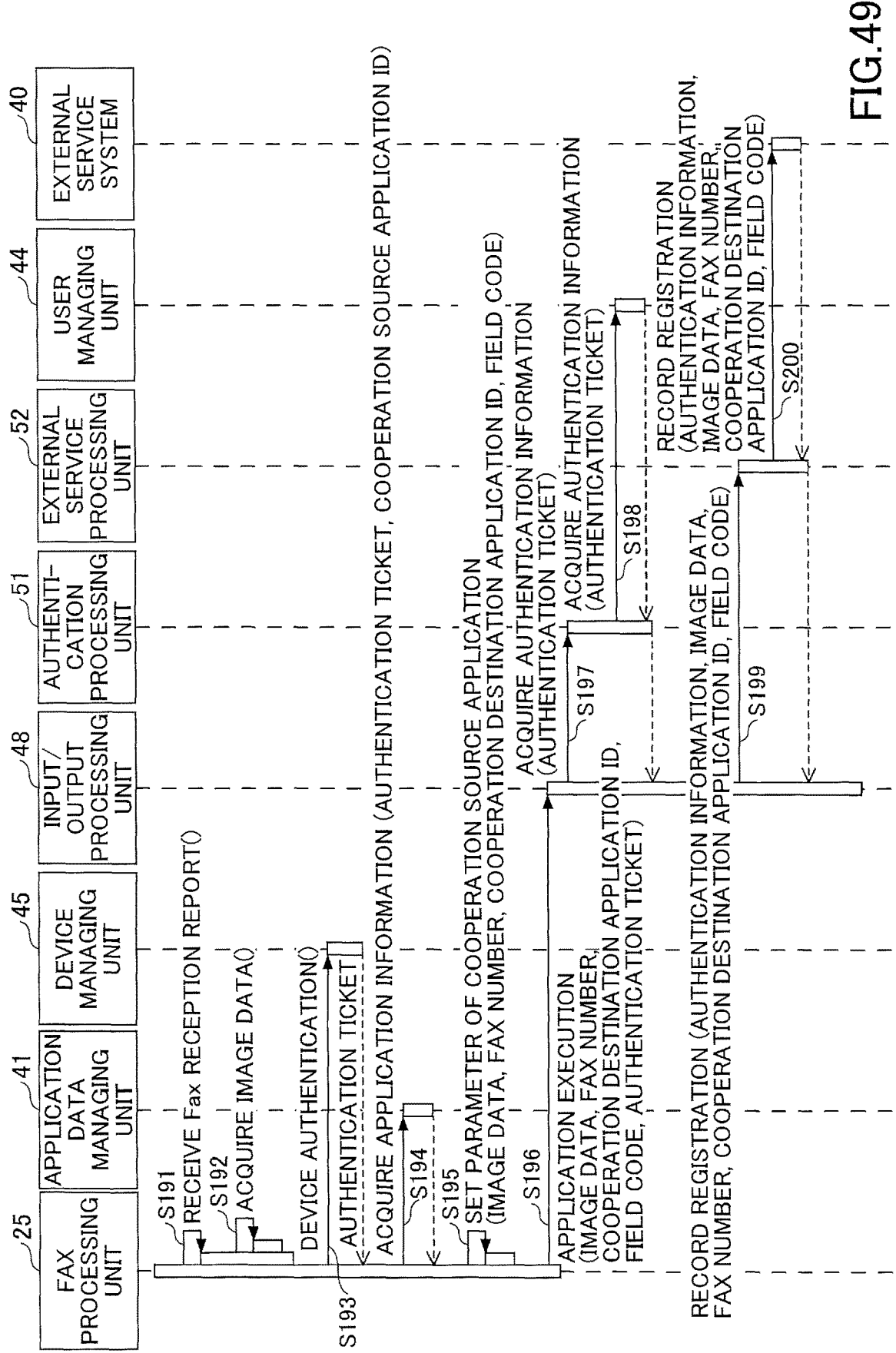
FIG. 49 is an example of a sequence diagram illustrating a procedure in which a device receives a fax and registers image data and data other than image data in the field of an external service system according to an embodiment of the present invention.

FIG. 49 is an example of a sequence diagram illustrating a procedure in which the device 20 receives a fax and registers image data and data other than image data in a field of the external service system 40.

S191: The fax processing unit 25 receives a fax reception report from the fax unit 933.

S192: The fax processing unit 25 acquires image data received from the fax unit 933 upon receiving the fax reception report.

S193: The fax processing unit 25 requests the device managing unit 45 of the information processing system 10 to authenticate the device via the second communication unit 21 and acquires an authentication ticket. Note that the device 20 is registered in the device managing unit 45 in advance, and authentication of the device 20 is successful when the device ID or the Universally Unique Identifier (UUID) is transmitted.

S194: The fax processing unit 25 specifies an authentication ticket and the cooperation source application ID set in the fax processing unit 25 (set in the fax processing unit 25 at the time of installation of the cooperation source application), and acquires the application data (space ID, cooperation destination application ID, field code, and the like) and the application process information 53 from the application data managing unit 41.

S195: As illustrated in FIG. 8, the fax processing unit 25 sets the acquired application data (cooperation destination application ID and field code) and the fax number of the transmission source of the received fax in association with the parameters of the application process information.

S196: The fax processing unit 25 transmits the image data received by fax, the cooperation destination application ID set to the parameter, the field code, and the fax number to the input/output processing unit 48 via the second communication unit 21 of the device 20 and makes a request to execute the cooperation source application. That is, because this cooperation source application is a shared application, the authentication information of the administrator is used. That is, the second communication unit 21 makes a request to store data (image data) and accompanying information (fax number) in the external service system according to the setting.

S197 and S198: The input/output processing unit 48 acquires the authentication information of the administrator set in the user name selection field 332 of the cooperation source application setting screen from the user managing unit 44 via the authentication processing unit 51. The administrator is set in the application data.

S199: The input/output processing unit 48 transmits the image data, the authentication information, the cooperation destination application ID set in the parameter, the field code, and the fax number to the external service processing unit 52.

S200: The external service processing unit 52 receives the authentication of the external service system 40 by the authentication information and transmits the cooperation destination application ID, the field code, the fax number, and the image data set to the parameters of the application process information, to the external service system.

As described above, the device 20 can register the image data and the fax number in the field of the external service system.

In FIG. 49, the device 20 acquires the application data (space ID, cooperation destination application ID, field code, and the like) in step S194, but it is not necessarily required to acquire the application data. In this case, when the cooperation destination application ID of the cooperation source application related to the reception of the fax is transmitted to the information processing system 10, the information processing system 10 can identify the cooperation destination application ID based on the application data.

<<Device Transmits Image Data and Data Other than Image Data Only from Particular Fax Number to External Service System>>

A method of registering the fax number of a particular transmission source, image data from only a transmission source of a particular e-mail, and the like in the external service system 40, will be described.

Figure 50:
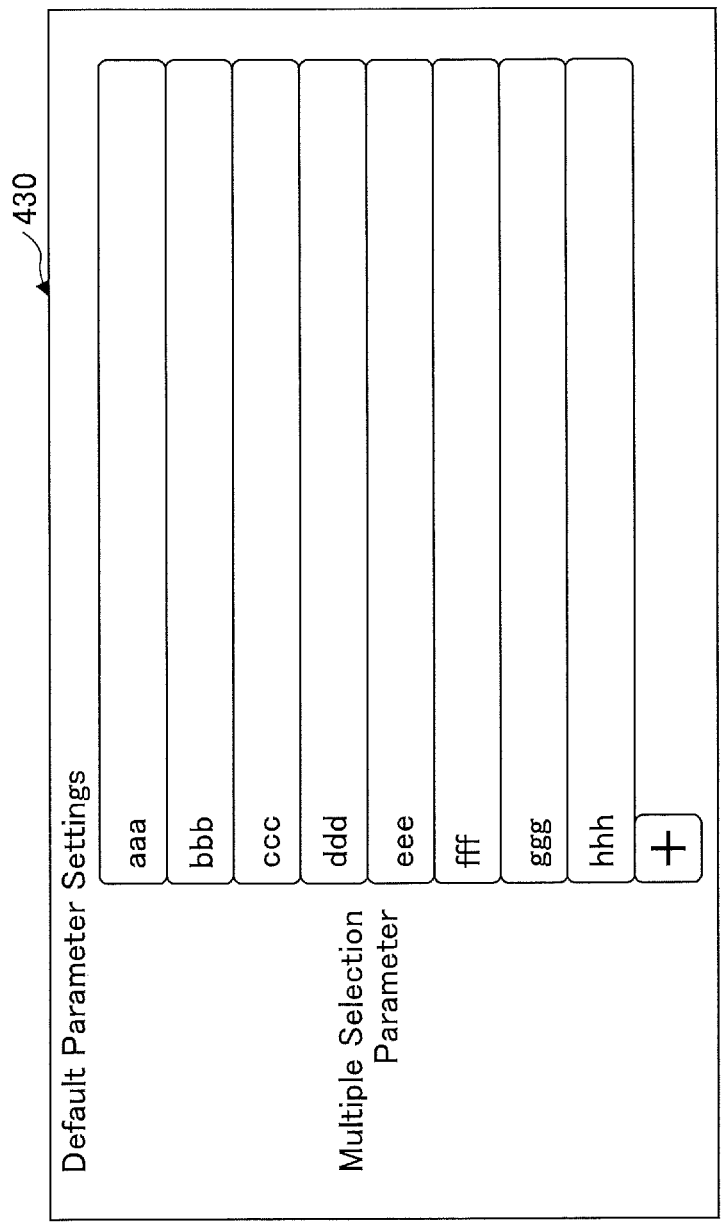
FIG. 50 is a diagram illustrating an example of a cooperation source application setting screen displayed by a terminal apparatus according to an embodiment of the present invention.

FIG. 50 illustrates an example of a cooperation source application setting screen 430 displayed by the terminal apparatus 30. The cooperation source application setting screen 430 is a whitelist of fax numbers registered in the external service system 40 by the device 20 (register the data of the transmission source registered in the list, in the external service system). The whitelist is stored in the application data storage unit 13.

When a fax is received, the fax processing unit 25 receives the application data from the information processing system 10 and executes a subsequent process if the value of the application data is a value in the white list. If the value of the application data is not a value in the white list, the fax processing unit 25 does not register the image data, etc., received by fax. Accordingly, only image data received from an important transmission source can be registered.

Figure 51:
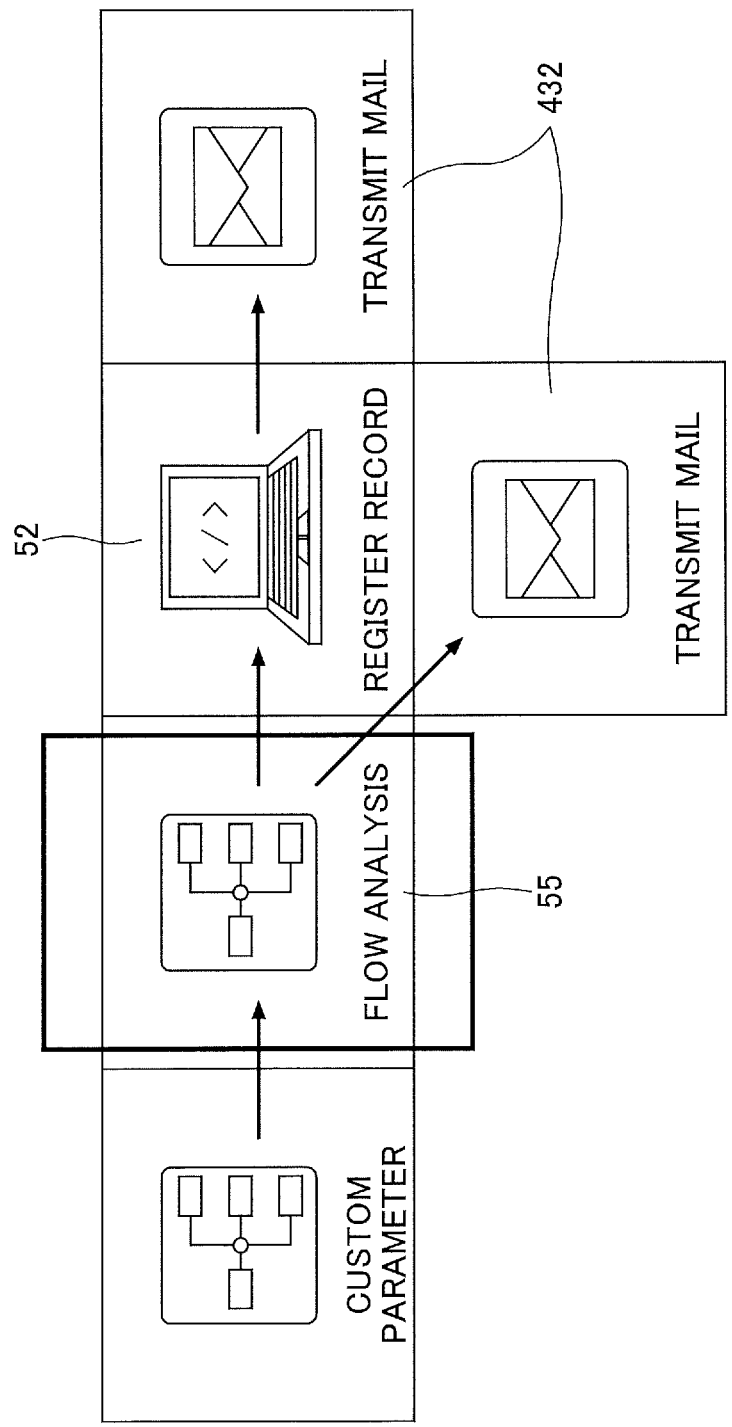
FIG. 51 is a diagram schematically illustrating application process information for registering image data and the like only from a particular fax number and the like in an external service system according to an embodiment of the present invention.

Alternatively, the component 18 may determine whether the fax number is registered in the whitelist. FIG. 51 schematically illustrates application process information for registering image data and the like only from a particular fax number to the external service system 40. The determining unit 55, which is the component 18 for making determinations, analyzes the parameters of the application process information. That is, reference is made to the whitelist to determine whether the fax number set to the parameter of the application process information is registered in the whitelist. When the fax number is registered, the external service processing unit 52 registers the image data, etc., in the external service system 40. However, when the fax number is not registered, for example, a mail transmitting component 432 transmits an e-mail and does not register the image data, etc.

As described above, the application process information can be branched depending on the transmission source of the fax or the transmission source of the mail. The same process can be performed with respect to the transmission source of an e-mail. Further, characters included in OCR results of image data received by fax or characters included in an e-mail (subject and body text) may be processed similarly upon comparing with the white list.

In FIG. 51, it is simply switched between storing the image data or not storing the image data. However, a process content can be associated with the characters included in the OCR result of the image data received by the fax or with the characters included in an e-mail, and a predetermined process can be executed. Further, the whitelist may be a blacklist (not registering the data of a transmission source registered in the list, in the external service system).

Figure 52:
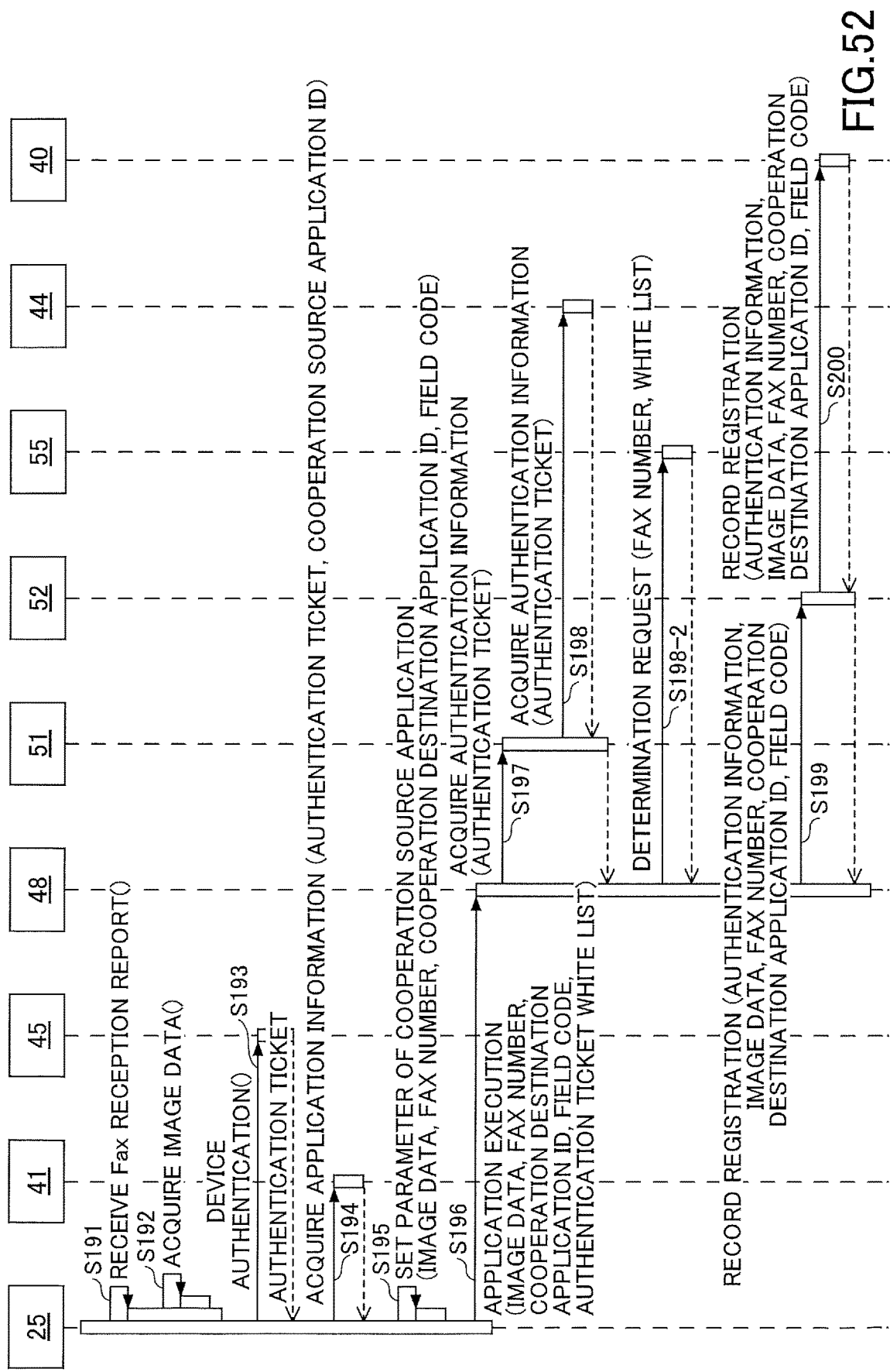
FIG. 52 is an example of a sequence diagram illustrating a procedure in which the device receives a fax and registers the image data and data other than the image data in a field of the external service system, based on a whitelist according to an embodiment of the present invention.

FIG. 52 is an example of a sequence diagram illustrating a procedure in which the device 20 receives a fax and registers the image data and data other than the image data in a field of the external service system 40, based on a whitelist. In the description of FIG. 52, the difference from FIG. 49 will be mainly explained.

S196: A white list included in the application data is transmitted to the input/output processing unit 48.

S198-2: The input/output processing unit 48 specifies a fax number and a whitelist and requests the determining unit 55 to determine whether to register the data in the external service system 40. When the determining unit 55 determines to register the data, step S200 is executed.

<Main Effects>

As described above, the service providing system 100 according to the present embodiment accepts a setting (the cooperation information) for the information processing system 10 to cooperate with the external service system 40, at the cooperation source application setting screen. When the information processing system 10 accepts a request to execute the cooperation source application from the device 20, the device 20 displays a setting screen for a record and accepts a setting (for example, the selection of a record) relating to the external service system. The information processing system 10 receives (accepts) the setting relating to the external service system and image data from the device 20. The information processing system 10 can cooperate with the cooperation destination application of the external service system 40 according to the setting accepted at the cooperation source application setting screen and the setting relating to the external service system accepted from the device 20 (for example, selection of a record).

<Other Application Example>

While the preferred embodiment of the present invention has been described with reference to examples, various modifications and substitutions may be made thereto without departing from the spirit and scope of the invention.

For example, the configuration example of FIG. 5, etc., indicated in the above embodiment is divided according to the main functions to facilitate the understanding of processes by the terminal apparatus 30, the device 20, and the information processing system 10. The present invention is not limited by how the process units are divided or the names of the process units. The processes of the terminal apparatus 30, the device 20, and the information processing system 10 may be further divided into many process units according to the process contents. Furthermore, the process units may be divided such that a single process unit further includes many processes.

Also, the apparatus group described in the examples are merely indicative of one of a plurality of computing environments for carrying out the embodiments disclosed herein. In some embodiments, the information processing system 10 includes a plurality of computing devices, such as server clusters. The plurality of computing devices are configured to communicate with each other via any type of communication link, including networks, a shared memory, and the like, and perform the processes disclosed herein.

Further, the information processing system 10 may be configured to share various combinations of disclosed processing steps in the present embodiment, such as in FIG. 25. For example, a process executed by a predetermined unit may be executed by a plurality of information processing apparatuses included in the information processing system 10. The information processing system 10 may be organized into a single server apparatus or may be divided into a plurality of apparatuses.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

The authentication service unit 14 is an example of the storage controller. The second communication unit 21 is an example of the acquirer. The operation accepting unit 23 is an example of an acceptor. The display control unit 22 is an example of a display controller. The second communication unit 21 is an example of a requester. The external service processing unit 52 is an example of an external service processor. The communication unit 19 is an example of a communicator.

According to one embodiment of the present invention, a service providing system, etc., that is able to accept, from a device, settings relating to an external service system, can be provided.

The service providing system, the information processing system, and the information processing method are not limited to the specific embodiments described in the detailed description, and variations and modifications may be made without departing from the spirit and scope of the present invention.

What is claimed is:

1. A service providing system comprising:
a device; and
an information processing system configured to transmit, to an external service system, data relating to a first application for which an execution request is given by the device, wherein the information processing system includes:
first processing circuitry; and
a first memory storing computer-executable instructions that cause the first processing circuitry to:
control to store each user of the information processing system and each user of the external service system in association with each other, and wherein the device includes:
second processing circuitry; and
a second memory storing computer-executable instructions that cause the second processing circuitry to:
accept a specification of the first application and a user of the information processing system;
acquire data for which a user of the external service system, associated with the specified user of the information processing system, has an authority, among the data relating to the first application included in the external service system;
control to display a first screen configured to accept a selection of one piece of data from the acquired data for which the user of the external service system has the authority;
accept the one piece of data for which the selection is accepted via the first screen; and
request the external service system to store information acquired by the device in association with the accepted one piece of data.

2. The service providing system according to claim 1, wherein the data acquired from the external service system is data for which the user of the external service system, associated with the specified user of the information processing system who is operating the device, has the authority, among data relating to a second application included in the external service system associated with the first application.

3. The service providing system according to claim 1, wherein the data acquired from the external service system is data for which the user of the external service system, associated with the specified user of the information processing system who is operating the device, has an editing authority.

4. The service providing system according to claim 1, wherein the first processing circuitry of the information processing system is further caused to:
accept a setting specifying which data among the data relating to the first application included in the external service system is to be displayed on the device, upon detecting that the first application is executed in the device.

5. The service providing system according to claim 4, wherein the second processing circuitry of the device is further caused to:
display a second screen configured to display the specified data relating to the first application included in the external service system based on the setting, in order to prompt a selection of a storage destination of the data relating to the first application and to accept a selection of one piece of data from the specified data; and
request the external service system to store the data relating to the first application, according to the one piece of data included in the external service system for which the selection has been accepted via the second screen.

6. The service providing system according to claim 5, wherein the setting specifying which data is to be displayed on the device, is a column in a table in a database of the external service system.

7. The service providing system according to claim 5, wherein the second processing circuitry of the device is further caused to:
    accept a setting relating to the storage destination of the data relating to the first application, in the external service system, and wherein
the first processing circuitry of the information processing system is further caused to:
    transmit, to the external service system, the data relating to the first application and the storage destination of the data relating to the first application, upon receiving the execution request for the first application.

8. The service providing system according to claim 7, wherein
the external service system manages a database, wherein
the second processing circuitry of the device is further caused to:
    display a list of records of the database in the external service system; and
    accept a setting relating to a record of the database, and wherein
the first processing circuitry of the information processing system is further caused to:
    transmit, to the external service system, the data relating to the first application and identification information of the record set at the device, upon receiving the execution request for the first application.

9. The service providing system according to claim 8, wherein the first application is configured to register the data relating to the first application in a new record of the database.

10. The service providing system according to claim 8, wherein
the first processing circuitry of the information processing system is further caused to:
    transmit, to the device, identification information of a second application provided by the external service system that is associated in advance with the first application for which the device has accepted a selection;
    specify the identification information of the second application transmitted from the device and acquire the list of records of the database managed by the second application from the external service system; and
    transmit the acquired list of records to the device, and wherein
the second processing circuitry of the device is further caused to:
    accept a selection of a record from the list of records received from the information processing system.

11. The service providing system according to claim 10, wherein
the first application is configured to register the data relating to the first application in an existing record in the database, and
the first application is configured to specify the identification information of the second application and acquire, from the information processing system, the list of records of the database managed by the second application.

12. The service providing system according to claim 10, wherein
the second application is configured to manage a field and a value of the field in association with each other, wherein
the first processing circuitry of the information processing system is further caused to:
    transmit, to the device, identification information of a field associated with the first application in advance;
    specify the identification information of the second application transmitted from the device and the identification information of the field and acquire, from the external service system, a list of records in the specified field in the database managed by the second application; and
    transmit the acquired list of records to the device, and wherein
the second processing circuitry of the device is further caused to:
    accept a selection of a record from the list of records received from the information processing system.

13. The service providing system according to claim 12, wherein the first processing circuitry of the information processing system is further caused to:
    specify the identification information of the second application transmitted from the device and the identification information of the field and transmit the data relating to the first application to the external service system, upon receiving the execution request for the first application from the device.

14. The service providing system according to claim 13, wherein
the data relating to the first application is information relating to a user of the device, and
the first processing circuitry of the information processing system is further caused to:
    specify the identification information of the second application and the identification information of the field and transmit, to the external service system, the information relating to the user of the device who has logged in.

15. The service providing system according to claim 13, wherein
the data relating to the first application is image data of a document scanned by the device, and
the first processing circuitry of the information processing system is further caused to:
    specify the identification information of the second application and the identification information of the field and transmit, to the external service system, the image data transmitted from the device.

16. An information processing system comprising:
processing circuitry; and
a memory storing computer-executable instructions that cause the processing circuitry to:
    control to store each user of the information processing system and each user of an external service system in association with each other;
    specify a first application for which an execution request is received from a device and a user of the information processing system and acquire data for which a user of the external service system, associated with the specified user of the information processing system, has an authority, among data relating to the first application included in the external service system;
    transmit the acquired data, for which the user of the external service system has the authority, to the device; and
    request the external service system to store information acquired by the device in association with the data, for which the user of the external service system has the authority, received from the device.

17. An information processing method performed by a service providing system including a device and an information processing system, the information processing method comprising controlling, by the information processing system, to store each user of the information processing system and each user of an external service system in association with each other;

accepting, by the device, a specification of a first application for which an execution request is given by the device and a user of the information processing system;

acquiring, by the device, data for which a user of the external service system, associated with the specified user of the information processing system, has an authority, among data relating to the first application included in the external service system;

controlling, by the device, to display a first screen configured to accept a selection of one piece of data from the acquired data for which the user of the external service system has the authority;

accepting, by the device, the one piece of data for which the selection is accepted via the first screen; and requesting, by the device, the external service system to store information acquired by the device in association with the accepted one piece of data.

* * * * *